(12) United States Patent
Van Tran

(10) Patent No.: US 10,967,921 B2
(45) Date of Patent: Apr. 6, 2021

(54) TOWING SYSTEMS

(71) Applicant: Khoa Van Tran, San Antonio, TX (US)

(72) Inventor: Khoa Van Tran, San Antonio, TX (US)

(*) Notice: Subject to any disclaimer, the term of this patent is extended or adjusted under 35 U.S.C. 154(b) by 0 days.

(21) Appl. No.: 16/656,376

(22) Filed: Oct. 17, 2019

(65) Prior Publication Data
US 2020/0047829 A1 Feb. 13, 2020

Related U.S. Application Data

(63) Continuation of application No. 15/987,553, filed on May 23, 2018, now abandoned, which is a continuation of application No. 15/509,160, filed as application No. PCT/US2016/053012 on Sep. 22, 2016, now Pat. No. 10,005,504.

(60) Provisional application No. 62/222,184, filed on Sep. 22, 2015.

(51) Int. Cl.
| | | |
|---|---|---|
| B62D 53/06 | (2006.01) | |
| B60P 3/07 | (2006.01) | |
| B60D 1/66 | (2006.01) | |
| B60D 1/145 | (2006.01) | |
| B62D 63/06 | (2006.01) | |
| B62D 21/12 | (2006.01) | |
| B62D 21/20 | (2006.01) | |
| B60D 1/06 | (2006.01) | |

(52) U.S. Cl.
CPC ........... *B62D 53/062* (2013.01); *B60D 1/145* (2013.01); *B60D 1/66* (2013.01); *B60P 3/07* (2013.01); *B62D 21/12* (2013.01); *B62D 21/20* (2013.01); *B62D 53/067* (2013.01); *B62D 63/061* (2013.01); *B62D 63/064* (2013.01); *B60D 1/06* (2013.01)

(58) Field of Classification Search
CPC .... B62D 53/062; B62D 21/20; B62D 53/067; B62D 63/061; B62D 63/064; B60D 1/145; B60D 1/66; B60P 3/07
USPC ...................................................... 280/414.5
See application file for complete search history.

(56) References Cited

U.S. PATENT DOCUMENTS

| | | | | |
|---|---|---|---|---|
| 2,835,400 | A * | 5/1958 | Latzke ................. | B60P 3/1033 280/43.18 |
| 3,400,944 | A * | 9/1968 | Narcisse ............... | B62D 61/12 280/43.24 |
| 10,005,504 | B2 * | 6/2018 | Tran ...................... | B60P 3/07 |
| 2018/0265143 | A1 * | 9/2018 | Tran ...................... | B60P 3/07 |

* cited by examiner

*Primary Examiner* — Jacob D Knutson
(74) *Attorney, Agent, or Firm* — Volk & McElroy, LLP; Michael D. Volk, Jr.

(57) ABSTRACT

A portable towing system for a motorcycle or similar vehicle, such as a trike, the frame of which can be lowered to ground level to facilitate loading of the motorcycle or similar vehicle by pushing or riding the vehicle onto the frame without risk of the vehicle falling off the sides of a steeply inclined ramp. The towing system may be assembled, raised, lowered, and disassembled by a single person, if desired. The raising and lowering of the frame is effected by a lifting and lowering mechanism connected with the wheel assemblies.

2 Claims, 31 Drawing Sheets

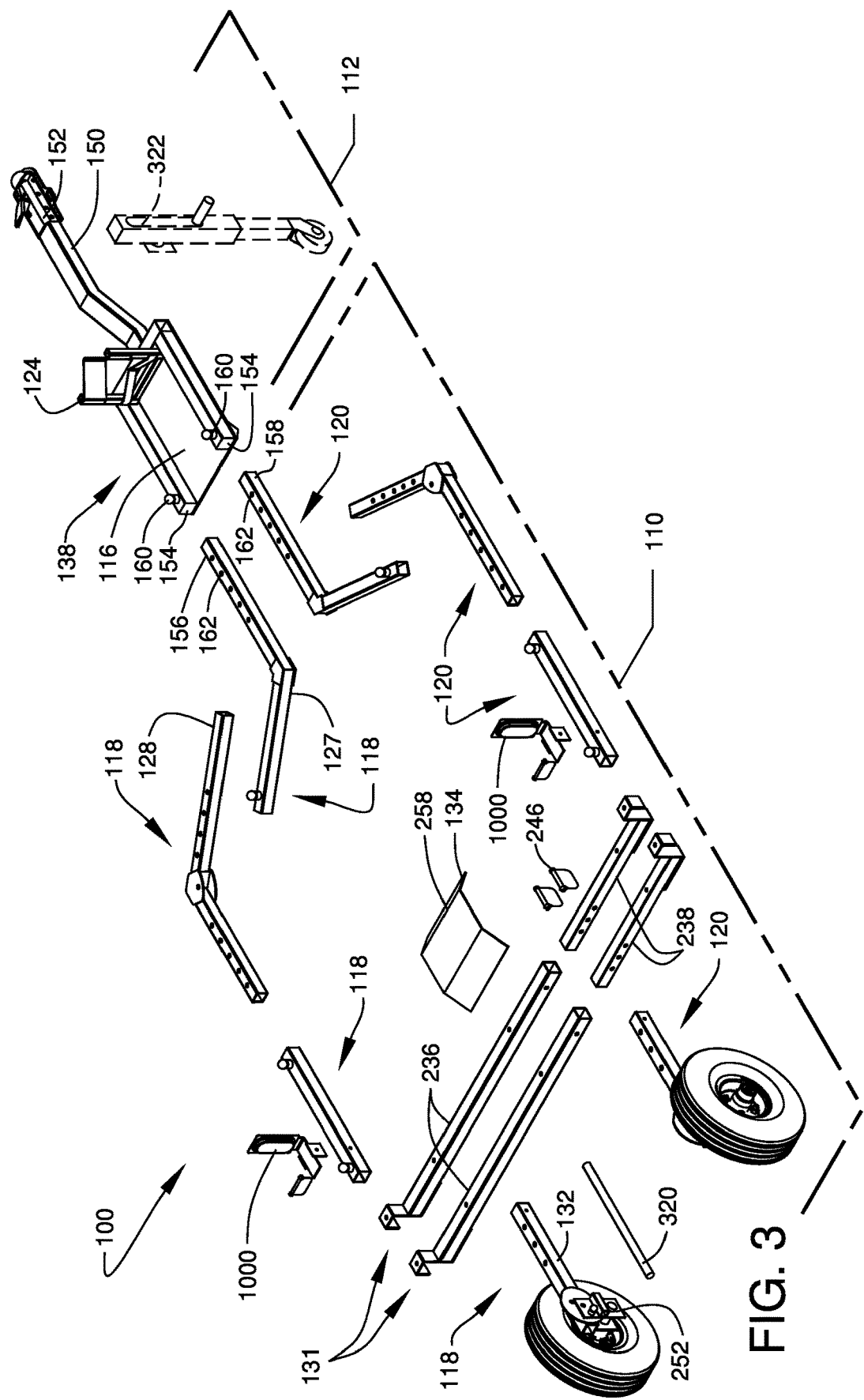

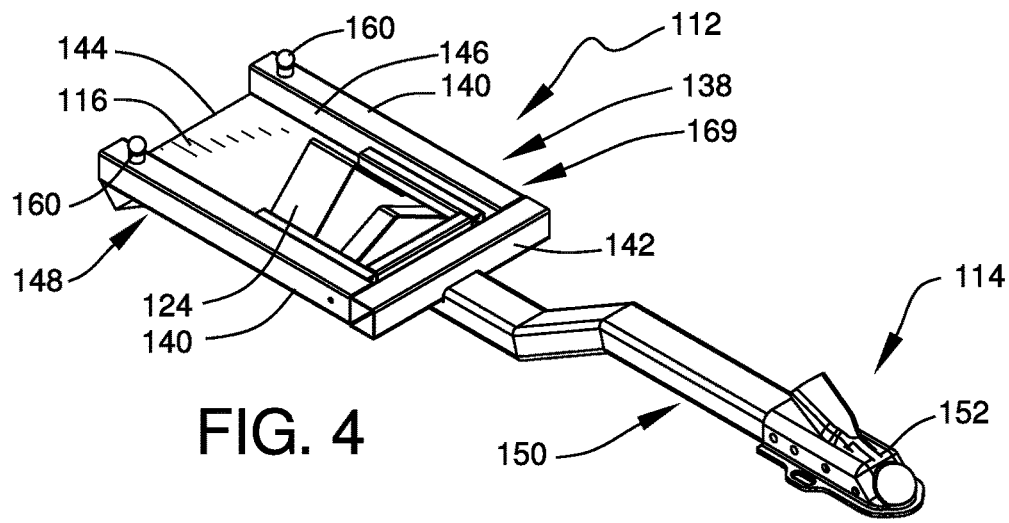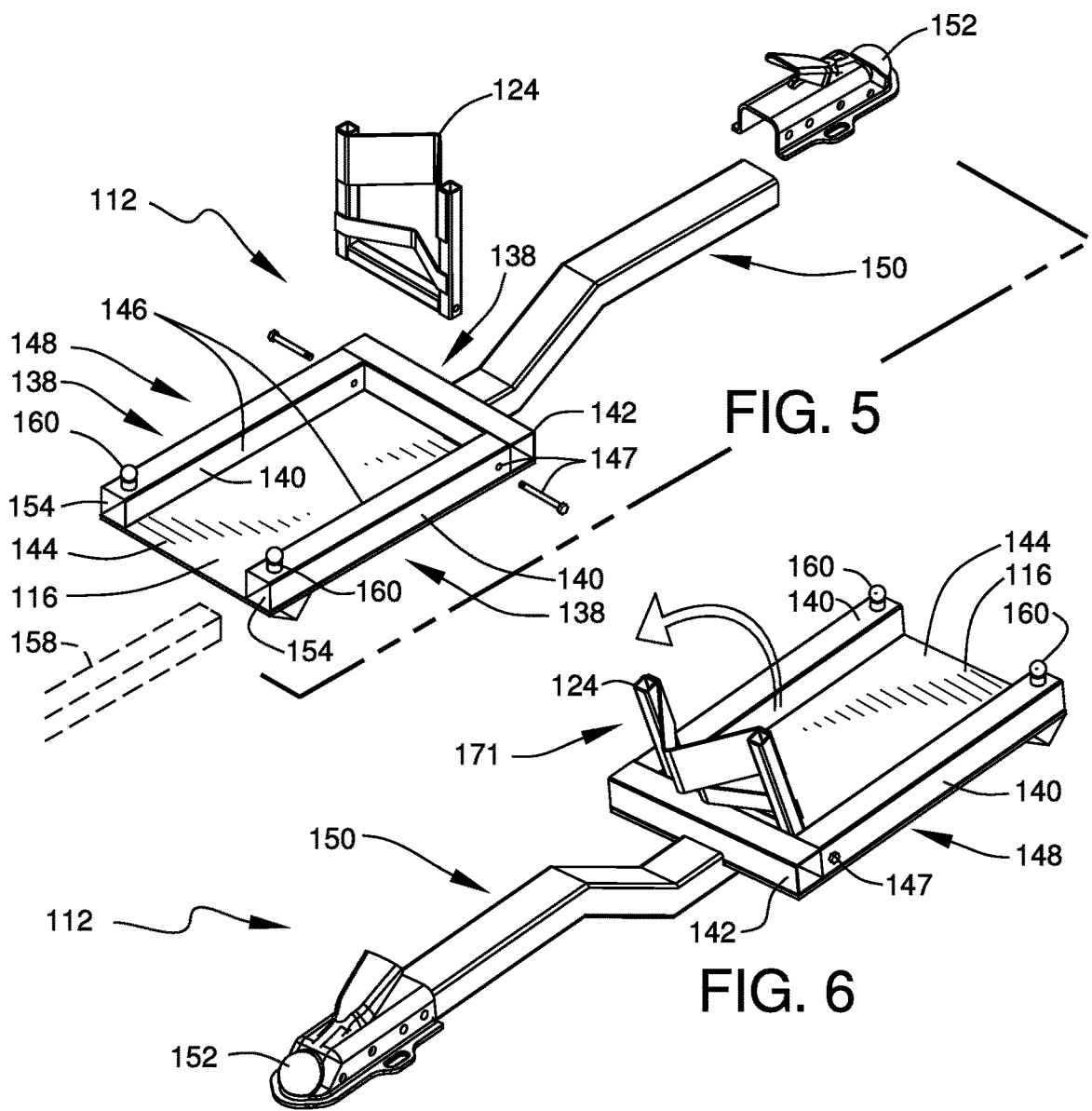

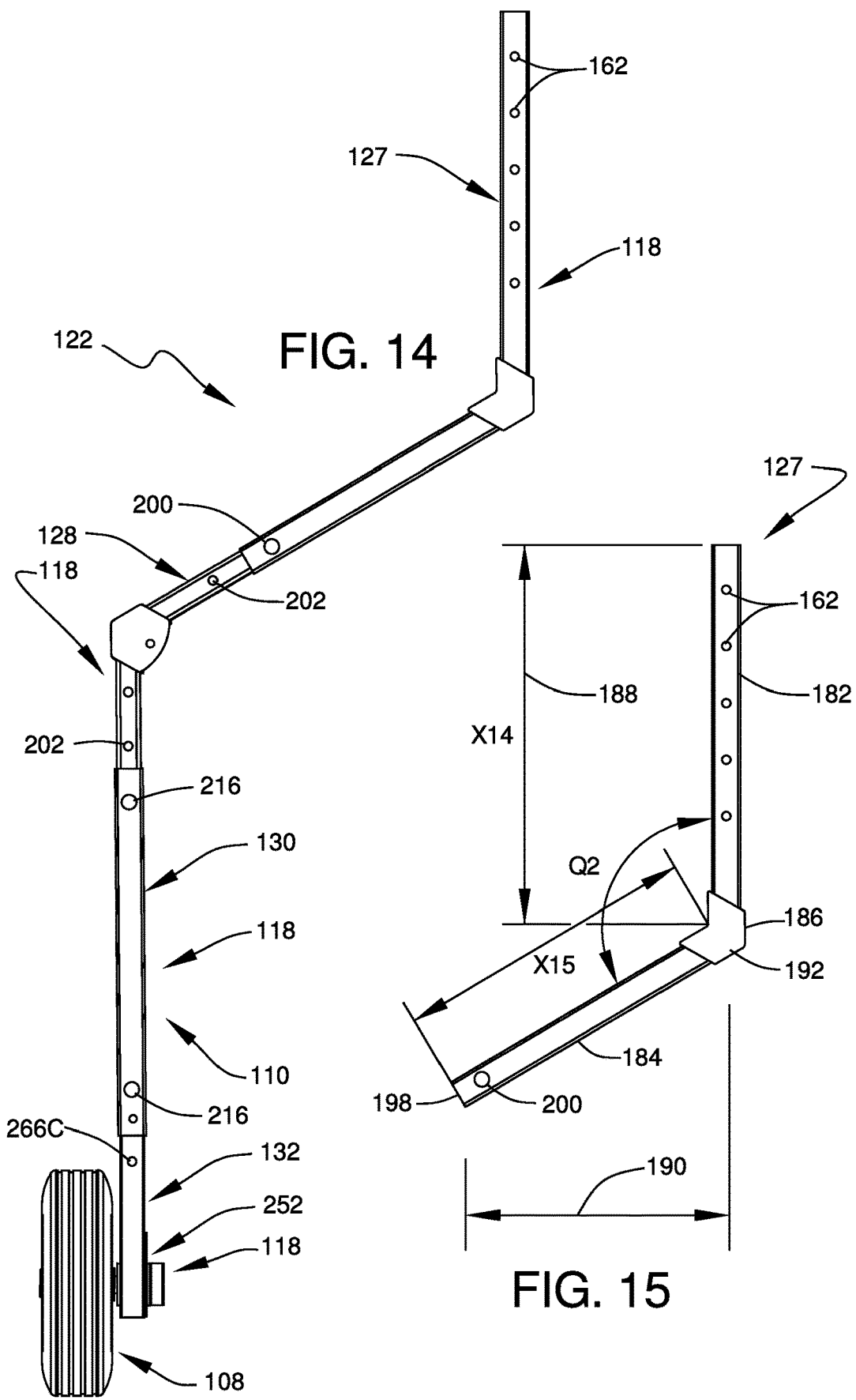

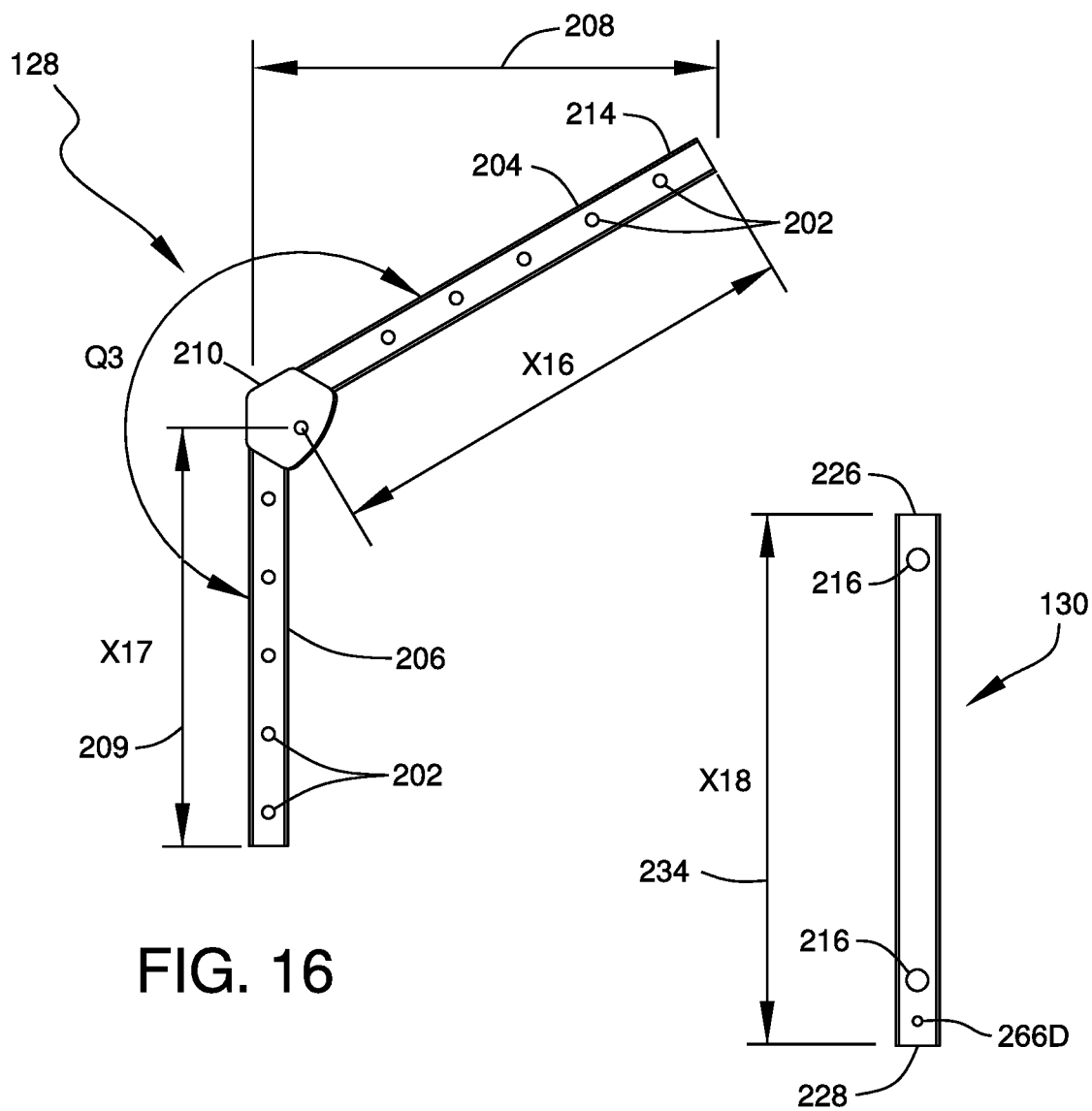
FIG. 16
FIG. 18
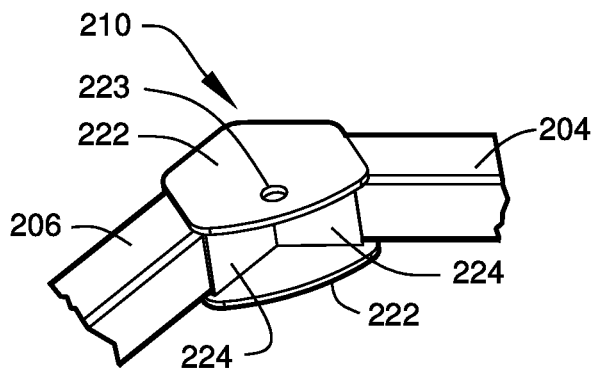
FIG. 17

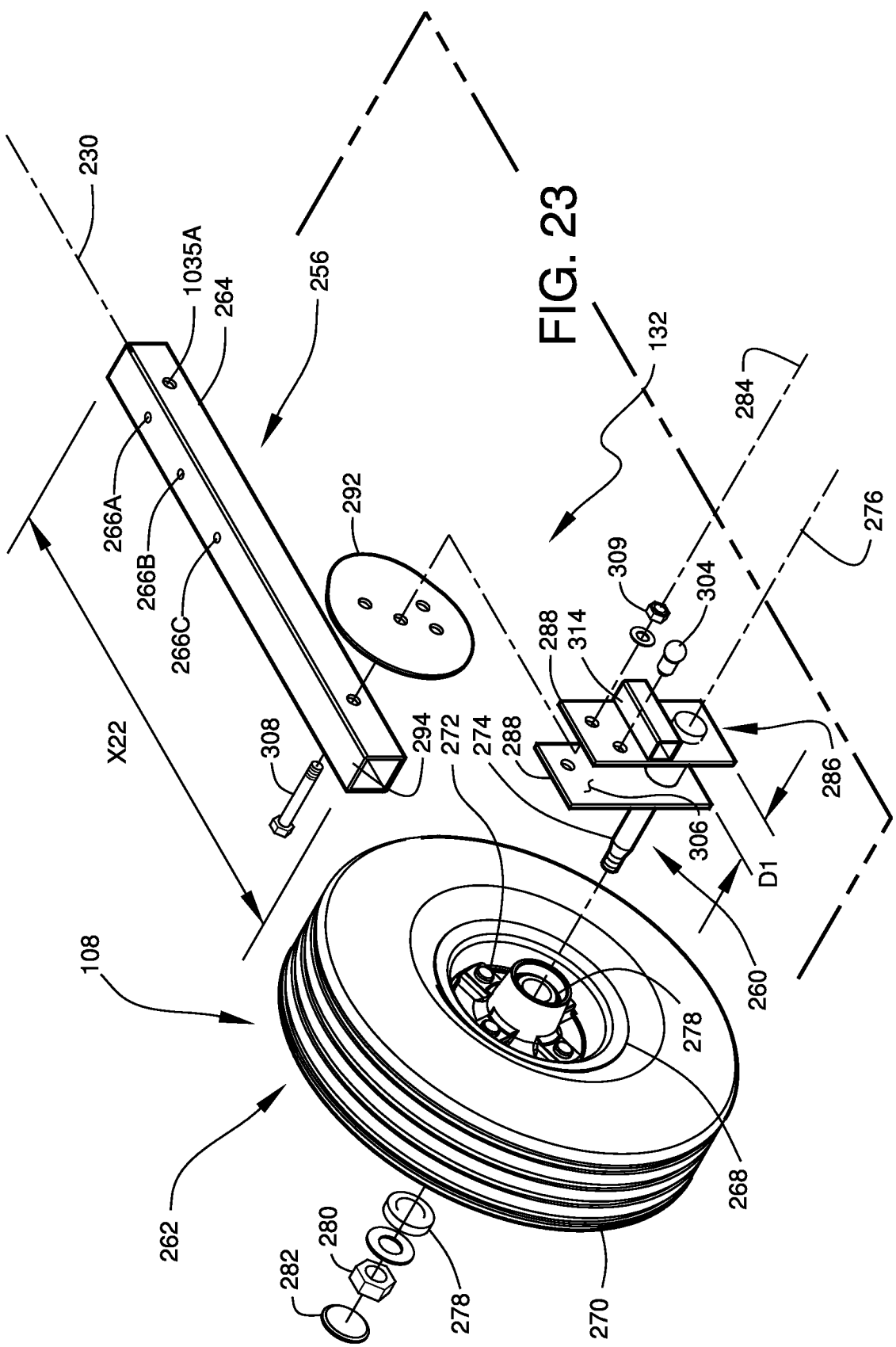

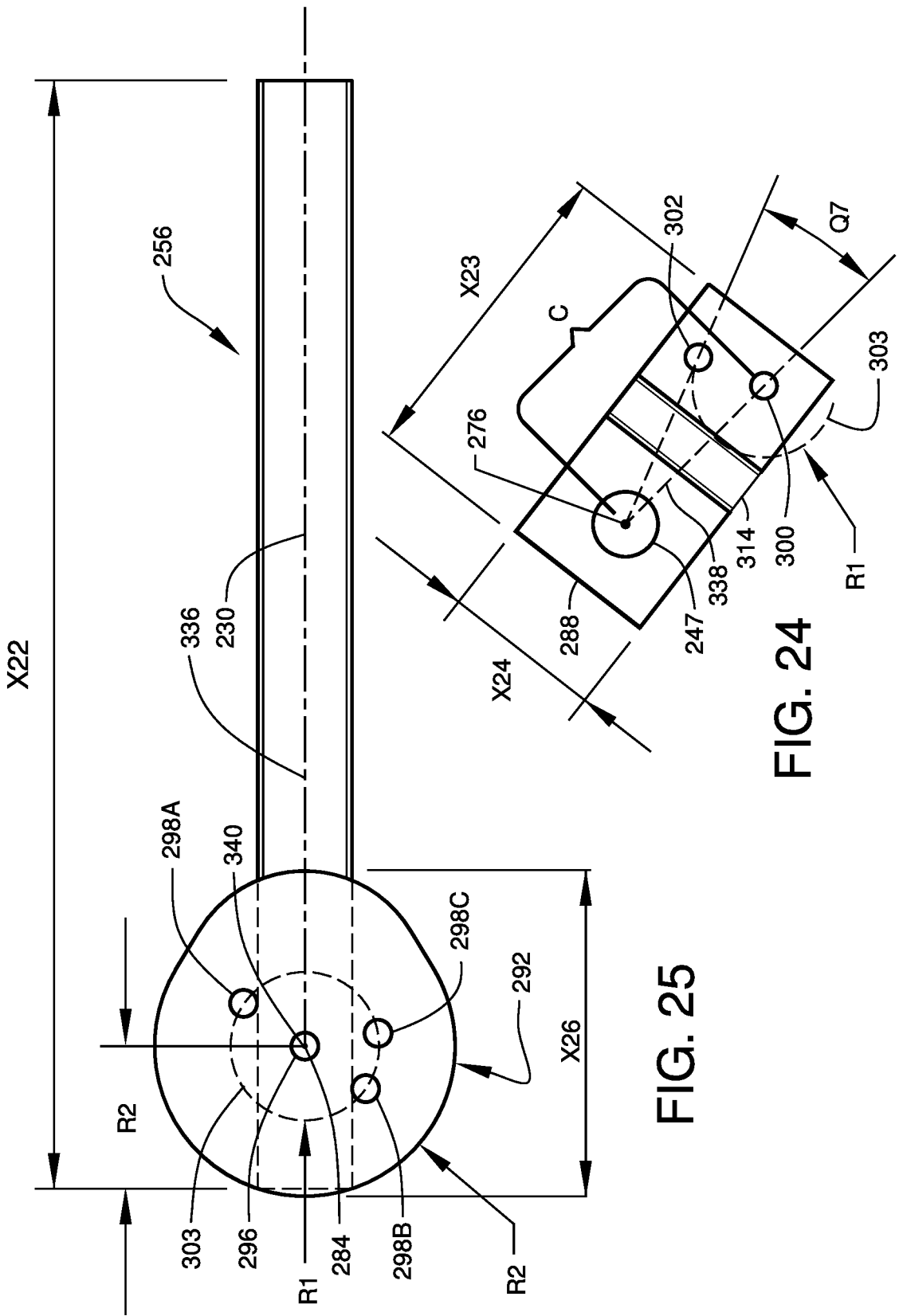

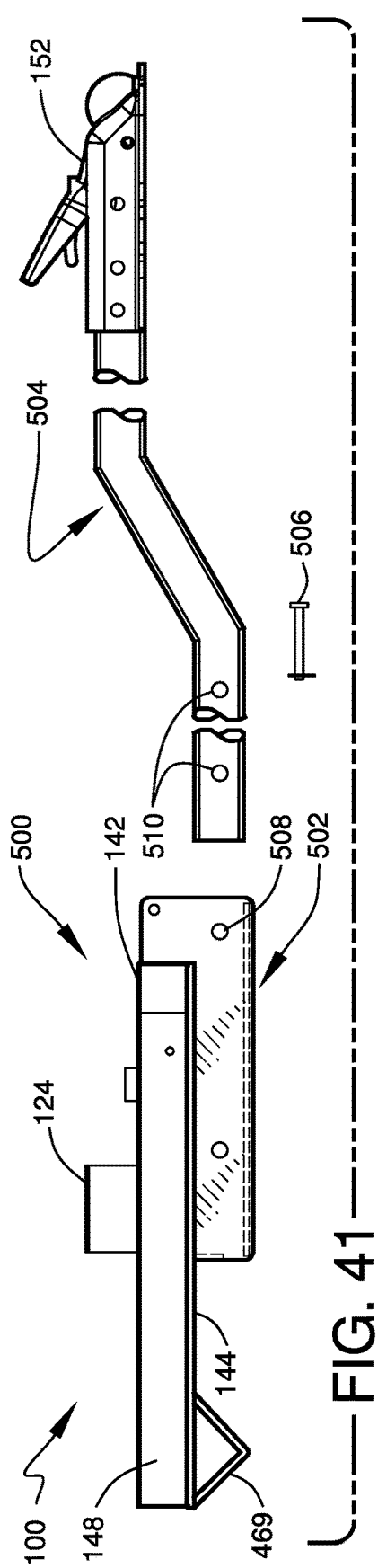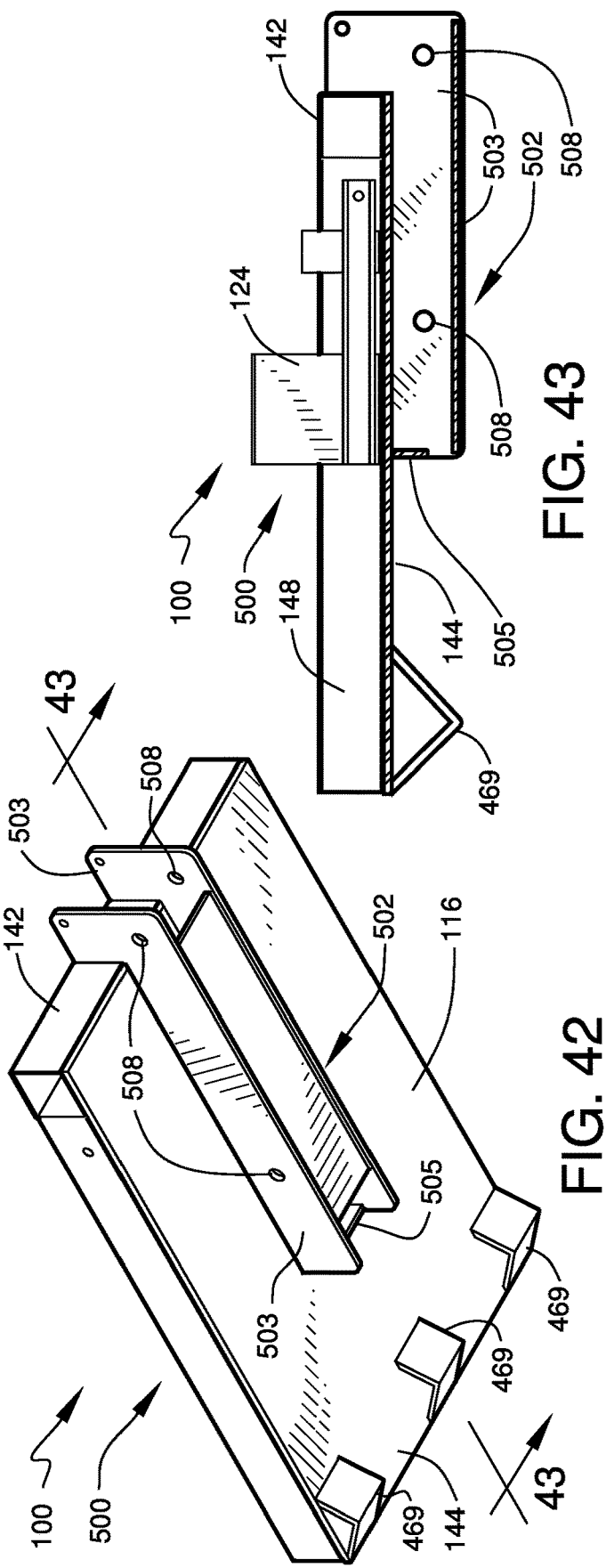

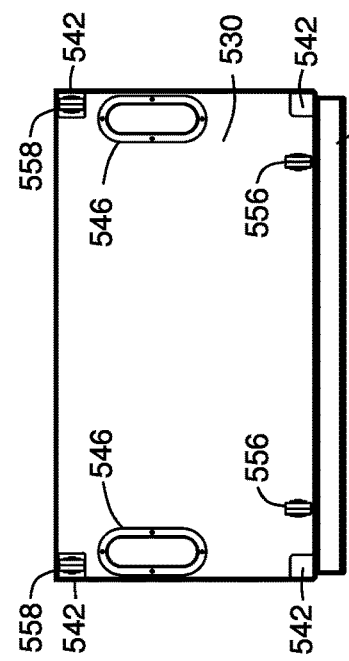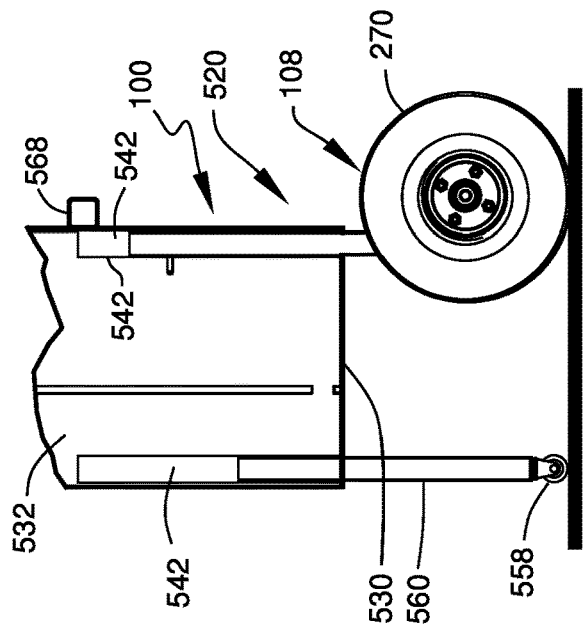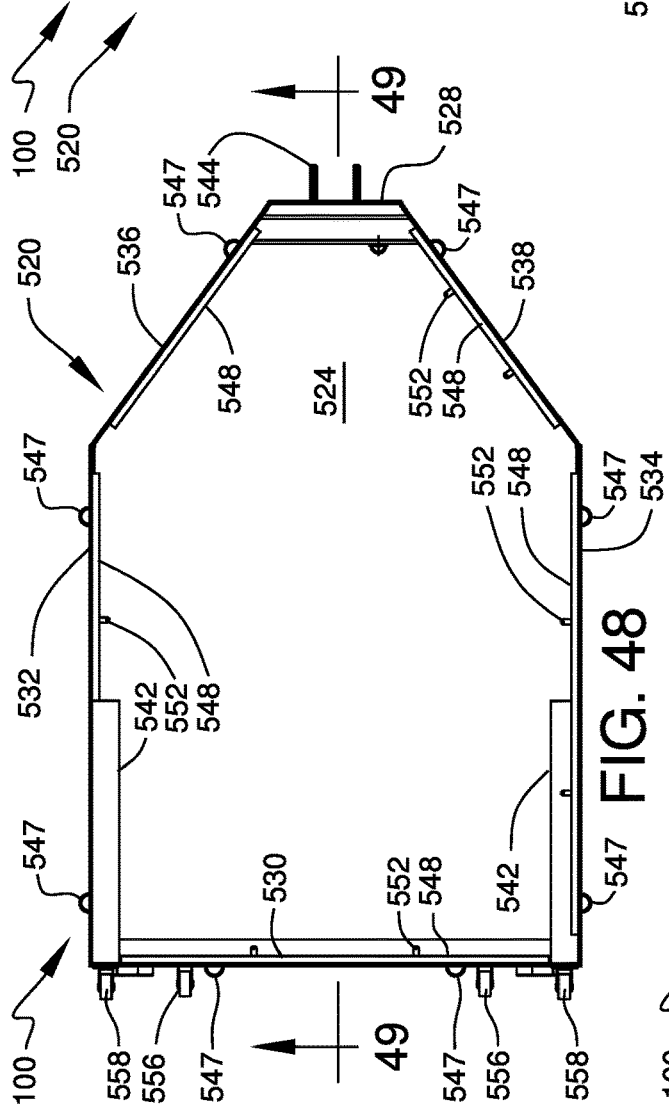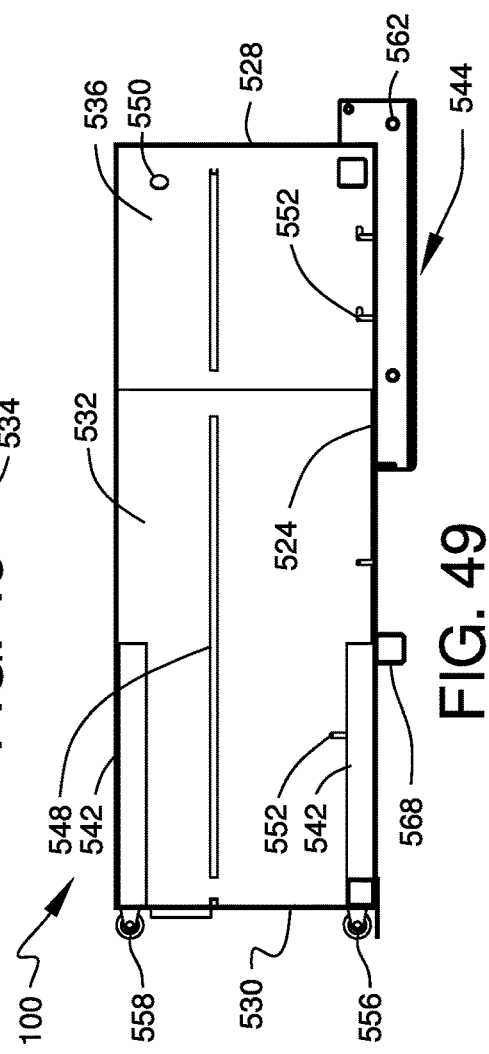

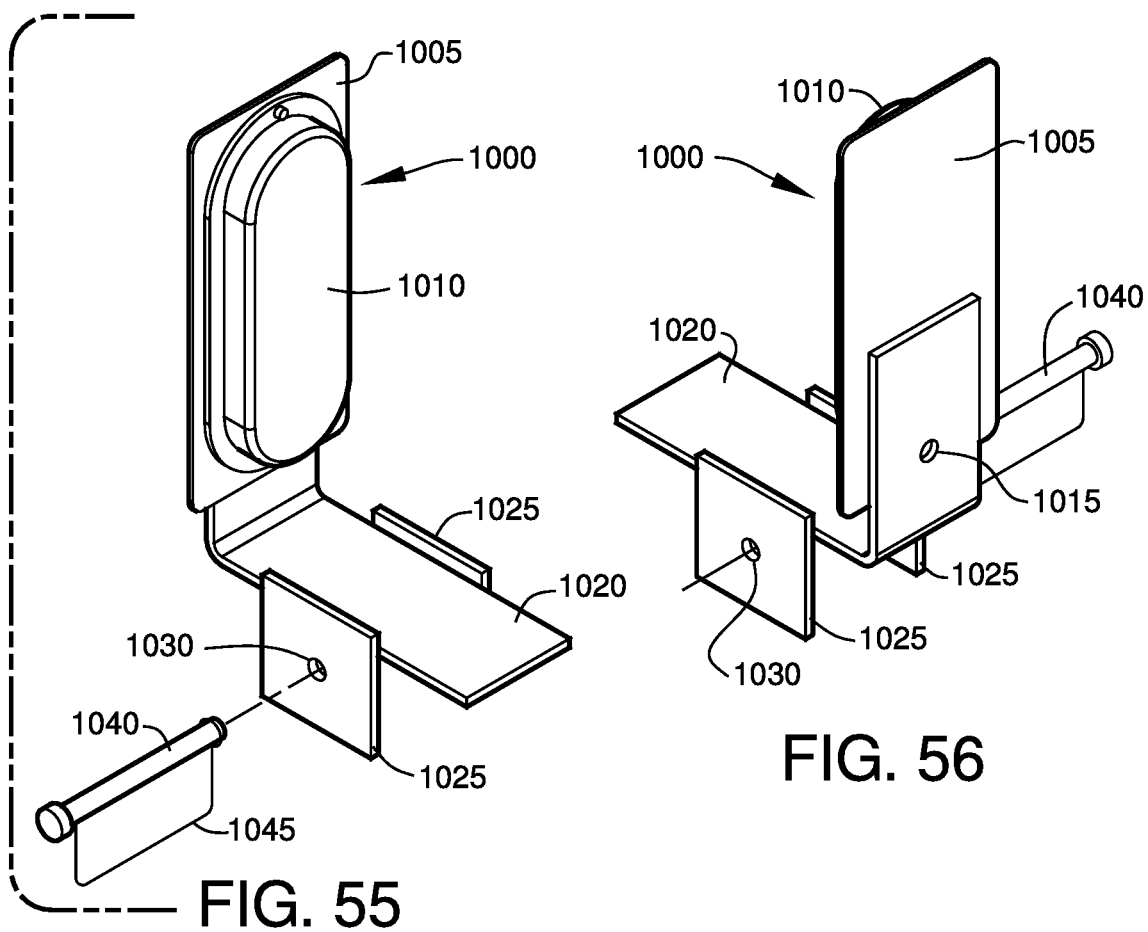
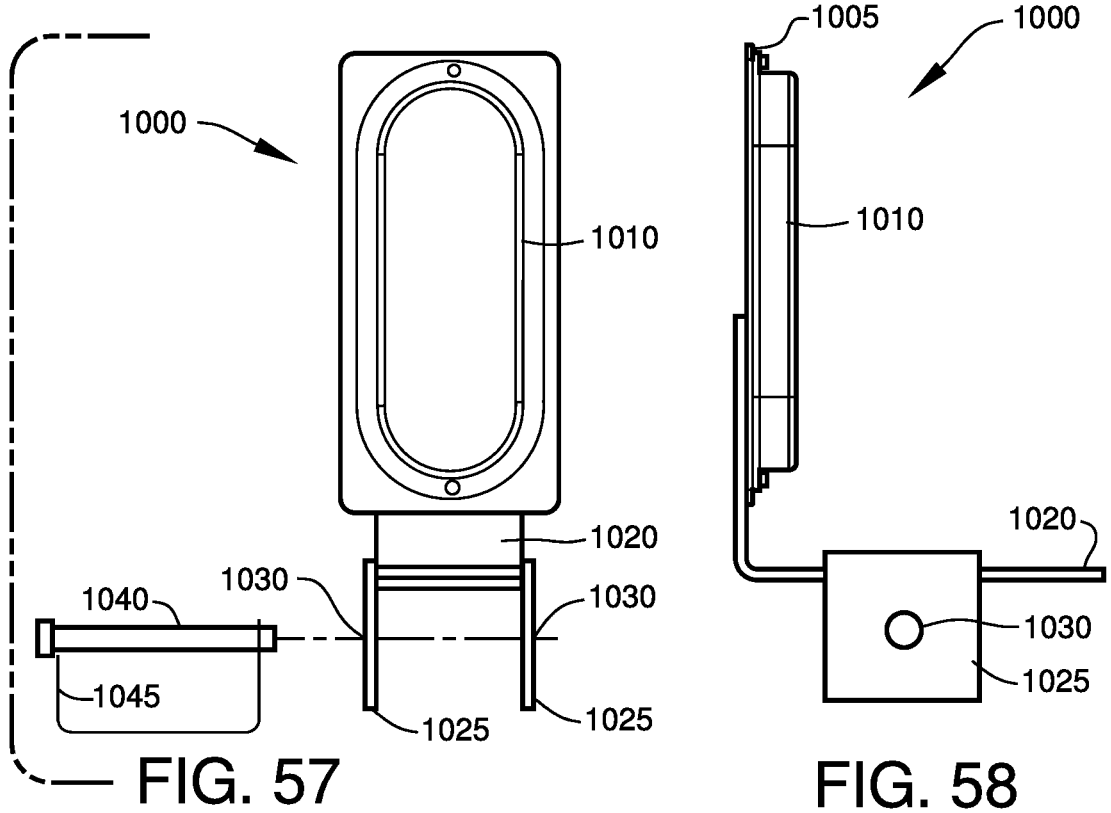

TOWING SYSTEMS

CROSS-REFERENCE TO RELATED APPLICATIONS

This application is a continuation of U.S. Nonprovisional patent application Ser. No. 15/987,553, filed May 23, 2018, titled TOWING SYSTEMS, which is a continuation of U.S. Nonprovisional patent application Ser. No. 15/509,160, filed Mar. 6, 2017, titled TOWING SYSTEMS, which is a national stage application of International PCT Application No. PCT/US2016/053012, filed Sep. 22, 2016, titled TOWING SYSTEMS, which claims the benefit of U.S. Provisional Patent Application No. 62/222,184, filed Sep. 22, 2015, titled TOWING SYSTEMS, the contents all of which are incorporated herein by this reference and are not admitted to be prior art with respect to the present invention by the mention in this cross-reference section.

BRIEF DESCRIPTION OF THE DRAWINGS

FIG. 3 is an exploded perspective view of the towing trailer of FIG. 1 in a disassembled configuration.

FIG. 4 is a perspective view illustrating a trailer head assembly of the towing trailer of FIG. 1.

FIG. 5 is an exploded perspective view of the trailer head assembly of FIG. 4.

FIG. 6 is a perspective view illustrating the operation of a deployable tire stop of the trailer head assembly of FIG. 4.

FIG. 14 is a top view illustrating a left-side tow frame assembly of the towing trailer of FIG. 1.

FIG. 15 is a top view illustrating a first left-side component of the left-side tow frame assembly of FIG. 14.

FIG. 16 is a top view illustrating a second left-side component of the left-side tow frame assembly of FIG. 14.

FIG. 17 is a perspective view illustrating a reinforced joint of the second left-side component of FIG. 16.

FIG. 18 is a top view illustrating a third left-side component of the left-side tow frame assembly of FIG. 14.

FIG. 23 is an exploded view of the fourth left-side component of FIG. 22.

FIG. 24 is a side view of a pivot arm and associated components of a left-side raising and lowering mechanism.

FIG. 25 is a side view of a coupling bar and associated components of the left-side raising and lowering mechanism of the fourth left-side component of FIG. 22.

FIG. 41 is a side view illustrating an alternate trailer head assembly according to another embodiment of the present disclosure.

FIG. 42 is a bottom perspective view showing a draw-bar receiver of the alternate trailer head assembly of FIG. 41.

FIG. 43 is a sectional view through the section 43-43 of FIG. 42.

FIG. 48 is a top view illustrating the interior of the cargo box of FIG. 44.

FIG. 49 is a sectional view through the section 49-49 of FIG. 48.

FIG. 50 is a rear view of the cargo box of FIG. 44.

FIG. 51 is a partial right side view of the cargo box of FIG. 44 with the wheel assemblies installed.

FIG. 55 is front perspective view of a taillight and turn signal attachment according to an embodiment of the present disclosure.

FIG. 56 is a rear perspective view of the taillight and turn signal attachment of FIG. 55.

FIG. 57 is a front view of the taillight and turn signal attachment of FIG. 55.

FIG. 58 is a right side view of the taillight and turn signal attachment of FIG. 55.

DETAILED DESCRIPTION

The present disclosure relates to a portable towing system for a motorcycle or similar vehicle (e.g., a trike). Vehicle towing trailers are customarily factory-assembled prior to distribution and sale. This creates a problem for users as even small towing trailers require substantial storage space, which makes them inconvenient to store when not in use. Another problem common to such vehicle towing trailers is difficulty associated with loading a vehicle onto a raised chassis of the trailer. This frequently requires the use of a steep and narrow ramp or hoist, and is seldom carried out by a single user.

The present disclosure relates to a portable towing system for conveniently loading and transporting motorcycles. Embodiments of the present disclosure may also be used to tow a "trike" motorcycle, one or two motorcycles, an all-terrain vehicle, and the like. For clarity, the following disclosure will describe an embodiment for the loading and transport of a motorcycle, with the understanding that additional embodiments of the system may be used to transport the above-mentioned vehicle types as well.

One primary feature of the towing systems of the present disclosure is the use of wheel assemblies, removably connected with a towing frame, that have components that raise and lower the towing frame from the wheel assemblies. The towing systems of the present disclosure are capable of being assembled and disassembled by a single person and collapsed for compact storage.

Figure 1:
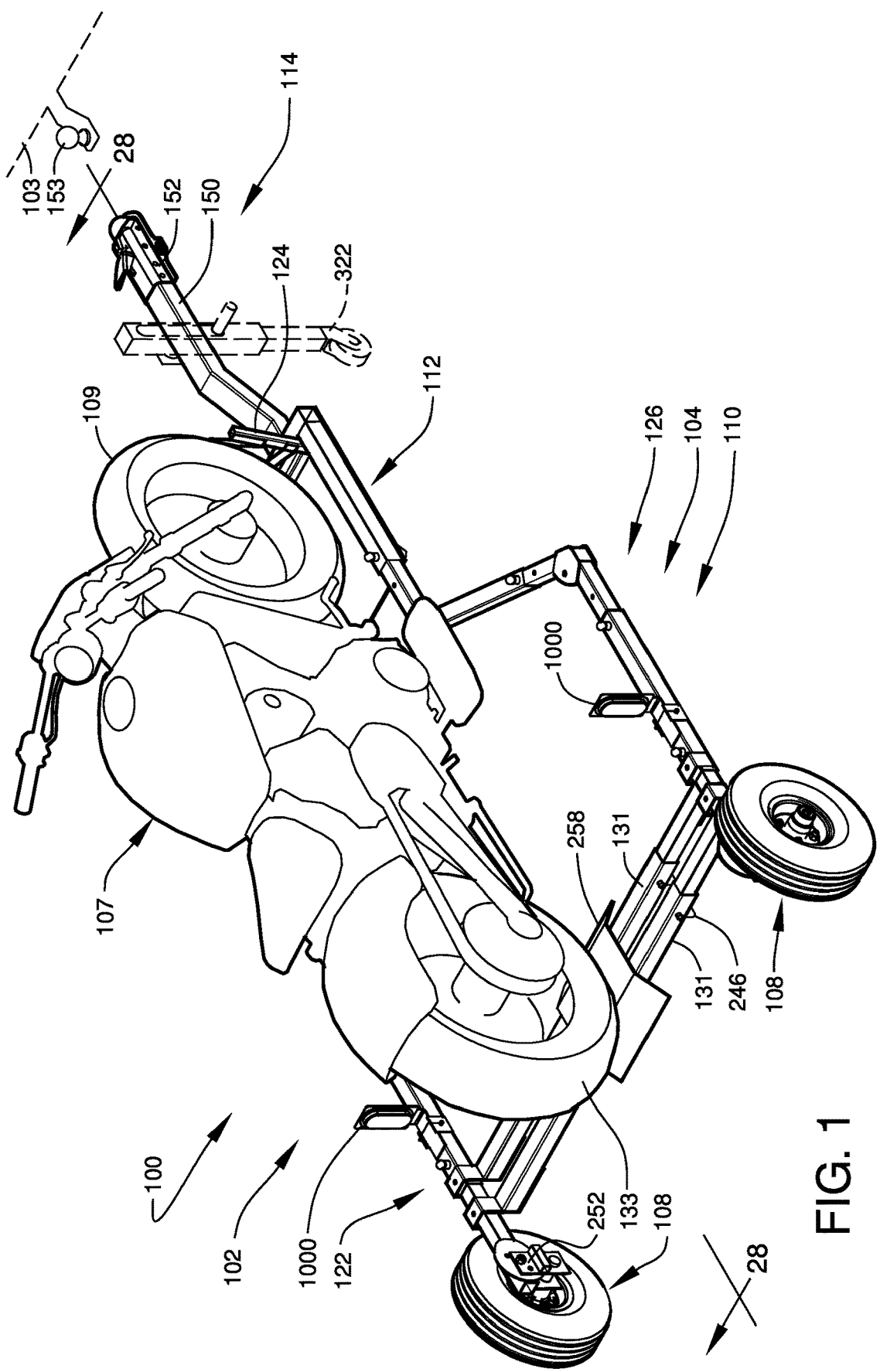
FIG. 1 is a perspective view illustrating a towing trailer connectable to a towing vehicle for the transport of a second vehicle according to an embodiment of the present disclosure.
Figure 2:
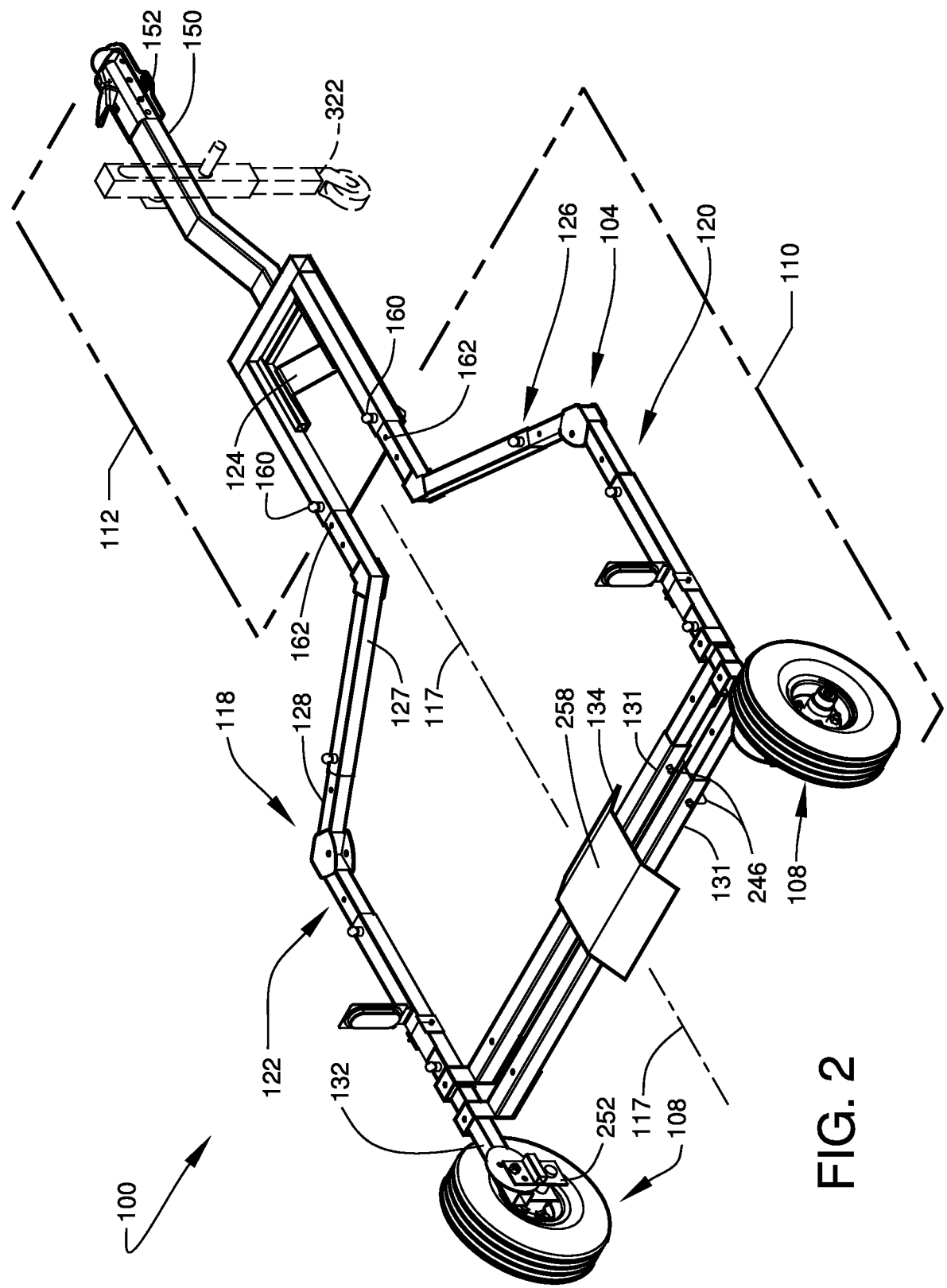
FIG. 2 is a second perspective view illustrating the towing trailer of FIG. 1 in an assembled configuration and shown without the second vehicle.

Referring to the drawings, FIG. 1 is a perspective view illustrating motorcycle 107 (a towed vehicle) positioned on towing trailer 102 for transport by towing vehicle 103, according to one embodiment of the presently disclosed towing system 100. FIG. 2 is a second perspective view illustrating towing trailer 102 in the assembled configuration of FIG. 1. FIG. 3 is an exploded perspective view showing towing trailer 102 in a disassembled configuration.

One feature of towing system 100 is to provide an improved transport apparatus for towing of a motorcycle or similar vehicle, wherein such apparatus can be reconfigured for compact storage when not in use. To this end, towing trailer 102 preferably comprises chassis 104 having multiple parts allowing a single person to disassemble and reassemble towing trailer 102 as needed. Another feature of towing system 100 is to provide an improved apparatus for the safe and convenient loading of a motorcycle on a towing apparatus. In this regard, towing trailer 102 is structurally configured to enable the supportive chassis 104 of the towing apparatus to be lowered low to the ground to allow a user to either push motorcycle 107 into position on the trailer, or ride into such position at ground level. Towing trailer 102 is further structurally configured to allow a single user to raise chassis 104, supporting motorcycle 107, to a towing position for transport.

The following disclosure will first describe the general arrangements of towing trailer 102 and features that allow for disassembly and reassembly of the apparatus. A subsequent section of the present disclosure will discuss the adjustment feature of the device designed to facilitate vehicle loading. Alternate embodiments of some of the features of towing trailer 102 are also disclosed. Various accessories of towing system 100 are also disclosed herein.

In reference to FIG. 3, towing trailer 102 comprises a set of inter-connectable chassis components that form a rigid supportive structure when combined. The multi-component arrangement of towing trailer 102 allows the apparatus to be assembled for use and then disassembled for compact storage as needed. When disassembled, the chassis components may be stored in the towing vehicle 103 (e.g., a trunk of a car), in a cargo box (shown in FIGS. 44-51), or other suitable storage area.

In defining the general organizational makeup of the apparatus, chassis 104 of towing trailer 102 can be described as having two major sub-portions identified herein as towing frame 110 and trailer head assembly 112 (a vehicle attachment member). Trailer head assembly 112 is shown located forward of towing frame 110 (relative to the forward direction of towing) and is removably attachable to both towing vehicle 103 and towing frame 110.

Towing frame 110 comprises a set of left-side components 118 and a corresponding set of right-side components 120, as shown. When joined, left-side components 118 of towing frame 110 form left-side tow frame assembly 122 (see FIG. 14). Similarly, right-side components 120 form right-side tow frame assembly 126 when joined. Left-side tow frame assembly 122 and right-side tow frame assembly 126 removably engage trailer head assembly 112 to form a complete and structurally-unified assembly, as shown in FIG. 2. When joined with trailer head assembly 112, left-side tow frame assembly 122 and right-side tow frame assembly 126 are maintained in a substantially symmetrical arrangement about longitudinal axis 117.

FIG. 4 through FIG. 9 illustrate the structures and features of trailer head assembly 112 in greater detail according to one embodiment of the present disclosure. FIG. 4 is a perspective view illustrating trailer head assembly 112 disassembled from the towing frame. FIG. 5 is an exploded perspective view showing the subcomponents of trailer head assembly 112. As shown in FIG. 4 and FIG. 5, trailer head assembly 112 comprises a rigid tubular frame 148 constructed from a plurality of bar-shaped support members 138, including at least two longitudinal members 140 and a transverse member 142. Transverse member 142 is orthogonally attached to and extends between the longitudinal members 140, as shown. Support members 138 may be constructed from a rigid load-bearing material having one or more metallic materials. Support members 138 may be constructed from hollow tubes, such as hollow steel tubes having a square cross section, as shown. Tubes having alternate cross sections, such as rectangular or circular, may also suffice. Support members 138 are rigidly joined, for example, by thermal welding.

A rigid plate 144 extends between the two longitudinal members 140 and transverse member 142 forming support platform 116 where front wheel 109 of motorcycle 107 will be placed (see FIG. 1). Plate 144 may be constructed from steel and may be joined to longitudinal members 140 and transverse member 142 by thermal welding. Longitudinal members 140 form a set of sidewalls 146 to surround side portions of support platform 116, as shown. Sidewalls 146 assist in keeping front wheel 109 of the loaded motorcycle in position during transport operations.

Tubular frame 148 includes drawbar 150, which projects forward from transverse member 142 and support platform 116 in an orientation generally parallel with longitudinal axis 117, as shown (see FIG. 2). A hitch member 152 for detachably coupling or connecting towing trailer 102 to towing vehicle 103 may be disposed at the end of drawbar 150, as shown. Hitch member 152 may comprise a conventional ball-type hitch assembly of a configuration suitable for coupling drawbar 150 to a conventional hitch ball 153 of towing vehicle 103 (see FIG. 1). Hitch member 152 may be joined to drawbar 150 using bolted connections. Other implementations of hitch member 152 may suffice.

Referring to FIG. 3 and FIG. 5, longitudinal members 140 comprise end openings 154 structurally configured to receive a respective one of left-side tow frame assembly 122 and right-side tow frame assembly 126, as shown in FIG. 2. For example, end opening 154 on of the left longitudinal member 140 is structurally configured to receive the proximal end 156 of left-side tow frame assembly 122 with a snug, but slidable, telescoping fit. Left-side tow frame assembly 122 comprises a length that permits the user to slidably adjust the geometric relationship between left-side tow frame assembly 122 and trailer head assembly 112. In a similar manner, the right end opening 154 of the right longitudinal member 140 may be structurally configured to receive the proximal end 158 of right-side tow frame assembly 126 with a similar snug, but slidable, telescoping fit. Right-side tow frame assembly 126 also comprises a length that permits the user to slidably adjust the geometric relationship between right-side tow frame assembly 126 and trailer head assembly 112.

Both the left and right longitudinal members 140 are fitted with locking mechanism 160 enabling trailer head assembly 112 to retain the above-noted tubular members inserted therein. According to an embodiment of the present disclosure, locking mechanism 160 comprises a spring-loaded plunger having a threaded spring-loaded plunger assembly which engages a threaded steel barrel welded to the outer face of the steel tube. The spring-loaded plunger engages one of a series of apertures 162 formed in the proximal ends of the side-frame assemblies (see FIG. 3). A user can slidably adjust the geometric relationship between right-side tow frame assembly 126 and trailer head assembly 112 by disengaging the right spring-loaded plunger of locking mechanism 160 and sliding right-side tow frame assembly 126 to a new position relative to trailer head assembly 112. The user can fix the geometric relationship between right-side tow frame assembly 126 and trailer head assembly 112 by re-engaging the right spring-loaded plunger of locking mechanism 160 in the nearest available aperture 162 of right-side tow frame assembly 126. The left-side tow frame assembly 122 may be similarly adjusted. Such arrangement provides a first region of length adjustment of towing frame 110. A single user can perform the above-noted length adjustments without the use of tools. Other locking arrangements, such as, the use of bolted connections, clevis-type pins, etc., may suffice.

FIG. 6 is a perspective view illustrating the operation of a deployable tire stop 124 of the trailer head assembly of FIG. 4. Tire stop 124 can be raised from lowered position 169 to wheel-stabilizing position 171, as shown. In FIG. 1 and FIG. 6, tire stop 124 is shown in the raised position used to stabilize front wheel 109 (see FIG. 1) during transport. In FIG. 2 and FIG. 4, the tire stop 124 is shown in the lowered position. In the raised position shown in FIG. 1 and FIG. 6, tire stop 124 provides a stopping point for front wheel 109 limiting the forward movement of the loaded motorcycle 107. Tire stop 124 may be connected with a hinged connection 147 permitting tire stop 124 to be raised and lowered as needed. Additional details of tire stop 124 are described in greater detail in FIG. 10 through FIG. 13.

Figure 7:
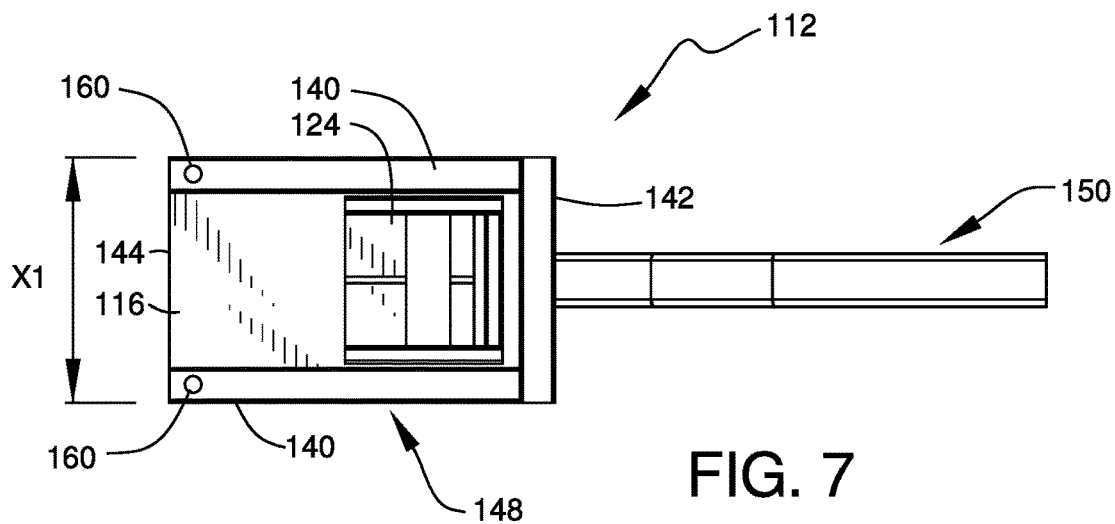
FIG. 7 is a dimensioned top view illustrating the trailer head assembly of FIG. 4.
Figure 8:
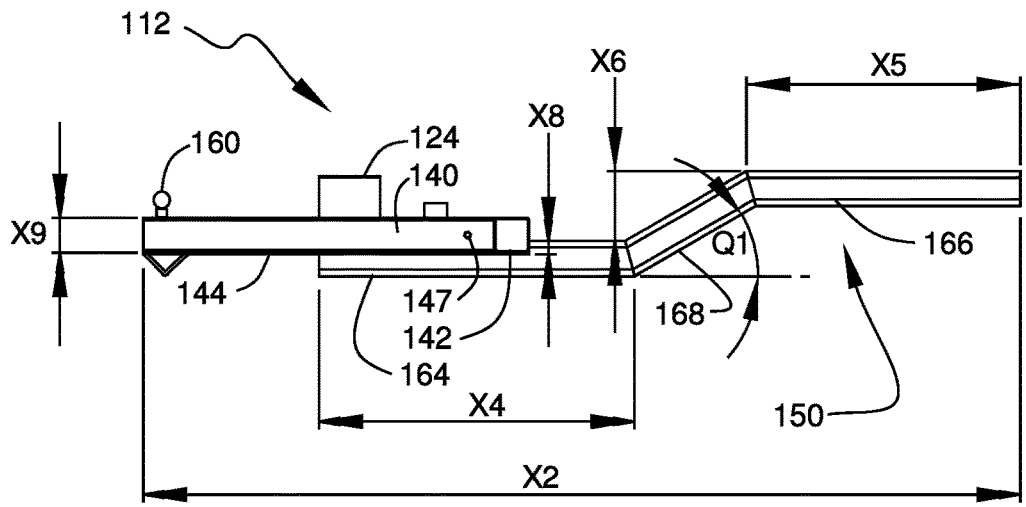
FIG. 8 is a dimensioned side view of the trailer head assembly of FIG. 4.
Figure 9:
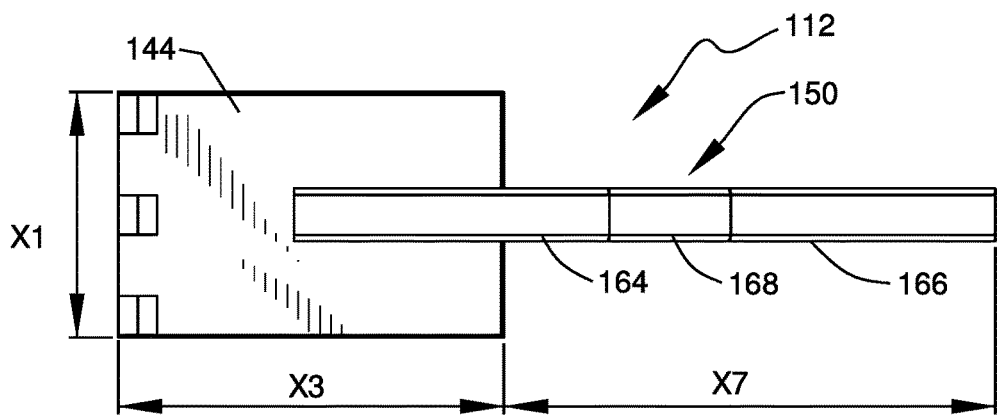
FIG. 9 is a dimensioned bottom view of the trailer head assembly of FIG. 4.

FIG. 7 is a dimensioned top view illustrating the trailer head assembly 112 of FIG. 4. FIG. 8 is a dimensioned side view of trailer head assembly 112. FIG. 9 is a dimensioned bottom view thereof.

According to one embodiment of the present disclosure, and with reference to FIG. 7 through FIG. 9, trailer head assembly 112 comprises an overall width X1 of about 14 inches and an overall length X2 of about 45 inches (excluding hitch member 152). As best illustrated in the bottom view of FIG. 9, plate 144 of support platform 116 fully overlays longitudinal members 140 and transverse member 142, shown, and comprises a length X3 of about 20 inches, a width X1 of about 14 inches, and a thickness of about 0.125 inches. Other dimensions of trailer head assembly 112 may suffice. According to one embodiment of the present disclosure, drawbar 150 may be formed from three tube segments, as shown. The lower segment 164 may be rigidly joined to the lower surface of plate 144 and comprises a length X4 of about 18 inches. The upper segment 166 of drawbar 150 may comprise a length X5 of about 12 inches and may be offset from the lower segment 164 a distance X6 of about 4 inches. An intermediate segment 168 may be provided to rigidly join lower segment 164 and upper segment 166 rising at angle Q1 of about 30 degrees relative to lower segment 164. Other dimensions of drawbar 150 may suffice.

Drawbar 150 projects outwardly from support platform 116 to support hitch member 152 (see FIG. 4) at a projecting distance sufficient to permit towing trailer 102 to articulate about the hitch point of the towing vehicle without interference. According to one embodiment of the present disclosure, drawbar 150 projects outwardly from support platform 116 a distance X7 of about 25 inches. Lower segment 164 of drawbar 150 may be notched to depth X8 of about ¾ inch, allowing drawbar 150 to partially engage support platform 116, as shown. The notched lower segment 164 of drawbar 150 may be permanently joined to support platform 116 by thermal welding. Drawbar 150 may be constructed from steel tubes having an outer dimension of about 2 inches by three inches and a wall thickness of about 14 gauge (0.083 inch).

Longitudinal members 140, transverse member 142, and drawbar 150 may be formed from steel-tube members having a square cross section with an outer dimension X9 of about 2 inches and wall thicknesses of about 14 gauge (0.083 inch). Those of ordinary skill in the art will understand that other design implementations, such as, the use of round tubes in certain designs, the use of rectangular tubes, the use of alternate tube sizes, etc., may suffice.

Figure 10:
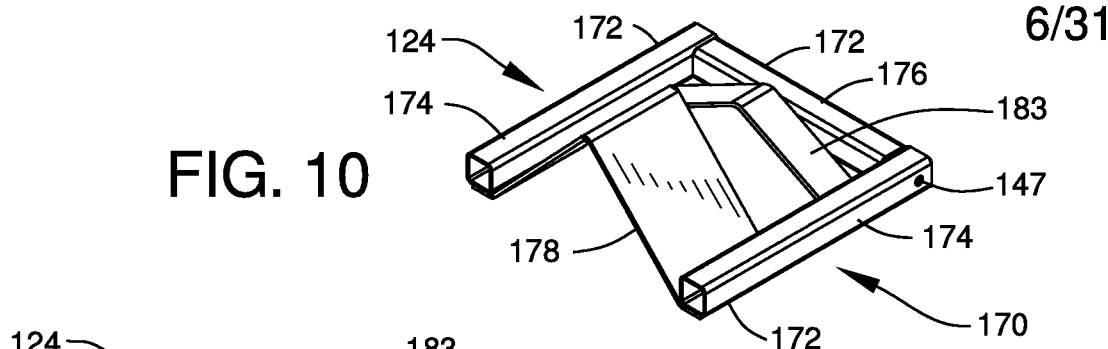
FIG. 10 is a perspective view illustrating a deployable tire stop of the trailer head assembly of FIG. 4.
Figure 11:
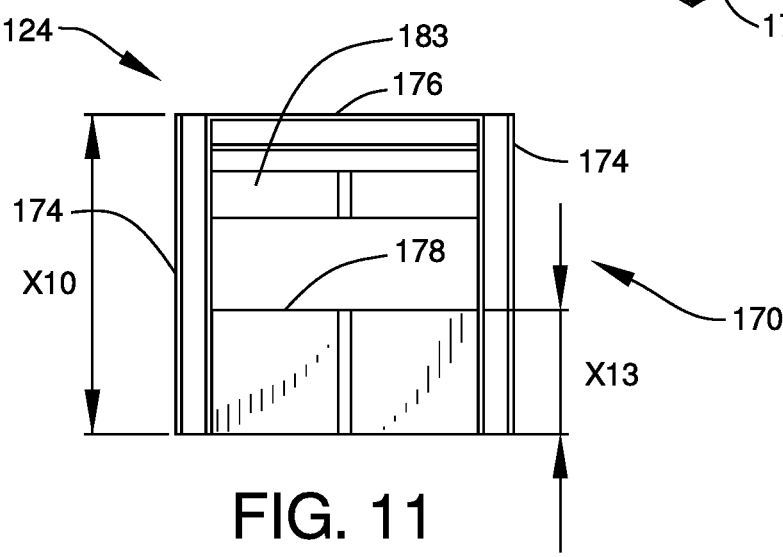
FIG. 11 is a top view of the deployable tire stop of FIG. 4.
Figure 12:
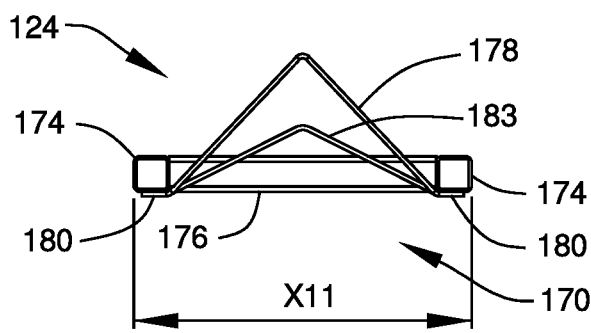
FIG. 12 is an end view of the deployable tire stop of FIG. 4.
Figure 13:
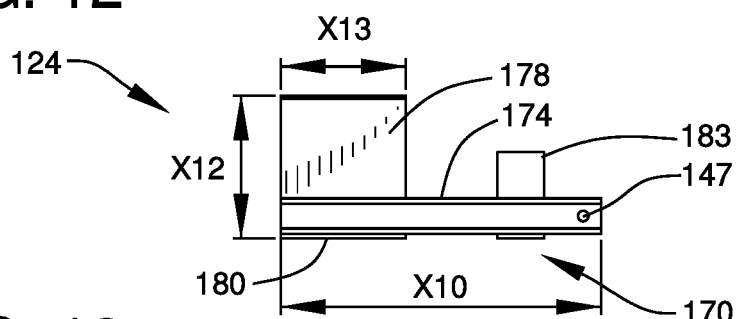
FIG. 13 is a side view of the deployable tire stop of FIG. 4.

FIG. 10 is a perspective view illustrating tire stop 124 of trailer head assembly 112 of FIG. 4. FIG. 11 is a top view of trailer head assembly 112; FIG. 12 is an end view thereof; and, FIG. 13 is a side view thereof, further illustrating one configuration of tire stop 124. In FIG. 10 through FIG. 13, tire stop 124 comprises a U-shaped rigid tubular frame 170 constructed from a plurality of bar-shaped support members 172, including at least two longitudinal members 174 and a transverse member 176. Transverse member 176 may be orthogonally attached to and extends between the longitudinal members 174, as shown. Support members 172 may be constructed from a rigid load-bearing material. According to one embodiment of the present disclosure, support members 172 comprise hollow tubes, for example, hollow steel tubes having a 1-inch square cross section and a wall thickness of about 14 gauge (0.083 inch). Support members 172 are rigidly joined, for example, by thermal welding.

According to one embodiment of the present disclosure, tire stop 124 may comprise a length X10 of about 9 inches and a width X11 of about 9½ inches. A first rigid V-shaped bent plate 178 extends between the two longitudinal members 174 and transverse member 176 forming a stop to limit the forward travel of front wheel 109 of motorcycle 107 (see FIG. 1). Bent plate 178 may be constructed from a steel plate having a thickness of about 0.125 inch. Bent plate 178 may comprise a height X12 of about 4 inches and a length X13 of about 3½ inches. Bent plate 178 comprises a set of mounting flanges 180 that engage the lower surfaces of longitudinal members 174 and may be joined to underside of longitudinal members 174 by thermal welding. A second rigid V-shaped bent plate 183 also extends between the two longitudinal members 174. Second rigid V-shaped bent plate 183 may be attached to tire stop 124 in the same manner as first rigid V-shaped bent plate 178 is attached. Second rigid V-shaped bent plate 183 contacts transverse member 142 when tire stop 124 is deployed to prevent the weight of a towed vehicle from bending deployable tire stop 124. A set of side apertures are preferably provided to receive the bolts or similar pivot shafts forming hinged connection 147.

As shown in FIG. 2 and FIG. 3, towing frame 110 of towing trailer 102 comprises both a left-side tow frame assembly 122 and a right-side tow frame assembly 126. The left-side tow frame assembly 122 comprises a set of interconnectable components that form a rigid supportive structure when combined. Right-side components 120 forming the right-side tow frame assembly 126 are identical opposites to those of the corresponding left-side tow frame assembly 122. Since the right-side tow frame assembly 126 is identically opposite to the left-side tow frame assembly 122, the following description will only make reference to the left-side tow frame assembly 122 and its associated structures with the understanding that the same disclosure also relates to the right-side tow frame assembly 126 and its opposing associated structures.

FIG. 14 is a top view illustrating left-side tow frame assembly 122 of FIG. 2. Left-side tow frame assembly 122 comprises the following connectable components: a first left-side component 127, a second left-side component 128, a third left-side component 130, and a left-side wheel assembly 108 forming the fourth left-side component 132, as shown.

The following illustrations will describe the individual components making up left-side tow frame assembly 122 beginning with the forward-positioned components. In continued reference to the drawings, FIG. 15 is a top view illustrating the first left-side component 127 of left-side tow frame assembly 122. The first left-side component 127 may be composed of two elongated segments identified herein as first portion 182 and second portion 184, as shown. First portion 182 may comprise a length X14 of about 17 inches and second portion 184 may comprise a length X15 of about 22 inches. First portion 182 and second portion 184 are rigidly joined at a reinforced joint 186, as shown.

First portion 182 and second portion 184 each comprise a rigid load-bearing material with a rigid and durable metallic material being one such material. First portion 182 and second portion 184 may comprise hollow tubes, for example, hollow steel tubes having a square cross section, as shown. In one embodiment, second portion 184 may comprise an outer dimension of about 1¾ inches by 1¾ inches and a wall thickness of about 14 gauge (0.083 inch). First portion 182 may comprise a wall thickness of about 14 gauge (0.083 inch) and an outer dimension permitting first portion 182 to be inserted into end opening 154 of the left longitudinal member 140 with a snug, but slidable, telescoping fit (see FIG. 2, 3, and FIG. 5).

First portion 182 and second portion 184 may be joined at reinforced joint 186 by thermal welding. When joined, first portion 182 and second portion 184 are oriented at an angled relationship Q2 that is obtuse, as shown. According to one embodiment of the present disclosure, first portion 182 and second portion 184 are oriented at an angled relationship Q2 of about 120 degrees. Other values for angle Q2 may suffice. When unified within towing frame 110, as generally shown in FIG. 2, first portion 182 of the first left-side component 127 provides a first length 188 of left-side tow frame assembly 122 and second portion 184 provides a first width 190 of the left side of towing frame 110.

First portion 182 comprises a series of closely-spaced apertures 162 configured to interoperate with locking mechanism 160 of trailer head assembly 112. Second portion 184 comprises open end 198 to receive second left-side component 128 (see FIG. 16). Second portion 184 is shown fitted with locking mechanism 200 enabling the above-noted tubular members to be releasably secured together in nested telescoping relation. Locking mechanism 200 may be similar in form and function to locking mechanism 160 described above. In the present implementation, a spring-loaded plunger of locking mechanism 200 may be structurally configured to engage one of a series of closely-spaced apertures 202 formed in first end 214 of the second left-side component 128 (see FIG. 16). The user can slidably adjust the geometric relationship between the first left-side component 127 and the second left-side component 128 by disengaging the right spring-loaded plunger of locking mechanism 200 to permit sliding of the second left-side component 128 to a new position relative to the first left-side component 127. The user can fix the geometric relationship between the first left-side component 127 and the second left-side component 128 by re-engaging the spring-loaded plunger of locking mechanism 200 in the nearest available aperture of closely spaced apertures 202 of second left-side component 128.

In reference to FIG. 15, reinforced joint 186 comprises a set of gussets 192 to increase the strength of the welded junction between first portion 182 and second portion 184. According to one embodiment of the present disclosure, reinforced joint 186 comprises a set of upper and lower gusset plates. FIG. 17 shows a gusset plate arrangement of reinforced joint 186 of second left-side component 128. Gusset plates 222 may be formed of steel and comprise a thickness of about ¼ inch. As generally shown in FIG. 17, a set of inner and outer bent reinforcing plates 224 extend between and are welded to upper and lower gusset plates 222 and the adjoining steel tubes. Although FIG. 17 depicts the general arrangements of the reinforced joint at the second left-side component 128, the gusset arrangements at reinforced joint 186 are similar.

FIG. 16 is a top view illustrating the second left-side component 128 of left-side tow frame assembly 122. The second left-side component 128 is composed of two elongated segments identified herein as first portion 204 and second portion 206, as shown. First portion 204 may comprise a length X16 of about 21 inches and second portion 206 may comprise a length X17 of about 20 inches.

First portion 204 and second portion 206 each comprise a rigid load-bearing material such as a rigid and durable metallic material. First portion 204 and second portion 206 may comprise hollow tubes, such hollow tubes having a square cross section, as shown. Both first portion 204 and second portion 206 may comprise a wall thicknesses of about 11 gauge (0.120 inch). According to one embodiment of the present disclosure, first portion 204 comprises a square outer dimension permitting first portion 204 to be inserted into open end 198 of first left-side component 127 with a snug, but slidable, telescoping fit. Second portion 206 comprises an outer dimension permitting second portion 206 to be inserted into first open end 226 of third left-side component 130 described with respect to FIG. 18.

First portion 204 and second portion 206 are rigidly joined at a reinforced joint 210, as shown. In one arrangement, first portion 204 and second portion 206 are welded together at reinforced joint 210. When joined, first portion 204 and second portion 206 are oriented at an angled relationship Q3 that is a reflex angle. According to one embodiment of the present disclosure, Q3 is about 240 degrees. Other values for Q3 may suffice. The geometry shown in FIG. 16 places second portion 206 of the second left-side component 128 in a substantially parallel orientation with first portion 182 of the first left-side component 127 when the second left-side component 128 and the first left-side component 127 are joined. Furthermore, both second portion 206 and first portion 182 are arranged in a substantially parallel orientation with respect to longitudinal axis 117 when the second left-side component 128 and the first left-side component 127 are joined (see FIG. 2). When integrated within towing frame 110, as generally shown in FIG. 2, first portion 204 of the second left-side component 128 provides a second width 208 of left-side tow frame assembly 122 and second portion 206 provides a second length 209 of the left side of towing frame 110. It should be appreciated that the width of the left side of towing frame 110 is adjustable by selecting how far first portion 204 of second left-side component 128 is inserted into second portion 184 of first left-side component 127. The width of the right side of towing frame is width adjustable in the same manner.

As previously described, first end 214 of first portion 204 comprises a set of closely-spaced apertures 202 designed to interoperate with locking mechanism 200 to allow a user to change the geometric relationship between the second left-side component 128 and the first left-side component 127. Second portion 206 also comprises a set of closely-spaced apertures 202 allowing the second left-side component 128 to adjust the relative position of the third left-side component 130 that contains a corresponding locking mechanism 216 (see FIG. 18).

Referring to FIG. 17, reinforced joint 210 of second left-side component comprises a set of gusset plates that function to increase the strength of the welded junction between first portion 204 and second portion 206. Reinforced joint 210 comprises a set of upper and lower gusset plates 222. Gusset plates 222 may be formed of steel and may comprise a thickness of about ¼ inch. A set of inner and outer bent reinforcing plates 224 extend between and are welded to upper and lower gusset plates 222 and the adjoining steel tubes, as shown. According to one embodiment of the present disclosure, upper and lower gusset plates 222 each comprise at least one tie-down aperture 223, as shown. Tie-down aperture 223 provides a convenient attachment point for tie down straps, bungees, etc., used to secure the motorcycle to the towing frame. Tie-down apertures may be placed in numerous positions on towing frame. Other tie-down apertures 223 are shown for example in FIG. 34.

FIG. 18 is a top view illustrating the third left-side component 130 of left-side tow frame assembly 122. As with the prior-described components, third left-side component 130 may be formed from a rigid load-bearing material such as a rigid and durable metallic material. Third left-side component 130 comprises a hollow tube such as a single length of hollow steel tube having a square cross section, as shown. According to one embodiment of the present disclosure, third left-side component 130 may comprise an overall length X18 of about 27 inches, an outer dimension of about 1-34 inches by 1¾ inches, and a wall thickness of about 14 gauge (0.083 inch). Those of ordinary skill in the art will now understand that use of round tubes in certain designs, the use of rectangular tubes, the use of alternate tube sizes, etc., may suffice.

Third left-side component 130 comprises first open end 226 and an opposing second open end 228, as shown. In normal use, first open end 226 is structurally configured to receive second portion 206 of the second left-side component 128 with a snug, but slidable, telescoping fit. In normal use, second open end 228 is structurally configured to receive fourth left-side component 132, as will be described below. Third left-side component 130 further comprises a pair of locking mechanisms 216, as shown. One locking mechanism 216 is located on the upper face of the tube near first open end 226 with the other located on the upper face of the tube near second open end 228, as shown. Both locking mechanisms 216 comprise the same aperture-engaging structures as locking mechanism 160 and respectively function to releasably retain the second left-side component 128 and fourth left-side component 132 within the third left-side component 130.

Figure 52:
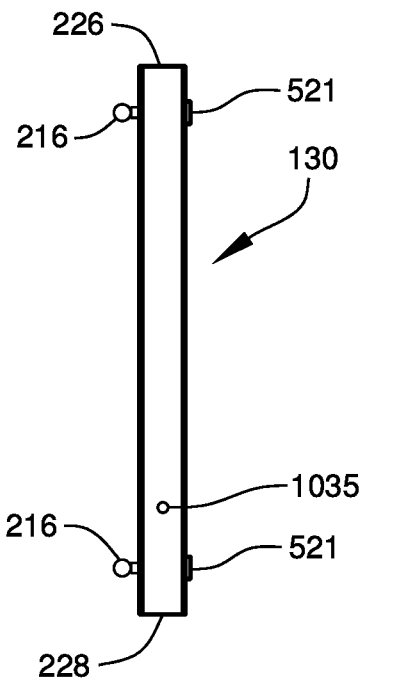
FIG. 52 is a side view of the third left-side component of FIG. 18.
Figure 53:
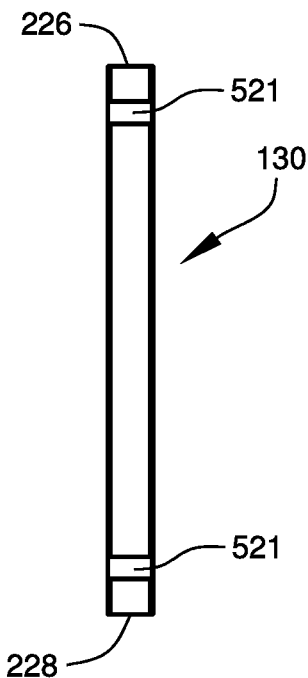
FIG. 53 is a bottom view of the third left-side component of FIG. 18.

FIG. 52 is a side view of the third left-side component of FIG. 18. FIG. 53 is a bottom view of the third left-side component of FIG. 18. According to one embodiment of the present disclosure, underside of third left-side component 130 comprises two bars 521, one bar 521 near first open end 226 and another bar 521 near second open end 228, as shown. Bars 521 function to prevent any tie down straps, bungees, etc., that may be tied around and secured to third left-side component 130 from contacting the ground surface to prevent damage when chassis 104 is lowered (such lowering described further herein).

According to one embodiment of the present disclosure, a slidable sleeve (not shown) may be provided on the third left-side component 130, as shown. Such a sleeve may comprise a hollow steel tube that may be installed over the third left-side component 130. Such sleeve may be arranged to be slidable to a user-selected position along the third left-side component 130 and functions as an attachment point for tie down straps, bungees, etc., used to secure motorcycle to the towing frame. According to one embodiment of the present disclosure, sleeve may have a length of about 6 inches.

The upper face of third left-side component 130 may be fitted with an aperture 266D to receive mounting pin 233 of mounting bracket 242 of cross bars 131 (described below). When assembled within towing frame 110, third left-side component 130 is in parallel orientation with respect to longitudinal axis 117, as shown in FIG. 2 (see also FIG. 14). When third left-side component 130 is joined with the second left-side component 128, third left-side component 130 provides a third length 234 of towing frame 110. In is noted that the telescoping frame assembly permits third length 234 to be user adjustable to allow length of chassis 104 to be modified to accommodate specific towing applications.

Figure 19:
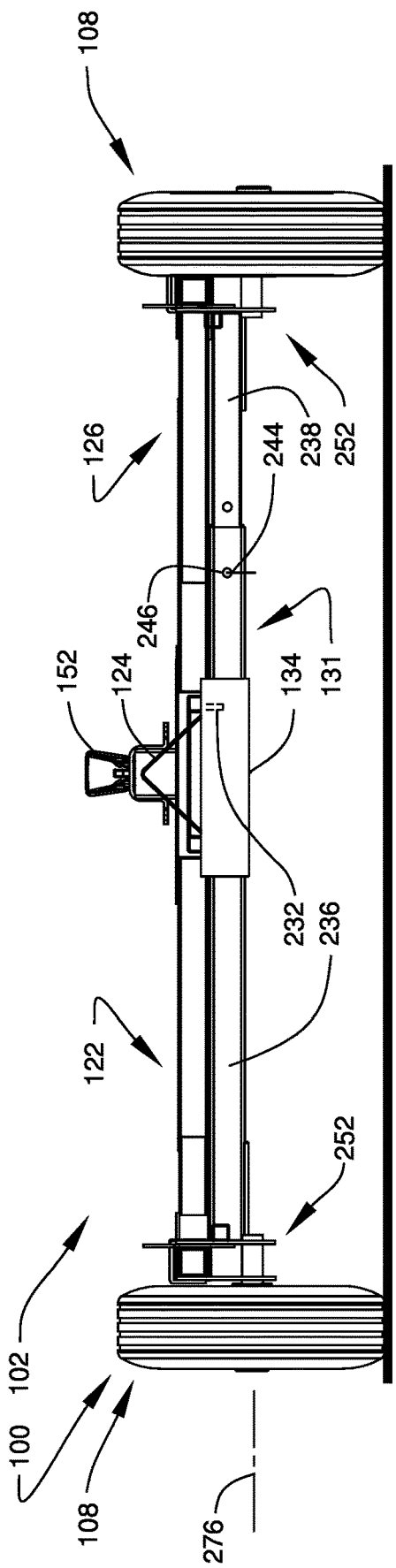
FIG. 19 is a rear view of the towing trailer of FIG. 1.
Figure 20:
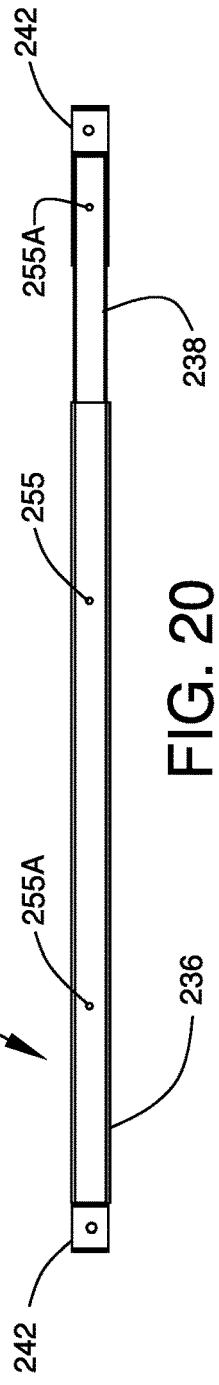
FIG. 20 is a top view illustrating one of two cross bars implemented within the towing trailer of FIG. 1.
Figure 21:
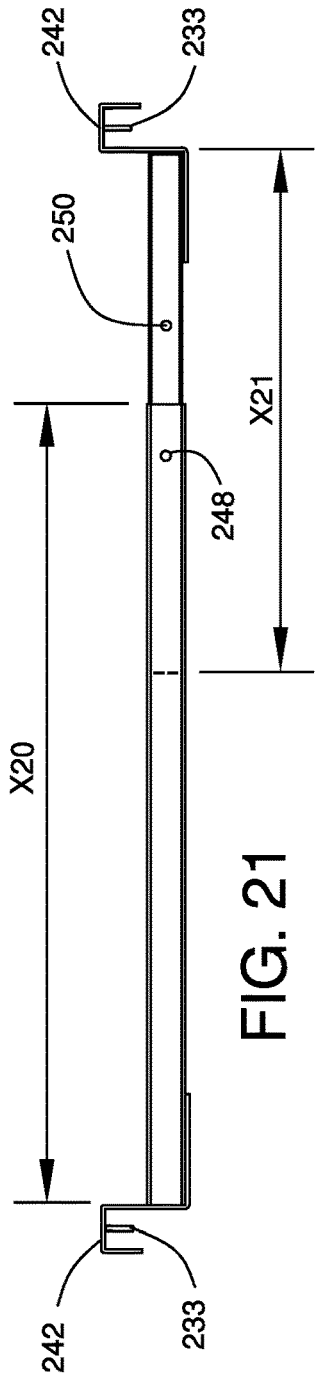
FIG. 21 is a side view of the cross bar of FIG. 20.

FIG. 19 is a rear view of towing trailer 102 of FIG. 1. FIG. 20 is a top view illustrating one of the two cross bars 131 implemented within towing trailer 102. FIG. 21 is a side view of cross bar 131 of FIG. 20. Towing frame 110 comprises a set of removable cross bars 131. One cross bar 131 of the set spans between third left-side component 130 of left-side tow frame assembly 122 and the corresponding third right-side component of right-side tow frame assembly 126, as shown. The other cross bar 131 of the set spans between fourth left-side component 132 and the corresponding fourth right-side component of right-side tow frame assembly 126 (see FIG. 1). Cross bars 131 are oriented generally perpendicular to longitudinal axis 117 (see FIG. 2) and provide additional lateral support to stabilize the frame assembly. Cross bars 131 provide a support point for rear wheel 133 of motorcycle 107 (see FIG. 1). A removable ramp plate 134 may be installed on top of cross bars 131 to assist in moving motorcycle 107 over and onto cross bars 131.

Each cross bar 131 is comprises two elongated segments identified herein as first portion 236 and second portion 238, as shown. First portion 236 may comprise a length X20 of about 44.5 inches and second portion 238 may comprise a length X21 of about 39 inches. It is noted that pin 232 passes through aperture 255 on first portion 236 and another aligned aperture on second portion 238.

First portion 236 and second portion 238 may be constructed from a rigid load-bearing material such as a rigid and durable metallic material. First portion 236 and second portion 238 may comprise hollow tubes, such as hollow steel tubes having a square cross section, as shown. According to one embodiment of the present disclosure, first portion 236 comprises an outer dimension of about 2 inches by 2 inches and a wall thickness of about 14 gauge (0.083 inch). Second portion 238 may comprise a wall thickness of about 14 gauge (0.083 inch) and an outer dimension permitting second portion 238 to be inserted into the open end of first portion 236 with a snug, but slidable, telescoping fit.

First portion 236 and second portion 238 are fitted with locking mechanism 244 enabling the tubular members to be releasably secured together in nested telescoping relation. Locking mechanism 244 may comprise a pinned connection. In such an arrangement, a locking clevis pin 246 may be passed through a side-positioned aperture 248 of first portion 236 to engaged one of a series of closely-spaced apertures 250 formed in second portion 238 of cross bar 131. Only one aperture of the series of closely-spaced apertures 250 is shown exposed in FIG. 21. The user can adjust the width of cross bar 131 by telescopically sliding second portion 238 within first portion 236 until the required width is achieved. The amount of width adjustment will depend on the number and spacing of the closely-spaced apertures 250. The user can fix the assembly in the selected position by engaging locking mechanism 244 as described above.

First portion 236 and second portion 238 each comprise a mounting bracket 242 configured to engage a respective left-side tow frame assembly 122 and right-side tow frame assembly 126. Each mounting bracket 242 may be constructed from a steel plate that is bent to form a saddle-shaped member structurally configured to rest on, for example, the upper face of third left-side component 130 or fourth left-side component 132 (along with the corresponding right-side component). Mounting bracket 242 may be provided with a mounting pin 233. Each mounting pin 233 may be constructed from section of steel rod and may be rigidly attached to mounting bracket 242 using thermal welding. Mounting pin 233 may be structurally configured to removably engage aperture 266D of third left-side component 130 (see FIG. 14 and aperture 266B or 266C (see FIG. 23) of fourth left-side component 132. According to one embodiment of the present disclosure, regarding the left side assembly, mounting pin 233 from the left side of a first cross bar 131 passes through aperture 266D (see FIG. 18) and aperture 266B (see FIG. 23). The corresponding right side is similarly connected. Mounting pin 233 from the left side of a second cross bar 131 passes through aperture 266C. Again, the corresponding right side is similarly connected. Additional mounting pins and additional corresponding apertures may be used in other implementations of the present disclosure.

Removable ramp plate 134 may be constructed from a steel plate bent to form a double-sided ramp, as shown in FIGS. 2 and 3. Ramp plate 134 may be provided with central platform 258 that rests over the upper faces of the supporting cross bars 131, as shown. The underside of central platform 258 may be fitted with a set of downwardly projecting steel pins 232 (only one pin is viewable in FIG. 19) that engage receiving apertures 255 (one exposed aperture 255 on each cross bar 131) located within the upper surface of the supporting cross bars 131, as shown. When two cross bars 131 are mounted, receiving apertures 255 may be considered a pair of apertures (see FIG. 3 cross bars). Since three sets of receiving apertures 255 are present as shown in FIG. 3, this arrangement embodies an alignment of apertures in three pairs of two apertures. Central platform 258 secures the supporting cross bars in place when pins 232 of central platform 258 of ramp plate 134 engage the apertures of the cross bars 131. Additional apertures, and additional pins, may be included in other implementations of the present disclosure. For example, to tow a trike, an additional set of apertures 255A are needed (as well as an additional ramp plate 134) since the trike has two rear tires. Removable ramp plate 134 may be installed on top of cross bars 131 to assist in moving motorcycle 107 over and onto cross bars 131 in addition to providing a support point for rear wheel 133 of motorcycle 107. If ramp plate 134 is not used, the height of cross bars does not prohibit pushing or riding motorcycle 107 or a similar device onto towing trailer. The height of cross bars should not be so large that pushing or riding motorcycle 107 onto towing trailer 102 will be prohibited.

Another important implementation of towing system 100 is the previously-noted adjustment feature that enables the supportive chassis of the trailer to be lowered to the ground, thus allowing a user to either push a motorcycle into position on the trailer, or ride into such position. In specific reference to towing trailer 102, supportive chassis 104 of the trailer comprises a set of raising and lowering mechanisms enabling the raising and lowering of towing trailer 102. Such raising and lowering mechanisms are integrated within the two trailing wheel assemblies 108 of chassis 104. The fourth left-side component 132 of left-side tow frame assembly 122 comprises one of the two wheel assemblies 108 and therefore contains one such raising and lowering mechanism 252.

Figure 22:
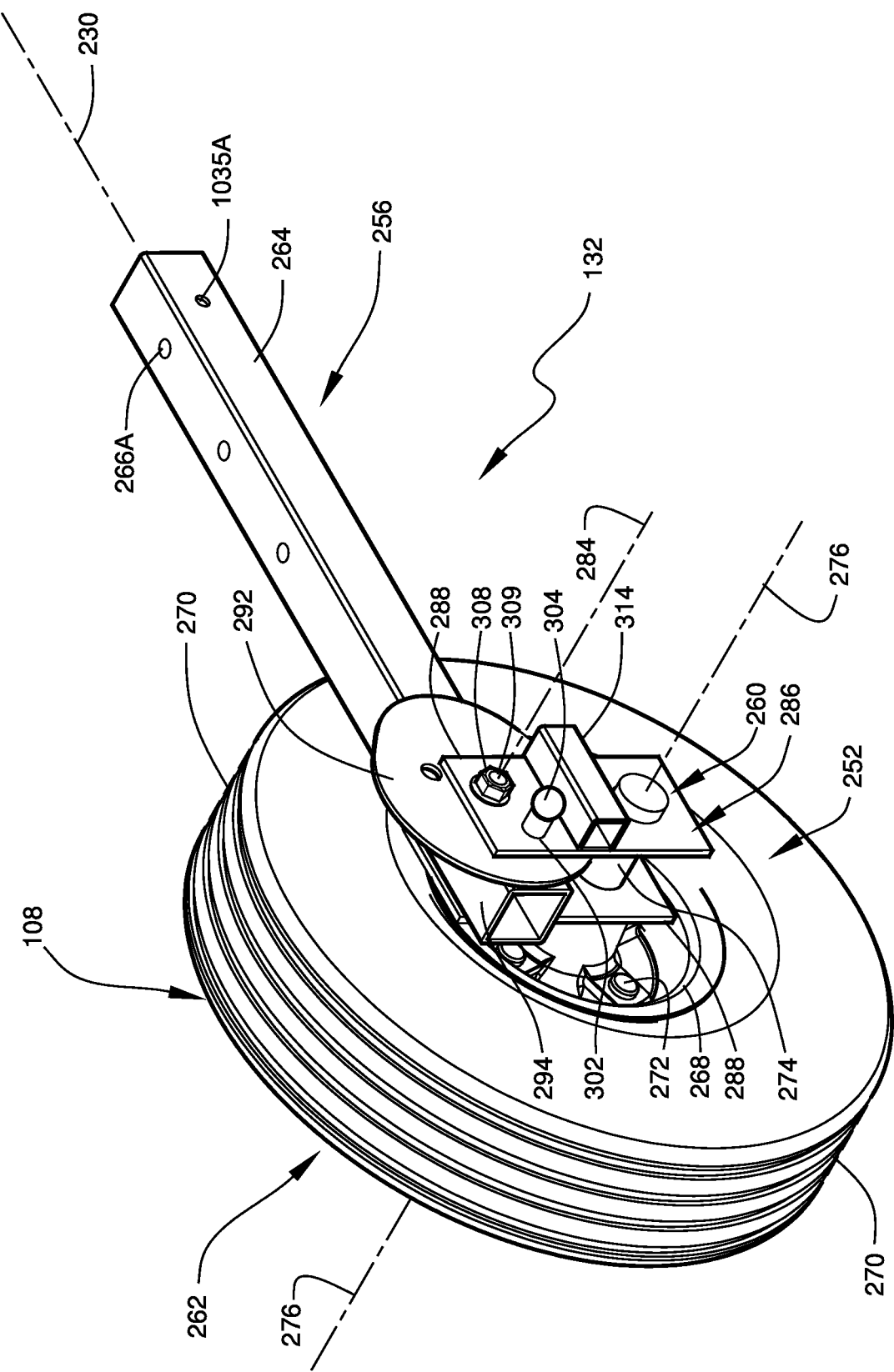
FIG. 22 is a perspective view illustrating a left-side wheel assembly forming a fourth left-side component of the left-side tow frame assembly of FIG. 14.

FIG. 22 is a perspective view illustrating the left-side wheel assembly 108 forming the fourth left-side component 132. FIG. 23 is an exploded view showing sub-components of the fourth left-side component 132. The fourth left-side component 132 comprises a left-side coupling bar 256 (a frame insertion member) and stub axle assembly 260 to which a wheel 262 may be rotationally attached. Wheel 262 and stub axle assembly 260 are joined to coupling bar 256 by the left-side raising and lowering mechanism 252 of the fourth left-side component 132, as shown.

Referring to FIG. 23, coupling bar 256 comprises an elongated tubular element 264. According to one embodiment of the present disclosure, tubular element 264 comprises a hollow steel tube having a length X22 of about 21 inches and a square outer dimension permitting tubular element 264 to be inserted into the rear-facing open end of the third left-side component 130 with a snug, but slidable, telescoping fit. Tubular element 264 comprises a set of apertures located along the upper face of the engaging end, as shown. Aperture 266A interoperates with locking mechanism 216 near open end 228 (see FIG. 18) to lock fourth left-side component 132 within third left-side component 130 when the two members are joined (see, e.g., FIGS. 2 and 14). When the two members are joined as shown in FIG. 2, longitudinal axis 230 of tubular element 264 is in a parallel orientation with longitudinal axis 117.

Each wheel 262 comprises a central wheel rim 268 on which tire 270 may be mounted, as shown. According to one embodiment of the present disclosure, tire 270 comprises a rubber-pneumatic trailer tire having a 4.80×8 size configuration. As the diameter of the wheel/tire assembly influences the operational characteristics of raising and lowering mechanism 252, it will be helpful in the subsequent discussion to note that most commercially-available 4.80×8 tires comprise a diameter averaging about 16 inches.

Stub axle assembly 260 includes mounting hub 272 and spindle 274. Mounting hub 272 is rotationally coupled to spindle 274 and may be adapted to support wheel rim 268 by way of a bolted connection (such arrangement embodying a wheel attachment member). Spindle 274 defines an axis of rotation 276, about which wheel 262 and mounting hub 272 freely rotate. Such axis of rotation 276 can be aligned perpendicularly to both the longitudinal axis 230 of tubular element 264 and longitudinal axis 117, as shown. It is noted that the use of stub axle assembly 260 eliminates the need for a continuous axle member joining the left-side tow frame assembly 122 and right-side tow frame assembly 126, thus providing additional ground clearance and ease in disassembling the trailer apparatus.

A set of bearings 278 are located between the central spindle 274 and mounting hub 272 to permit low-friction rotation of the assembly about axis of rotation 276. A threaded end nut 280 may be fastened to spindle 274 to secure the bearings, hub, and wheel to the spindle. The assembly may also include additional components such as spacers, thrust washers, grease seals, etc. An outer cap 282 may be secured to mounting hub 272 to seal the bearing assembly from the outside environment. It should be appreciated that the axle assembly may also support a brake drum or a rotor for disc brakes (not shown) in other implementations.

Raising and lowering mechanism 252 may be structurally configured to join spindle 274 and coupling bar 256 in an adjustable relationship. More specifically, raising and lowering mechanism 252 establishes a second axis of rotation 284 about which spindle 274 and the associated axis of rotation 276 pivot in relation to coupling bar 256.

Raising and lowering mechanism 252 comprises pivot arm 286 having a pair of spaced apart and parallel-arranged plates 288 that are connected by spindle 274 extending transversely therebetween, as shown. The space between plates 288 defines a gap 306 having a width D1 that permits pivot arm 286 to engage fourth left-side component 132, as described below. Both plates 288 may be constructed from steel and are rigidly joined to spindle 274 by, for example, thermal welding. In alternate implementations of the present system, the proximal end of spindle 274 may be supported in a stub-axle sleeve. In this alternate arrangement, the stub-axle sleeve comprises a hollow steel tube welded to plates 288 and spindle 274. In this alternate arrangement, spindle 274 may be firmly retained within the stub-axle sleeve in coaxial relation using a press fit or a welded connection. It is noted that the corresponding fourth right-side component of fourth left-side component 132 will be a mirror image of fourth left-side component 132. Thus, clockwise and counterclockwise directions implemented by a user with lever arm 320 will be reversed with respect to the right-side component.

FIG. 24 is a side view of a pivot arm 286 of the left-side raising and lowering mechanism 252. According to one embodiment of the present disclosure, both the inner and outer plates 288 may comprise a length X23 of about 6 inches and a width X24 of about 3 inches. Plate 288A of pivot arm 286 is shown with two apertures comprising one pivot aperture 300 and one locking aperture 302. It is noted that the angular measurements noted herein are to the center of the respective apertures, unless noted otherwise.

According to one embodiment of the present disclosure, pivot aperture 300 may be separated from axis of rotation 276 at spindle 274 by an axle-to-pivot distance c of about 3⅞ inches and, relative to the axle-to-pivot reference line 338, may be separated from locking aperture 302 by an angle of separation Q7 of about 21 degrees. The center of locking aperture 302 falls on a circular path 303 having a radius R1 originating at the center of pivot aperture 300, as shown. More specifically, locking aperture 302 may be located at the intersection of circular path 303 and line tangential to circular path 303 extending from axis of rotation 276.

Referring to FIG. 22 and FIG. 23, locking aperture 302 of pivot arm 286 is fitted with locking mechanism 304 of a design similar to the spring-loaded locking mechanism 160. Locking mechanism 304 may be coaxially centered over locking aperture 302, as shown, and may be permanently joined with plate 288A by thermal welding.

FIG. 25 is a side view of coupling bar 256 and associated components of the left-side raising and lowering mechanism 252. In reference to FIG. 25 and in continued reference to FIG. 23, left-side raising and lowering mechanism 252 further comprises an ovoid-shaped plate identified herein as disc 292. Disc 292 may be constructed of steel and may be permanently joined with second end 294 of the left-side tubular element 264 by thermal welding. According to one embodiment of the present disclosure, disc 292 has an overall length X26 of about 6 inches and a maximum outer radius R2 of about 2¼ inches. Disc 292 includes a plurality of apertures designed to interoperate with pivot aperture 300 and locking aperture 302 of pivot arm 286, as further described below.

Figure 26:
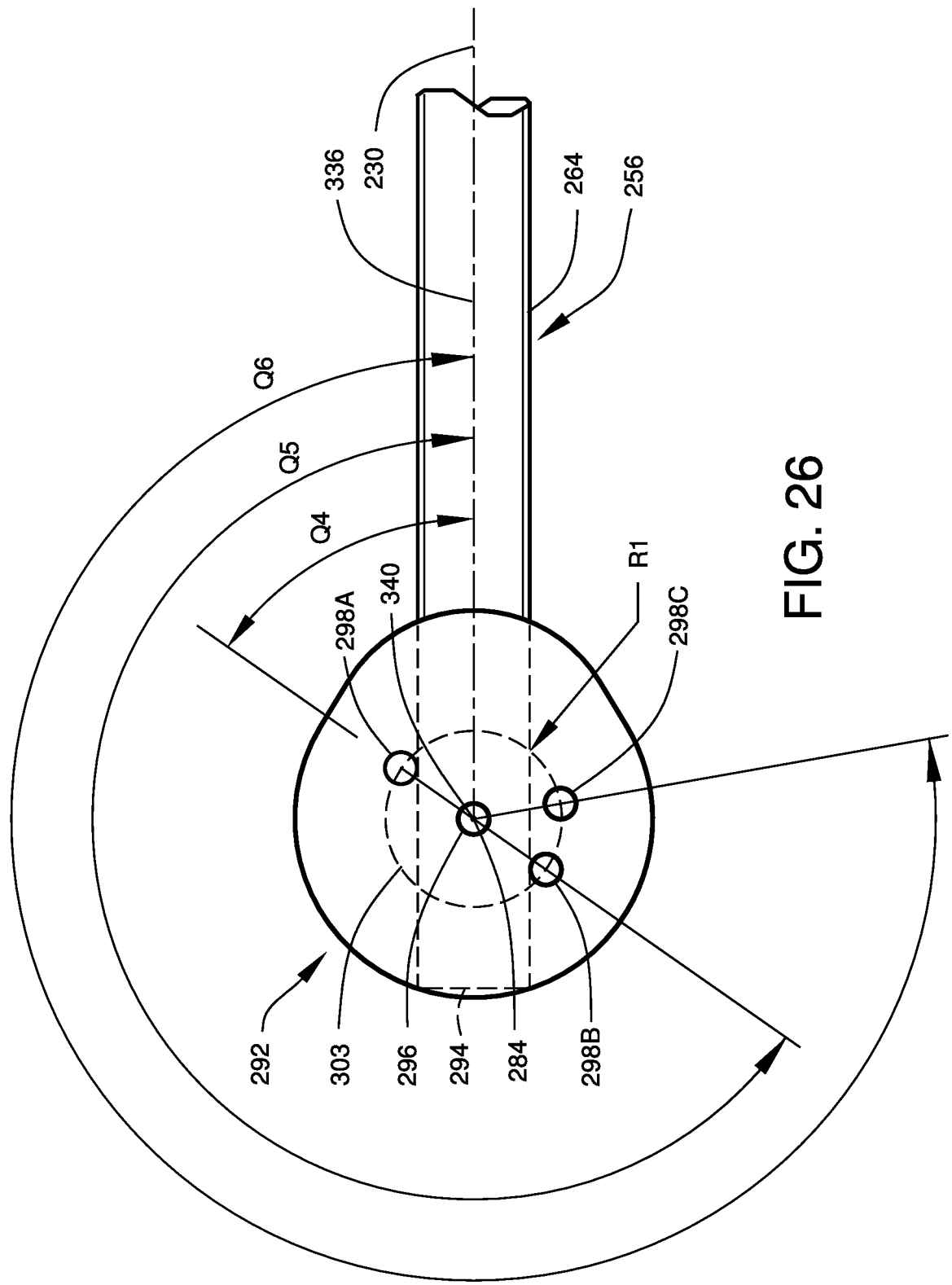
FIG. 26 is an enlarged side view illustrating in greater detail the configuration of a locking disc of the coupling bar of the fourth left-side component of FIG. 22.

FIG. 26 is an enlarged side view illustrating the configuration of disc 292 in greater detail. Disc 292 contains four apertures comprising a first centrally-positioned aperture 296 and three locking apertures spaced about centrally-positioned aperture 296, as shown. For clarity of description, the three locking apertures will be identified individually as locking aperture 298A, locking aperture 298B, and locking aperture 298C. Each locking aperture may be spaced from the centrally-positioned aperture 296 at the same center-to-center distance R1 (defining circular path 303) used at pivot arm 286, thus establishing a common aperture-spacing relationship between the two components.

With reference to FIG. 25, centrally-positioned aperture 296 is shown located at the origin of radius R2 and centered equidistantly from the top and bottom surfaces of tubular element 264, as indicated by the dashed-line depiction. FIG. 26 will be used to describe one spacing arrangement of the locking apertures about centrally-positioned aperture 296. For clarity of description, standard polar coordinates will be used and will be measured relative to a zero-degree reference line 336 passing through the center of centrally-positioned aperture 296 and oriented parallel with the longitudinal axis 230, as shown. The angular measurements are to the center of the apertures, unless noted otherwise. One implementation of the present system places aperture 298A at angle Q4 of about 55 degrees from reference line 336. Locking aperture 298B may be located at an angle Q5 of about 235 degrees from reference line 336, which separates locking aperture 298B and aperture 298A by about 180 degrees, as shown. Locking aperture 298C may be located at an angle Q6 of about 280 degrees from reference line 336, which places locking aperture 298C at a separation from aperture 298B of about 45 degrees.

Referring to FIG. 22 and FIG. 23, raising and lowering mechanism 252 is assembled by engaging second end 294 of left-side tubular element 264 within gap 306 of pivot arm 286 and coaxially aligning the centrally-positioned aperture 296 of disc 292 and pivot aperture 300 (see FIG. 24) of pivot arm 286. This allows a central pivot shaft 308, such as a threaded bolt or similar fastener, to be passed through both centrally-positioned apertures. Once installed, pivot shaft 308 may be secured in place with a lock nut 309 or similar retainer.

When assembled, pivot shaft 308 defines a common axis of rotation 284, about which pivot arm 286, stub axle assembly 260, and wheel 262 rotate relative to both disc 292 and tubular element 264 of fourth left-side component 132. When assembled, plates 288 of pivot arm 286 and disc 292 may be rotated relative to one another about axis of rotation 284. As plate 288A and disc 292 are rotated relative to one another, it will be appreciated that at least one locking aperture 302 of plate 288A comes into alignment with one of the locking apertures of disc 292 at a plurality of positions which correspond to one of three height settings of the trailer assembly described in greater detail below.

When a user wishes to adjust the height setting of towing trailer 102, the user disengages locking mechanism 304 and rotates pivot arm 286 to a selected position. As pivot arm 286 nears a locking aperture of disc 292, the spring-loaded plunger of locking mechanism 304 will become aligned with the locking aperture. Locking mechanism 304 will move the spring-loaded plunger into a position of engagement with the aligned locking aperture. This locks the position of pivot arm 286 relative to disc 292 and tubular element 264 to prevent further relative movement. Such adjustment of axis of rotation 276 and spindle 274 has the effect of raising or lowering chassis 104 relative to ground surface 119.

Figure 27:
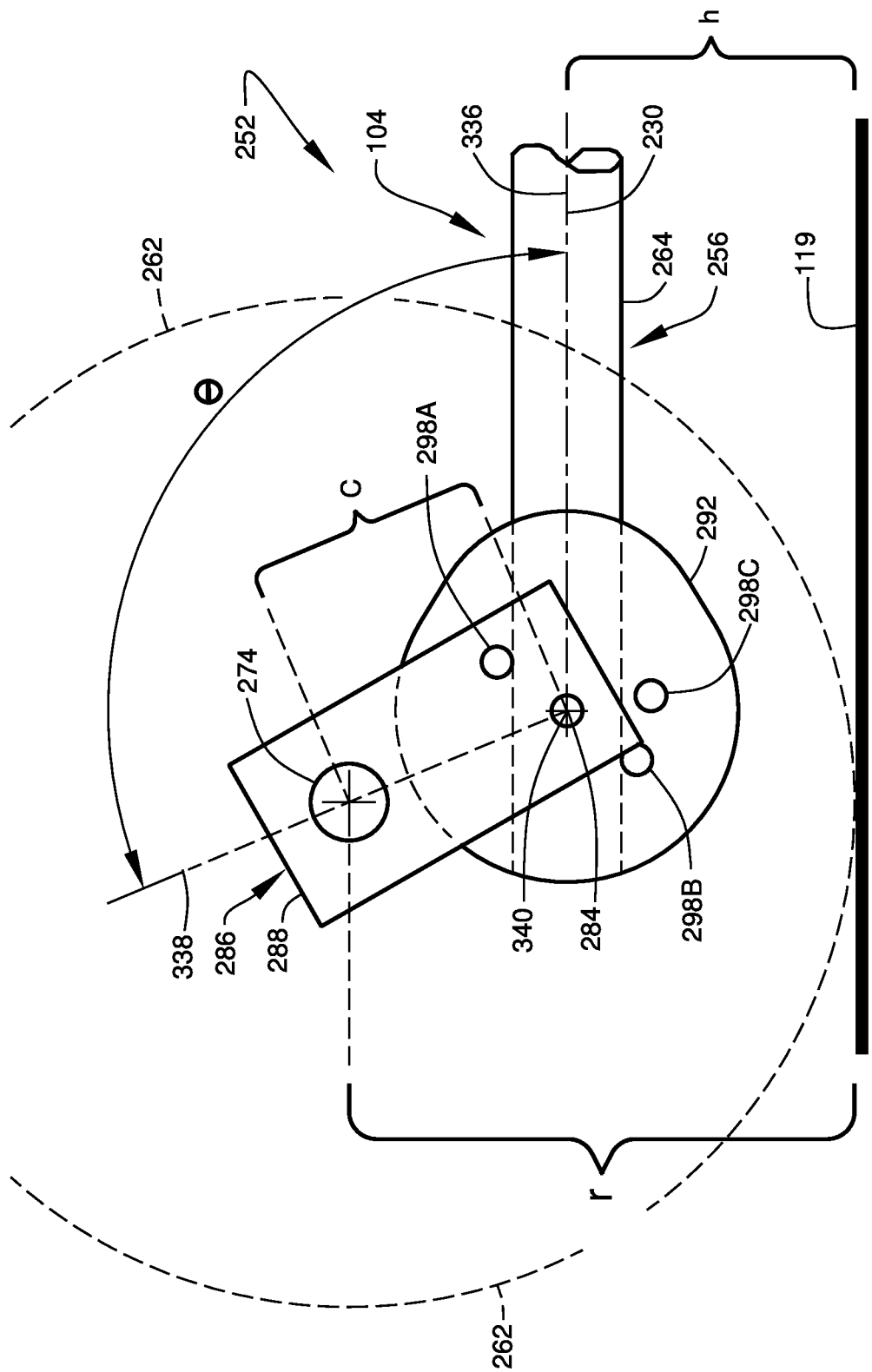
FIG. 27 is a diagram illustrating geometric, positional, and kinematic features of the raising and lowering mechanism of the fourth left-side component of FIG. 22.

FIG. 27 is a diagram, illustrating the geometric, positional, and kinematic features of raising and lowering mechanism 252. The diagram includes schematic depictions of pivot arm 286, disc 292, chassis 104, wheel 262 and ground surface 119. For clarity of description, tubular element 264 will be used to represent the chassis 104 of towing trailer 102.

The operational kinematics of raising and lowering mechanism 252 may be generally expressed by the equation $h = -c \sin(\theta) + r$, where h=distance between ground surface 119 and chassis 104 at axle-to-pivot reference line 338 (pivot point 340); $\theta$=Angle (counter-clockwise) between horizontal (ground surface 119) and axle-to-pivot reference line 338; c=Axle-to-pivot distance; and r=radius of wheel 262. The above equation describes the height, h, of both chassis 104 and its pivot point 340 (concurrent with axis of rotation 284) above the horizontal ground surface 119. The variable theta ($\theta$) represents the counter-clockwise angle measured between the rightward-pointing horizontal axis of reference line 336 and the reference line 338 formed between axis of rotation 276 of wheel 262 and the trailer's pivot point 340 (concurrent with axis of rotation 284). As previously noted, angle theta ($\theta$) can be fixed by engaging locking mechanism 304 to restrain relative movement between pivot arm 286 and disc 292 (see FIG. 22). The constants c and r represent the length between the pivot point 340 and axis of rotation 276 at spindle 274, and the radius of the wheel 262, respectively. The approximate vertical translation of chassis 104, relative to ground surface 119, as raising and lowering mechanism 252 is manipulated through a 360-degree rotation is shown in FIG. 54.

Figure 54:
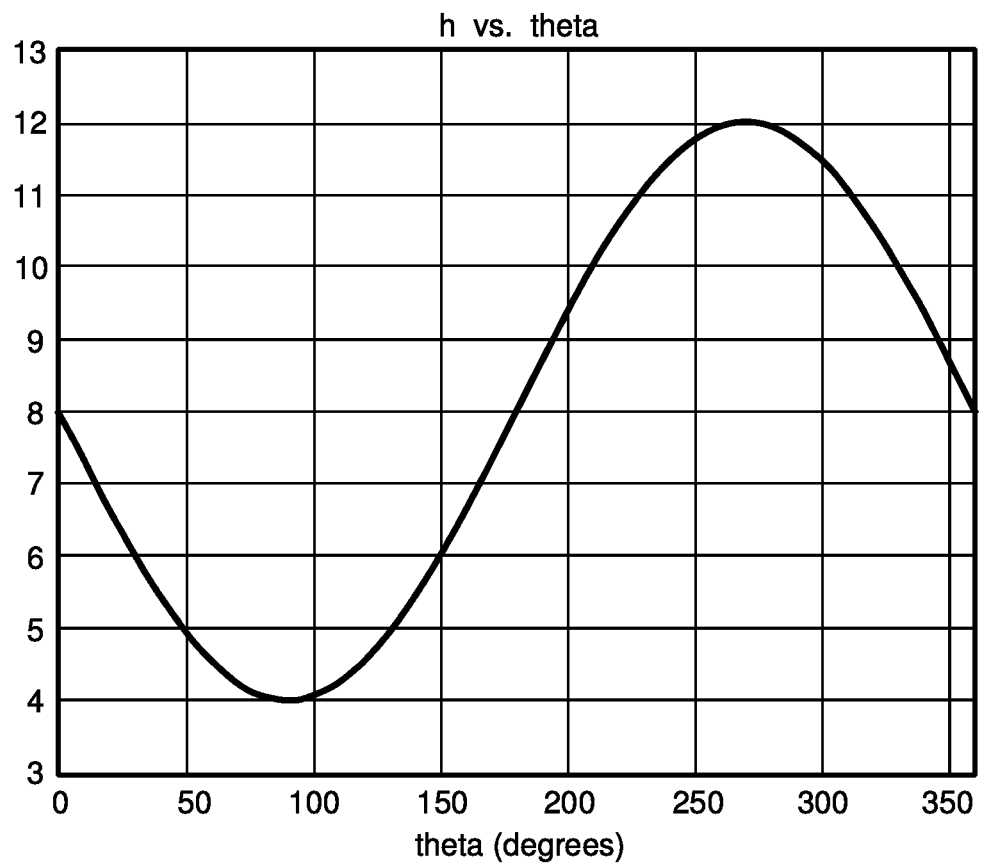
FIG. 54 is a plot of the approximate vertical translation of a chassis of a towing trailer of the present disclosure relative to ground surface as the raising and lowering mechanism of the present disclosure is manipulated through a 360-degree rotation.

The plot data of FIG. 54 was derived from the above-noted equation using an input value for c of 3⅞ inches and a wheel radius r of 8 inches (this radius was selected for the example as it is closely equivalent to a 4.80×8 trailer tire having a diameter of about 16 inches). It is noted that the 360-degree rotational range shown in FIG. 54 is for illustrative purposes only, as the actual freedom of rotation of raising and lowering mechanism 252 is limited to less than 360 degrees by the physical constraints of the assembly.

FIG. 54 shows that as pivot arm 286 of raising and lowering mechanism 252 is rotated, the height of chassis 104 relative to ground surface 119 rises and falls in a sinusoidal pattern. The unusual kinematics expressed by manipulation of raising and lowering mechanism 252 may be used in the present implementation to place towing trailer 102 in at least three distinct elevations relative to ground surface 119. More specifically, raising and lowering mechanism 252 establishes a sequence of user-selectable height settings, wherein chassis 104 may be raised from a low loading position to a high towing position followed by a drop to a second towing position located between the highest and lowest positions. For example, in the depicted implementation of present disclosure, the counter-clockwise sequential engagement of locking mechanism 304 with the locking apertures of disc 292 yields a chassis height h of about 4.8 inches when aperture 298A is engaged; a chassis height h of about 11.2 inches when aperture 298B is engaged; and a chassis height h of about 8.7 inches when aperture 298B is engaged. With regard to angle theta ($\theta$), the counter-clockwise sequential engagement of locking mechanism 304 with the locking apertures of disc 292 yields an angle theta ($\theta$) of about 124 degrees at aperture 298A; an angle theta ($\theta$) of about 235 degrees at aperture 298B; and an angle theta (θ) of about 305 degrees when aperture 298B is engaged. It should be noted that the unusual kinematics of the system allow a single-direction rotation of raising and lowering mechanism 252 to both raise and lower the height of chassis 104 relative to ground surface 119.

Figure 28:
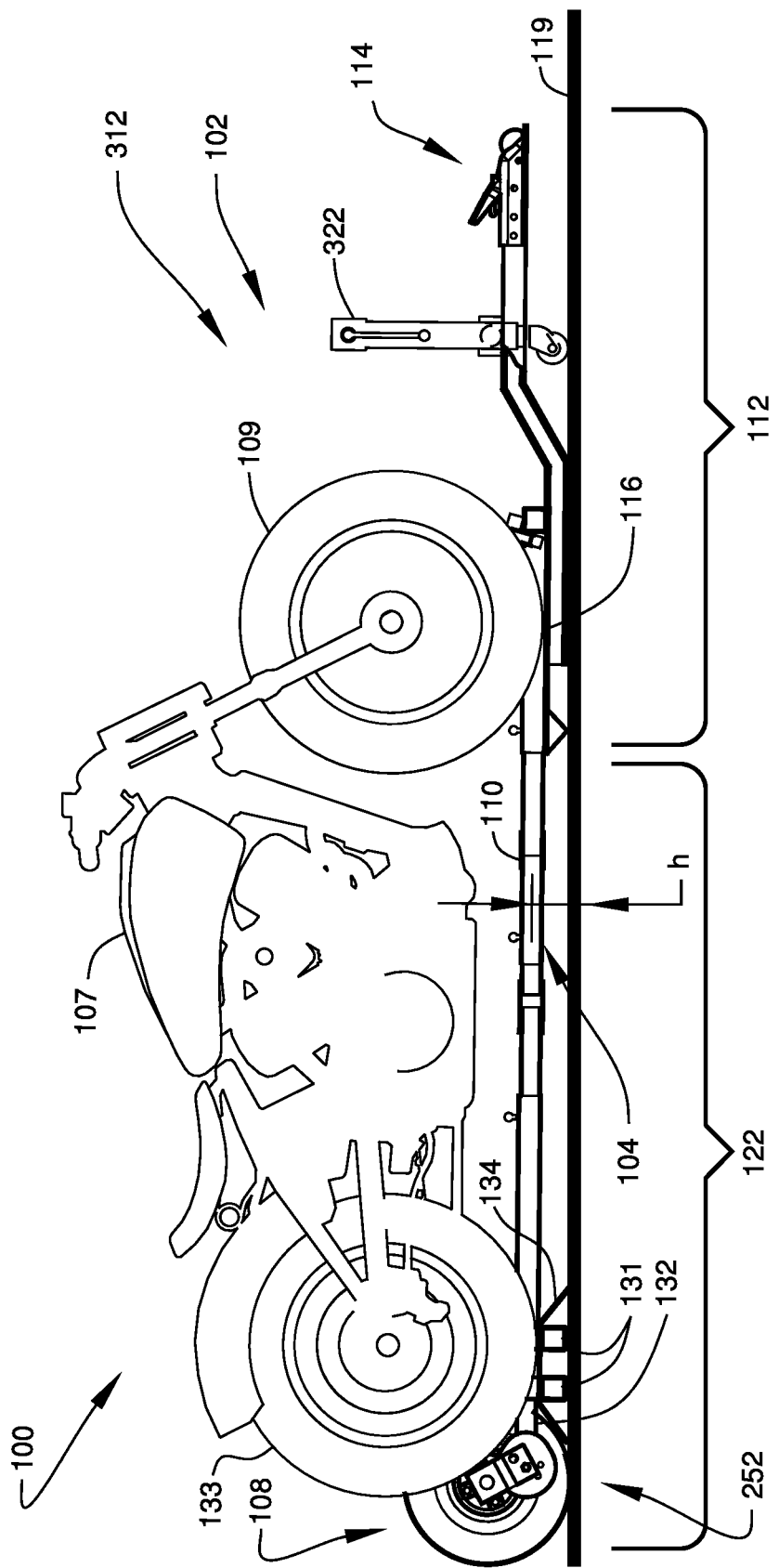
FIG. 28 shows the sectional view 28-28 of FIG. 1 illustrating a second vehicle mounted on an assembled towing trailer that has been lowered to a first height setting allowing the second vehicle to be pushed or ridden onto and off the trailer.

FIG. 28 shows the sectional view 28-28 of FIG. 1, illustrating motorcycle 107 mounted on an assembled towing trailer 102 that has been lowered to a first height setting 312 allowing motorcycle 107 to be pushed or ridden onto and off the trailer. Visible in FIG. 28 is trailer head assembly 112, the left-side tow frame assembly 122, and cross bars 131 resting on ground surface 119. Front wheel 109 of motorcycle 107 is shown supported on support platform 116 of trailer head assembly 112. Rear wheel 133 of motorcycle 107 is shown resting on ramp plate 134 supported by cross bars 131, as shown. Also visible is one of the two raising and lowering mechanisms 252 incorporated within wheel assembly 108 of the fourth left-side component 132.

First height setting 312 may be implemented by engagement of locking mechanism 304 with aperture 298A of disc 292 and yields a chassis height h of about 4.8 inches, according to the example used with the equation noted above. When adjusted to the first height setting 312, chassis 104 is oriented substantially horizontally and generally parallel to ground surface 119 with support platform 116 and the angled ramp surfaces of ramp plate 134 located at ground surface 119 to facilitate vehicle loading. This height setting of towing system 100 permits direct loading of motorcycle 107 without the need for an additional loading ramp or expensive hoist equipment and allows a single user to mount motorcycle 107 onto towing trailer 102 without the assistance of a second person. As the motorcycle does not have to travel up a long incline, the risk of having the motorcycle fall to the side while loading the motorcycle onto the towing frame is eliminated.

Once motorcycle 107 is loaded onto chassis 104, the user prepares towing trailer 102 for transport by raising chassis 104 to one of two elevated towable positions. In this operation, the raising and lowering mechanisms of the left-side tow frame assembly 122 and corresponding right-side tow frame assembly 126 (see FIG. 2) are manipulated sequentially by the user.

Figure 29:
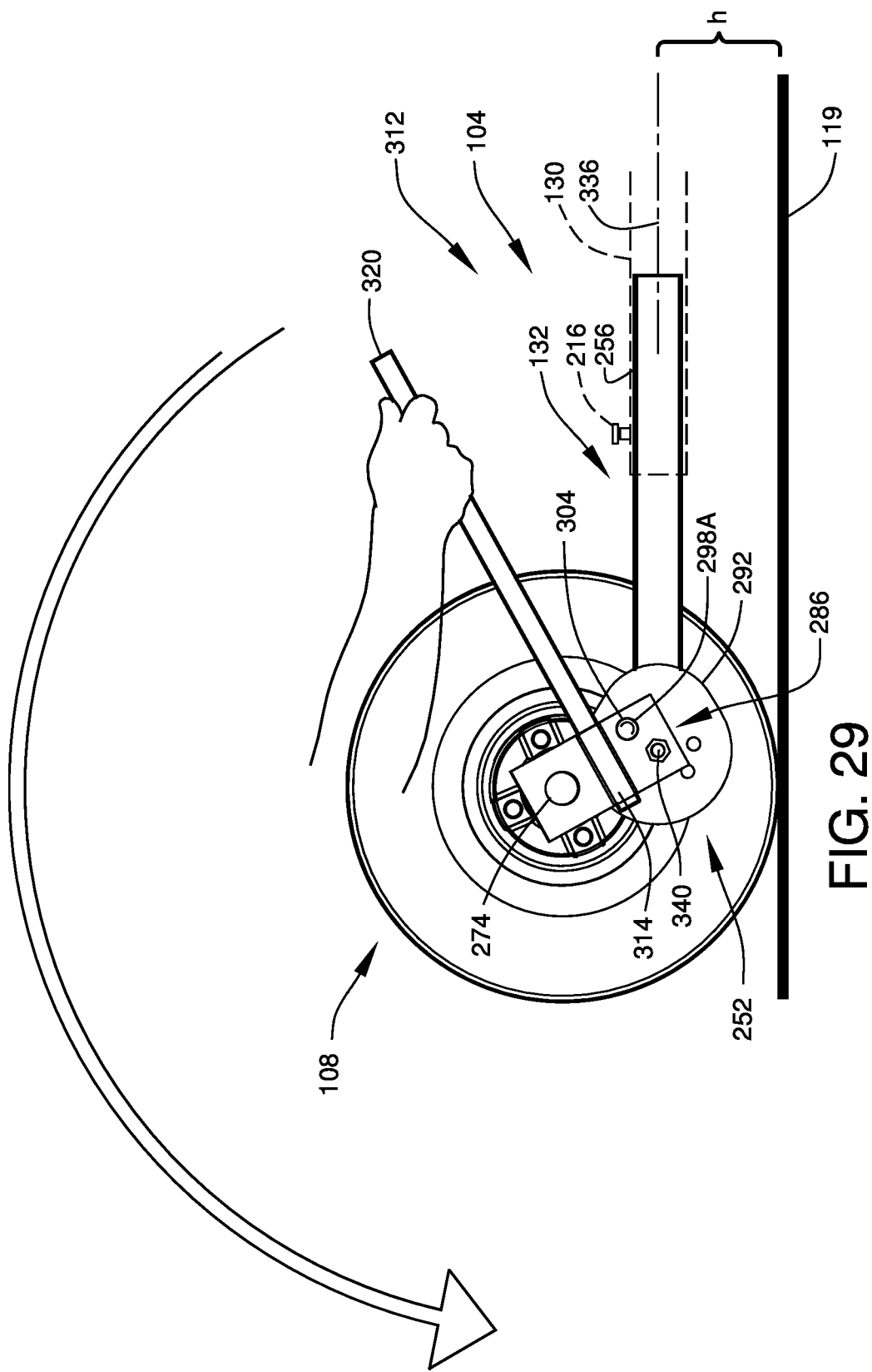
FIG. 29 is a side view illustrating a user manipulating the raising and lowering mechanism of the fourth left-side component of FIG. 22.
Figure 30:
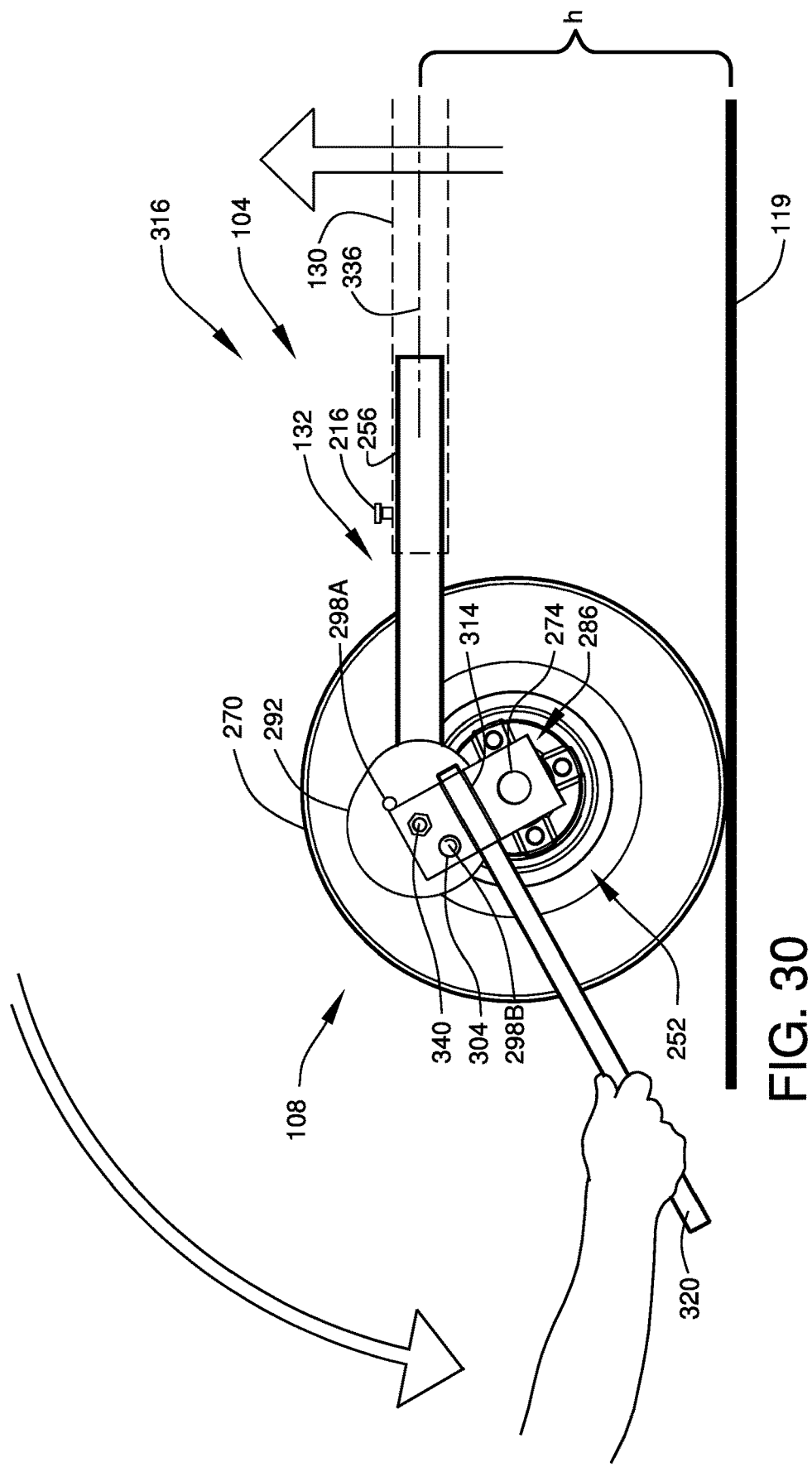
FIG. 30 is a side view illustrating a user manipulating the raising and lowering mechanism of the fourth left-side component of FIG. 22 to place the towing trailer in a raised second height setting above a ground surface.

FIG. 29 is a side view illustrating a user manipulating raising and lowering mechanism 252 of fourth left-side component 132. The illustration of FIG. 29 shows chassis 104 in the lowered first height setting 312. FIG. 30 is a side view illustrating a user manipulating raising and lowering mechanism 252 to place chassis 104 in the raised second height setting 316.

When a user wishes to raise towing trailer 102 from the first height setting 312, the user disengages the spring-loaded plunger of locking mechanism 304 from locking aperture 298A and rotates pivot arm 286 about pivot point 340 to raise chassis 104 to second height setting 316. Second height setting 316 is the highest towing position of the present implementation. Towing trailer 102 is locked at second height setting 316 when locking mechanism 304 is aligned with locking aperture 298B of disc 292. When aligned, locking mechanism 304 moves the spring-loaded plunger into a position of engagement with locking aperture 298B thereby locking the position of pivot arm 286 relative to disc 292 to prevent further relative movement.

Raising and lowering mechanism 252 may be equipped with a lever-arm receiver 314 to allow a user to temporarily engage an elongated bar or similar lever arm 320 on pivot arm 286 to assist in manually actuating the rotation of pivot arm 286. This allows the user to apply an operating force having a greater level of torque, thereby allowing even heavily-loaded trailers to be raised by a single user with ease.

Lever-arm receiver 314 is shown as a tubular sleeve connected to the outer face of pivot arm 286, as shown. Lever arm 320 is removable from lever-arm receiver 314 and may be conveniently stored when not in use. Other design implementations for the position of lever arm receiver or the function of lever arm receiver, such as, the use of electrically-actuated rotation devices, pneumatically-actuated rotation devices, hydraulically-actuated rotation devices, etc., may suffice.

It is noted that FIG. 29 indicates motion of lever arm 320 in a counter-clockwise motion. For the fourth right-side component, the motion of lever arm will be clockwise.

Figure 31:
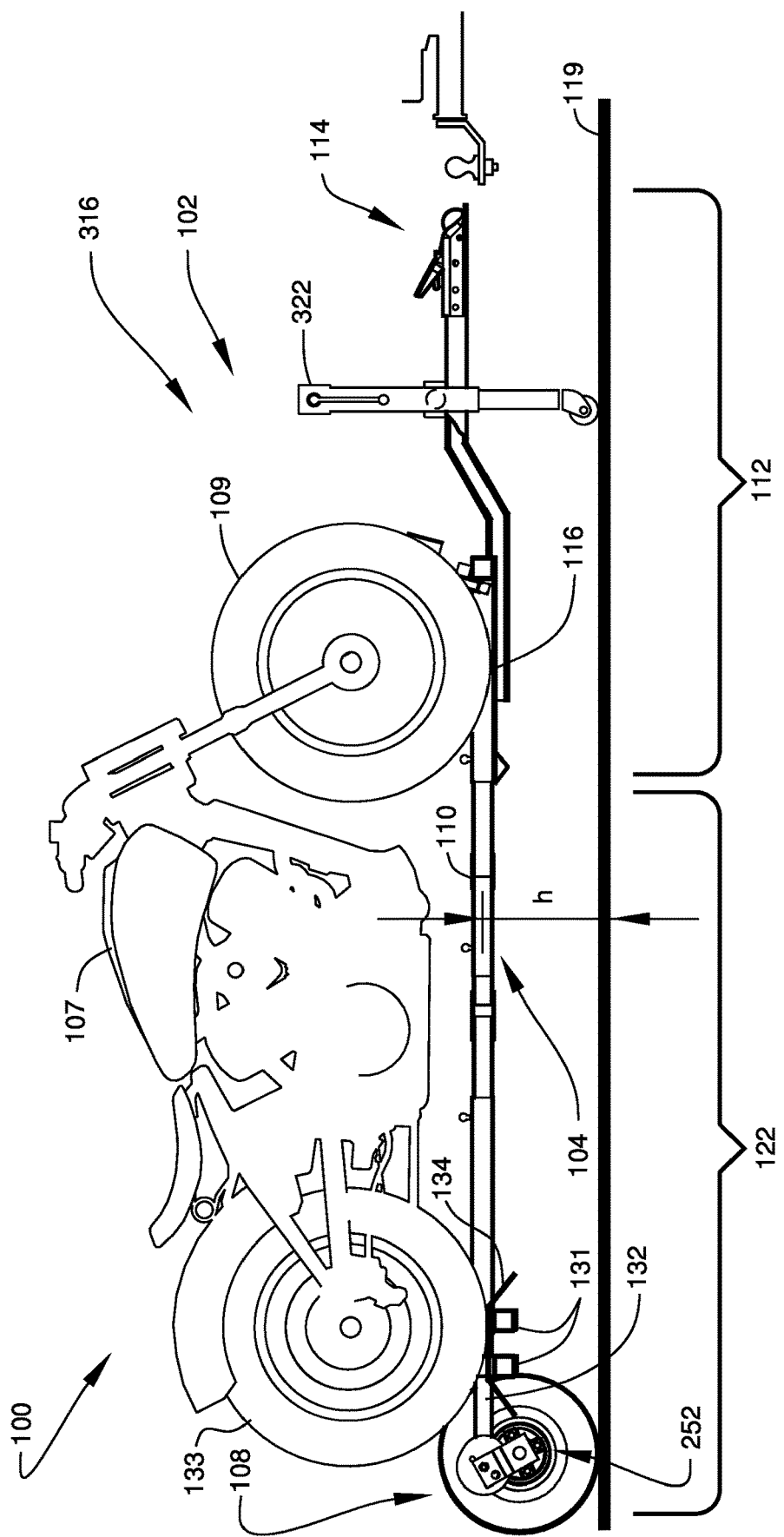
FIG. 31 shows a sectional view similar to the sectional view 28-28 of FIG. 1 showing the towing trailer raised to a second height setting.

FIG. 31 shows a sectional view similar to the sectional view 28-28 of FIG. 1. FIG. 31 shows towing trailer 102 and motorcycle 107 raised to the second height setting 316. This high towable position is particularly useful when towing trailer 102 will traverse bumpy terrain (e.g., a dirt or gravel road), hilly areas, etc. An additional advantage of second height setting 316 is that it provides increased access around the support points of motorcycles 107. This allows the user to more thoroughly inspect the support points and securing apparatus prior to transport to ensure that motorcycle 107 is properly secured to chassis 104. Second height setting 316 is associated with the above-noted chassis height h of about 11.2 inches, according to the example used with the equation noted above.

Figure 32:
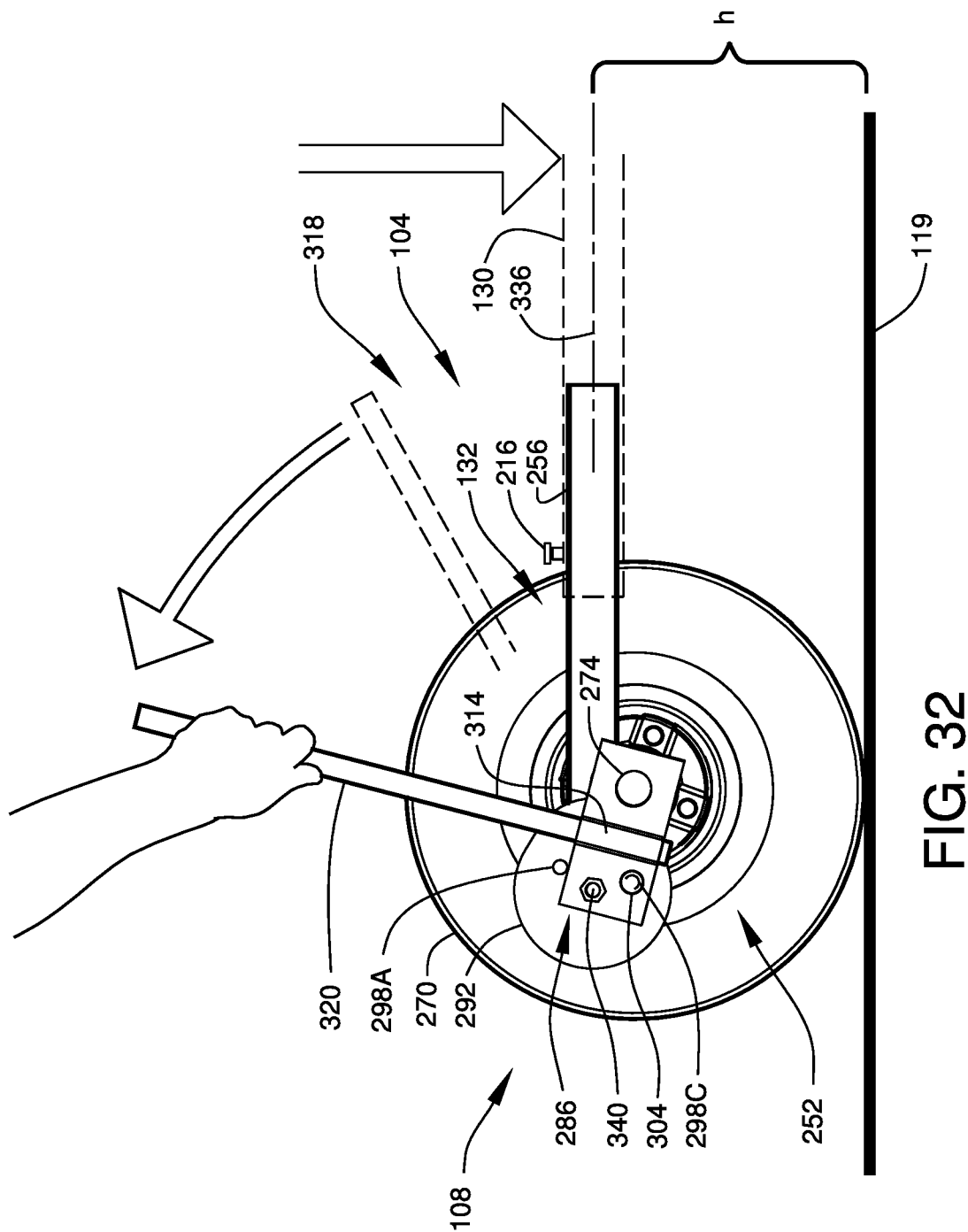
FIG. 32 is a side view illustrating a user manipulating the raising and lowering mechanism of the fourth left-side component of FIG. 22 to lower the towing trailer to a third height setting suitable for general towing.
Figure 33:
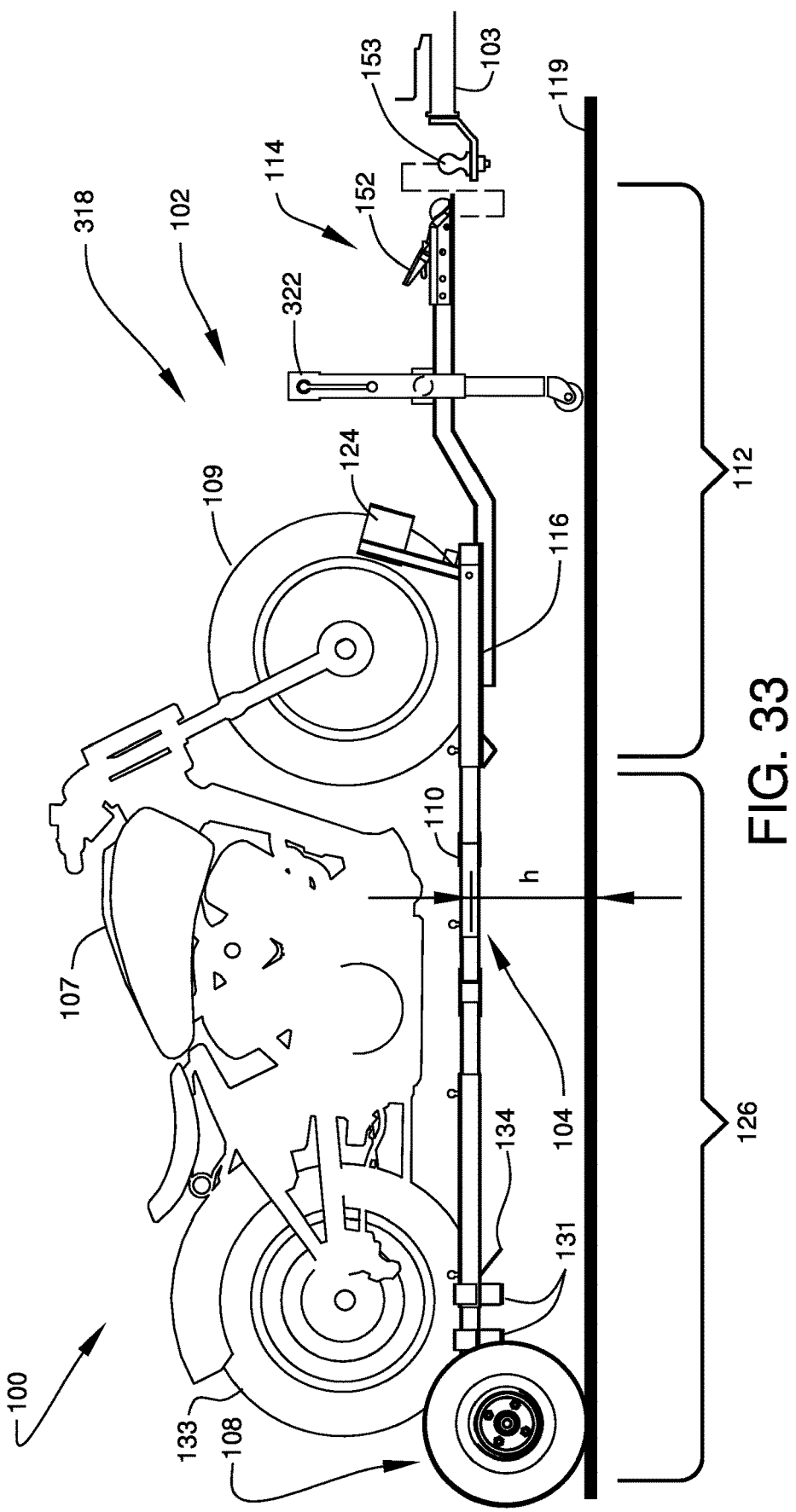
FIG. 33 show a right side view of the towing trailer of FIG. 1 placed at the third height setting and positioned for attachment to a towing vehicle.

FIG. 32 is a side view illustrating a user manipulating raising and lowering mechanism 252 to place chassis 104 in the third height setting 318. FIG. 33 shows a right side view of towing trailer 102, illustrating chassis 104 lowered to a towable position suitable for general towing. More specifically, chassis 104 of towing trailer 102 has been lowered from second height setting 316 to third height setting 318.

When a user wishes to lower towing trailer 102 from the second height setting 316 to the third height setting 318, the user disengages the spring-loaded plunger of locking mechanism 304 from locking aperture 298B and rotates pivot arm 286 to lower chassis 104 to align locking mechanism 304 with locking aperture 298C of disc 292. To lock towing trailer 102 at third height setting 318, the spring-loaded plunger of locking mechanism 304 moves into a position of engagement with locking aperture 298C thereby locking the position of pivot arm 286 relative to disc 292 to prevent further relative movement. The third height setting 318 positions chassis 104 at an elevation positioned between the lower first height setting 312 shown in FIG. 28 and the highest second height setting 316 shown in FIG. 31.

No continuous axle member joins the right and left raising and lowering mechanisms of left-side tow frame assembly 122 and right-side tow frame assembly 126, thus facilitating sequential adjustment of the two apparatus by a single user.

Once chassis 104 is placed in one of the two transportable positions, towing trailer 102 may be transported by attachment to towing vehicle 103. Trailer head assembly 112 must be raised to attach to the towing vehicle. A jack 322 or similar device may be attached to trailer head assembly 112 to assist in such raising of the trailer head portion. Jack 322 may be manually actuated and may comprise a bottom caster wheel to further facilitate movement of the trailer prior to engagement of hitch assembly 114 with towing vehicle 103. Jack 322 be removable from the frame for convenient storage. It is noted that commercial jacks may require modification of the attachment point to accommodate the unusually low frame position enabled by the present disclosure. Other jack implementations, such as, the use of a permanently joined chassis component, the use of electrically-actuated jacks, etc., may suffice. To return to second height setting 316 and first height setting 312, the above-described process is performed in the opposite direction.

Figure 34:
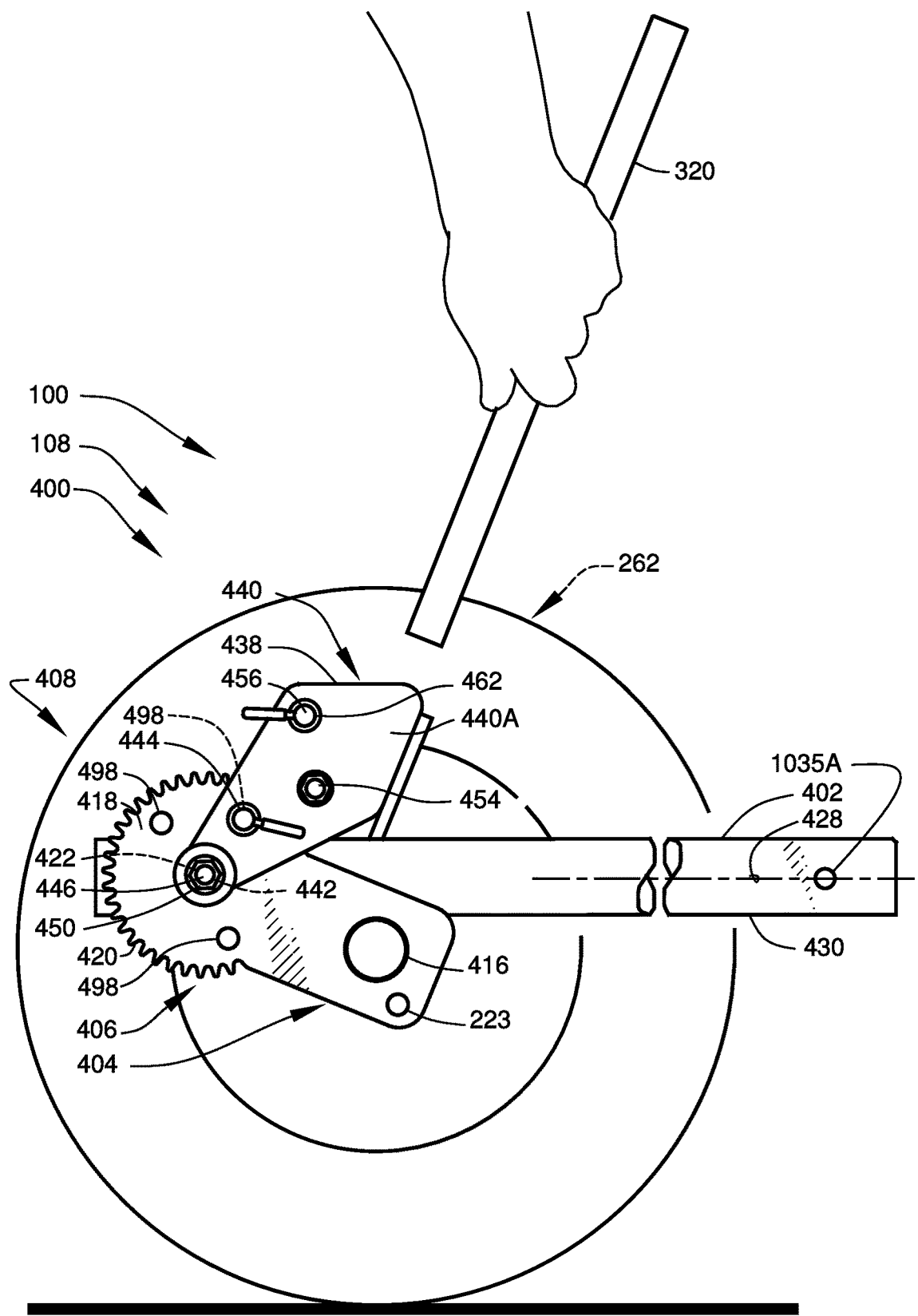
FIG. 34 is a side view illustrating an alternate left-side wheel assembly of a fourth left-side component according to another embodiment of the present disclosure.
Figure 35:
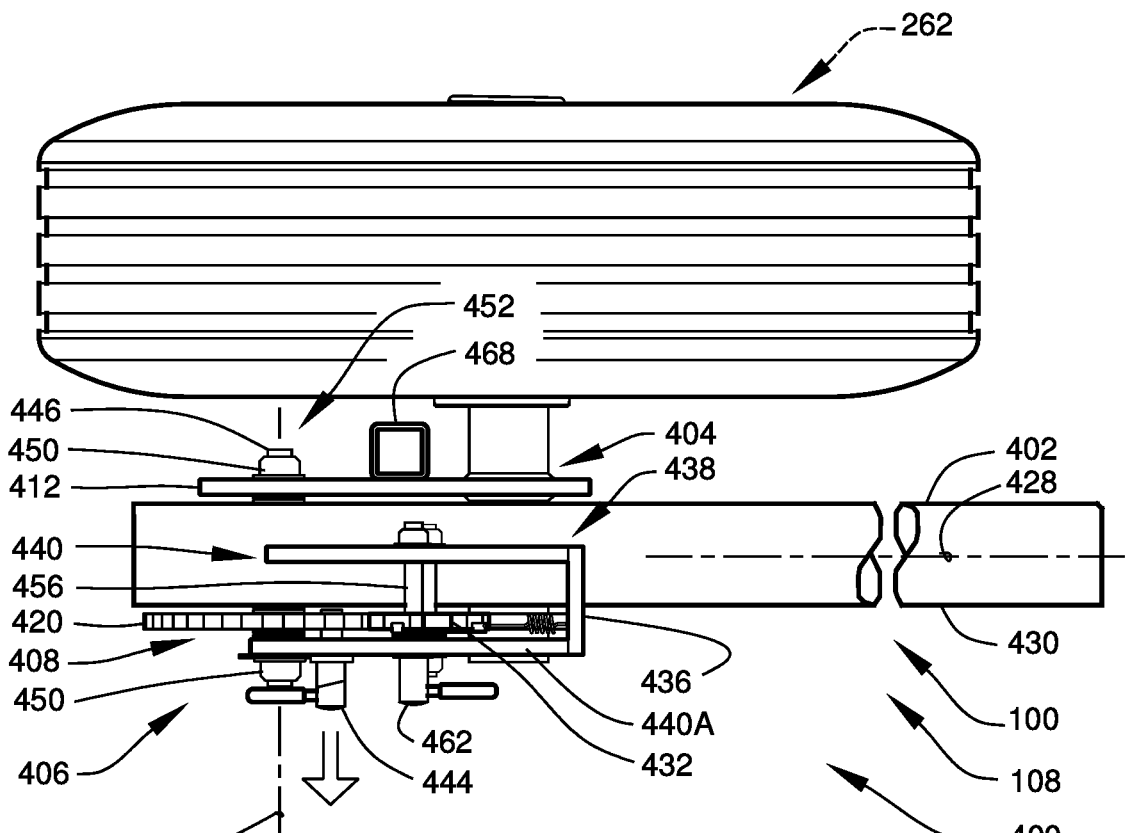
FIG. 35 is a top view of the alternate left-side wheel assembly of FIG. 34.

FIG. 34 is a side view illustrating an alternate wheel assembly 108 identified hereinafter as alternate fourth left-side component 400, according to another embodiment of the present disclosure. FIG. 35 is a top view further illustrating the alternate fourth left-side component 400. Alternate fourth left-side component 400 shares many of the same component arrangements as those in fourth left-side component 132 (see FIG. 22). The following discussion relates to the differences between the two.

Alternate fourth left-side component 400 preferably comprises a left-side coupling bar 402 (a frame insertion member) and stub axle assembly 404 (a wheel attachment member) to which wheel 262 may be rotationally attached. Wheel 262 and stub axle assembly 404 are shown joined to coupling bar 402 by an alternate left-side raising and lowering mechanism 406 of the alternate fourth left-side component 400, as shown.

Alternate left-side raising and lowering mechanism 406 includes a reversible ratchet mechanism 408 to limit rotational movement of the mechanism to a single direction during raising and lowering operations. The reverse-motion suppression provided by ratchet mechanism 408 increases user safety by holding the rotating assembly at the last rotational position when the user releases pressure from lever arm 320 during manual adjustment.

Figure 36:
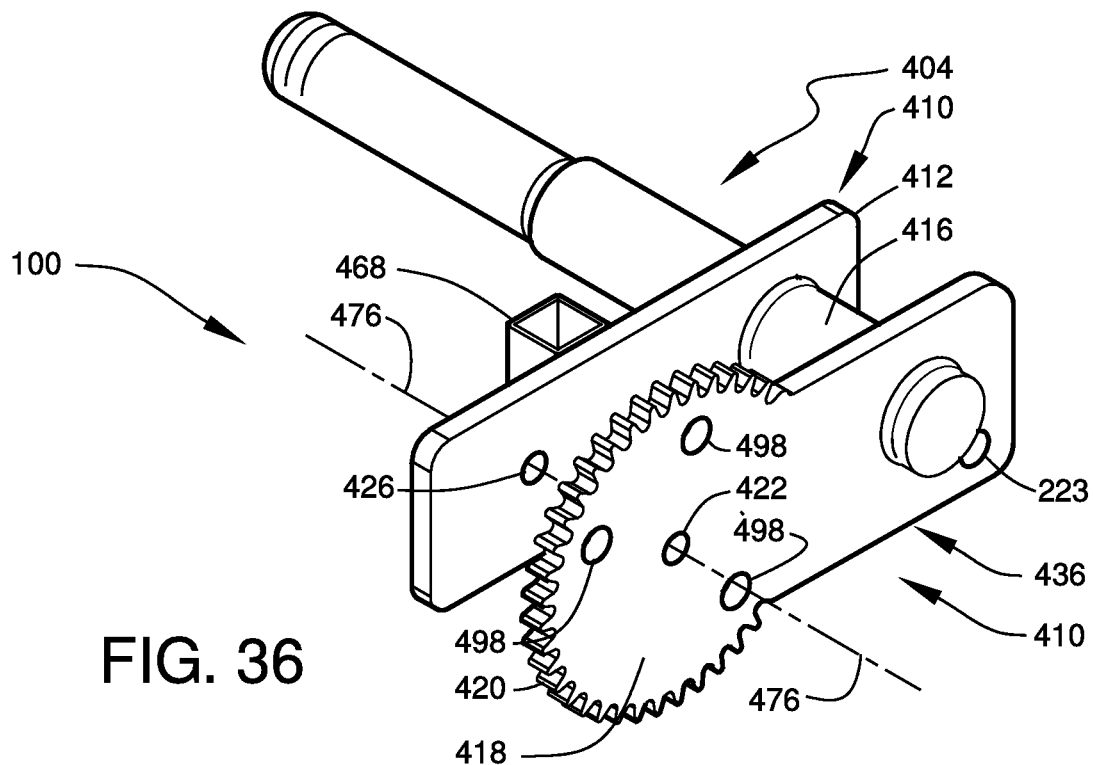
FIG. 36 is a perspective view illustrating a stub-axle assembly of the alternate left-side wheel assembly of FIG. 34.

FIG. 36 is a perspective view illustrating fixed structural elements of stub axle assembly 404 of FIG. 34. Stub axle assembly 404 includes a pair of parallel side plates 410, as shown. A first plate 412 of the side-plate pair is connected to stub axle assembly 404, as shown. Second plate 436 is joined with first plate 412 by spindle 416, which is located in coaxial alignment with stub axle assembly 404, as shown. Alternately, first plate 412 and second plate 436 may be joined by a stub-axle sleeve in a manner similar to the arrangement described in the prior system embodiment.

Second plate 436 includes gear plate portion 418, as shown. Gear plate portion 418 includes an outer set of gear teeth 420, centrally-positioned aperture 422, and locking apertures 498 spaced equidistantly from centrally-positioned aperture 422, as shown. First plate 412 is provided with a mounting aperture 426 that can be aligned with centrally-positioned aperture 422 in an arrangement defining axis of rotation 476 about which stub axle assembly 404 rotates relative to left-side coupling bar 402. Such axis of rotation 476 can be aligned perpendicularly to both the longitudinal axis 428 of the frame insertion tube 430 forming coupling bar 402 and longitudinal axis 117 (see FIG. 2). Second plate 436 may include additional apertures (tie-down aperture 223), as shown, to further assist in secure the load during transport.

Figure 37:
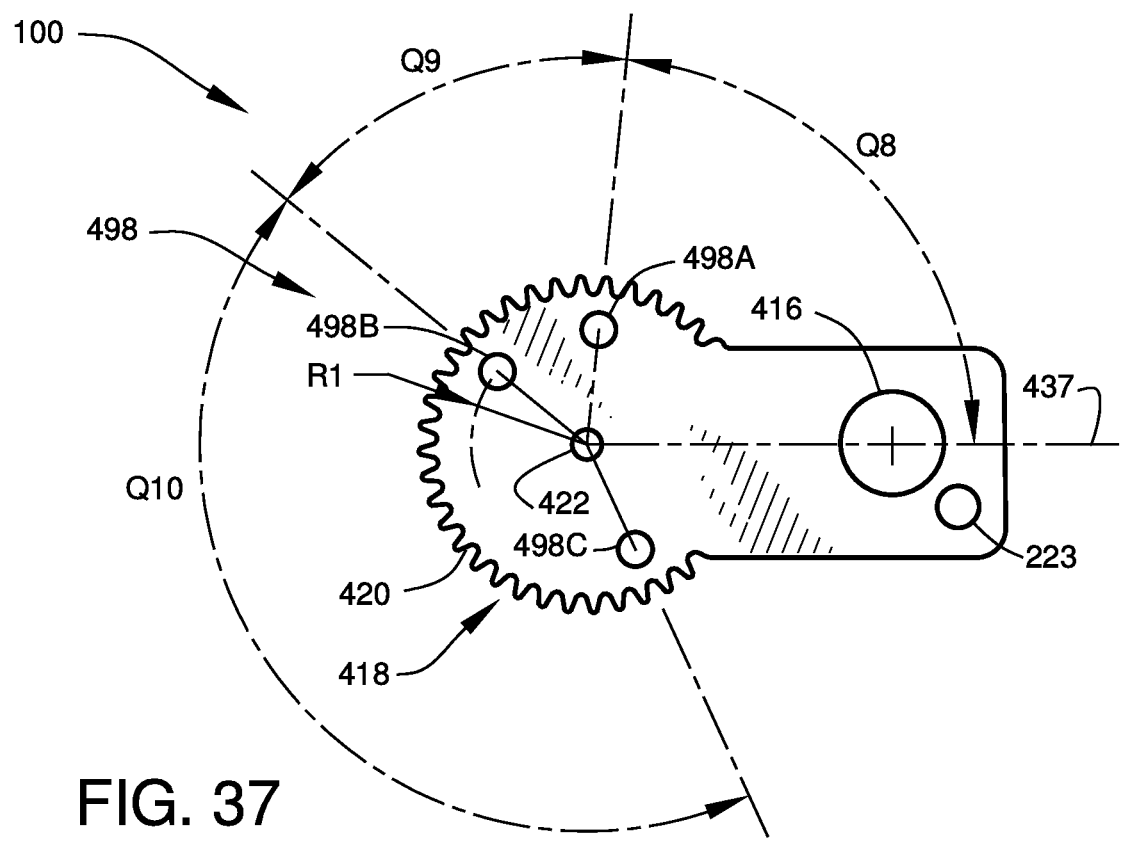
FIG. 37 is a side view illustrating a gear plate portion of the alternate left-side wheel assembly of FIG. 34.
Figure 38:
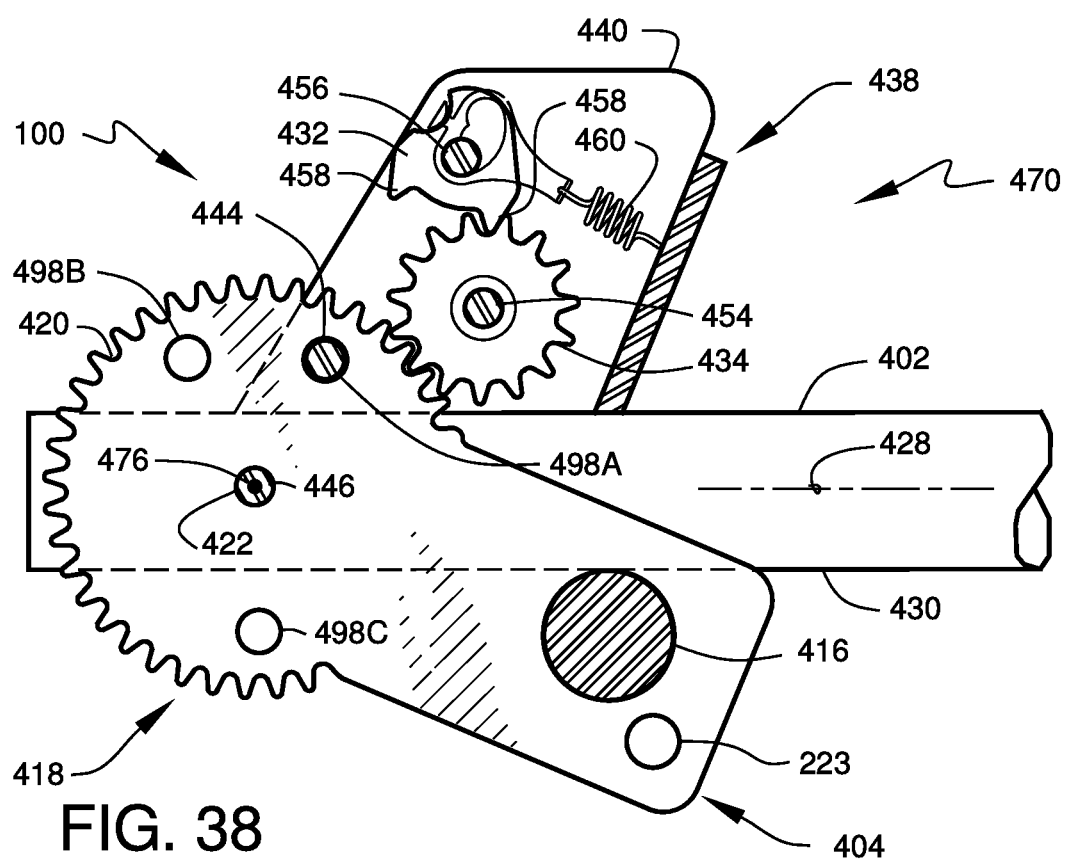
FIG. 38 is a sectional diagram illustrating the alternate left-side wheel assembly of FIG. 34 adjusted to one of three height settings.

FIG. 37 is a side view illustrating gear plate portion 418 of FIG. 34. FIG. 38 is a sectional diagram of the embodiment of FIG. 34. Ratchet mechanism 408 of alternate left-side raising and lowering mechanism 406 includes a pawl 432, pinion gear 434, and a ratchet-assembly support housing 438 rigidly fixed to the frame insertion tube 430 forming coupling bar 402. Ratchet-assembly support housing 438 includes a pair of parallel side plates 440, as shown. Parallel side plate 440A of parallel side plates 440 includes aperture 442 that coaxially aligns with axis of rotation 476 when assembled. In addition, side plate 440A includes a locking device in the form of plunger pin 444 configured to selectively engage one of the three locking apertures 498 of gear plate portion 418. Side plate 440A has been omitted from sectional diagrams of FIG. 38, FIG. 39, and FIG. 40 for clarity of description.

When assembled, coupling bar 402 is secured between first plate 412 and gear plate portion 418 by transverse pivot shaft 446 extending through centrally-positioned aperture 422 of gear plate portion 418 and mounting aperture 426 of first plate 412. Pivot shaft 446 also passes through apertures 442 of side plate 440A of ratchet-assembly support housing 438. Pivot shaft 446 may be secured in place by a set of threaded end fasteners 450, as shown. In such an arrangement, pivot shaft 446 and threaded end fasteners 450 form connecting assembly 452 that passes through ratchet-assembly support housing 438, centrally-positioned aperture 422 of gear plate portion 418, and frame insertion tube 430 and enables stub axle assembly 404 to rotate about pivot shaft 446 and centrally-positioned aperture 422.

Pawl 432, pinion gear 434, and gear plate portion 418 are operably aligned within ratchet-assembly support housing 438, as best shown in FIG. 35. Pinion gear 434 is mounted on a pinion-gear axle 454 that is coupled rotationally to parallel side plates 440 of ratchet-assembly support housing 438, as shown. Pinion gear 434 is arranged within ratchet-assembly support housing 438 to continuously mesh with outer set of gear teeth 420 of gear plate portion 418, as shown.

Pawl 432 is fixed on ratchet-pawl axle 456, which is rotationally coupled to parallel side plate 440A of ratchet-assembly support housing 438, as shown. Pawl 432 includes two gear-engaging teeth 458 that alternately engage between two teeth of pinion gear 434, permitting pinion gear 434 to be rotated either clockwise or counterclockwise depending upon the engagement of pawl 432 against pinion gear 434. When one tooth engages against pinion gear 434, the mechanism may be operated only in a forward direction. Rotation of ratchet-pawl axle 456 pivots pawl 432 to engage the other pawl tooth against pinion gear 434 thereby configuring the mechanism to be operable only in the reverse direction. When one pawl tooth is in active engagement with the pinion gear 434, the inactive pawl tooth is out of such engagement. A spring tensioner 460 is provided to urge pawl 432 into a position of engagement with pinion gear 434. One end of spring tensioner 460 is engaged to pawl 432, while the other end is affixed to ratchet-assembly support housing 438, as shown.

The distal end of ratchet-pawl axle 456 includes switch lever 462 allowing a user to switch pawl 432 between the forward-engaged mode and reverse-engaged mode. Thus, switch lever 462 functions as an actuator configured to change the rotational direction of reverse-motion suppression.

When assembled, pivot shaft 446 defines the common axis of rotation 476, about which stub axle assembly 404 and wheel 262 rotate relative to frame insertion tube 430. When assembled, gear plate portion 418 may be rotated relative to ratchet-assembly support housing 438 about pivot shaft 446 and axis of rotation 476. As gear plate portion 418 is rotated, it will be appreciated that at least one locking aperture 498 of gear plate portion 418 comes into alignment with plunger pin 444, which correspond to one of three height settings of the trailer assembly previously described. Plunger pin 444 may be a cam lock plunger pin (which also may be referred to as a twist lock plunger pin), as shown.

Stub axle assembly 404 is shown equipped with a lever-arm receiver 468 to allow a user to temporarily engage an elongated bar or similar lever arm 320 on (see FIG. 34) to assist in manually actuating the rotate stub axle assembly 404. Lever-arm receiver 468 is shown as a tubular sleeve welded to the surface of first plate 412 facing wheel 262.

When a user wishes to adjust the height setting of towing trailer 102, the user disengages plunger pin 444 and rotates stub axle assembly 404 to a selected position using lever arm 320. During the rotation, ratchet mechanism 408 limits rotational movement of the mechanism to a single direction, thus assisting the user to avoid sudden and potentially dangerous drops of the apparatus during the height adjustment. As stub axle assembly 404 nears the selected height, the plunger pin 444 aligns with a corresponding aperture of the three locking apertures of gear plate portion 418. The user will then rotate plunger pin 444 so the pin of plunger pin 444 is in a position of engagement with the selected locking aperture. This locks the position of stub axle assembly 404 relative to ratchet-assembly support housing 438 and frame insertion tube 430 to prevent further relative movement. In so rotating, the tow frame side of chassis 104 may be safely raised or lowered relative to the ground surface. It is noted that a user may move between a third height setting 470 (corresponding to the height setting shown in FIG. 33, third height setting 318) and first height setting 474 (corresponding to the height setting shown in FIG. 28, first height setting 312) without engaging the locking aperture corresponding to second height setting 472 (corresponding to the height setting shown in FIG. 31, second height setting 316) by keeping plunger pin in a disengaged state as it passes the locking aperture 498.

With reference to FIG. 37, a spacing arrangement of the locking apertures about centrally-positioned aperture 422 will be described according to one embodiment of the present disclosure. For clarity of description, standard polar coordinates will be used and will be measured relative to a zero-degree reference line 437 passing through the center of centrally-positioned aperture 422 and spindle 416, as shown. The angular measurements are once again to the center of the apertures, unless noted otherwise.

For clarity of description, the three locking apertures will be identified individually as locking aperture 498A, locking aperture 498B, and locking aperture 498C. Each locking aperture may be spaced from centrally-positioned aperture 422 at the same center-to-center distance R1 used in the prior embodiments. One implementation of the present system places locking aperture 498A at angle Q8 of about 84.1 degrees from reference line 437. Locking aperture 498B may be located at angle of separation Q9 of about 56.7 degrees relative to aperture 298A, as shown. Locking aperture 298C may be preferably located at an angle of separation Q10 of about 154 degrees relative to aperture 298B, as shown. It is noted that the locking aperture arrangement shown in FIG. 26 is different from the one shown in FIG. 37 illustrating that different arrangements may be used to achieve similar raising and lowering effects of the chassis 104. In FIG. 37, the centers of locking aperture 498B and locking aperture 498C are aligned, and both are slightly offset from centrally-positioned aperture 422, as shown. According to one embodiment of the present disclosure, the distance from the center of locking aperture 498A and the center of locking aperture 498C is about 3 inches, the distance from the center of locking aperture 498A and the center of locking aperture 498B is about 1⅞ inches, the distance from the center of locking aperture 498B to the center of locking aperture 498C is about 3⅛ inches, and each locking aperture is about 1⅝ inches from centrally-positioned aperture 422, a radius from central aperture to the edge of gear plate between gear teeth is about 2.3 inches, and a radius from centrally-positioned aperture 422 to the edge of a tooth of gear plate is about 2.6 inches. Other locking aperture distances and arrangements may suffice to achieve similar raising and lowering effect of chassis 104. Additionally, other configurations may be used, including additional locking apertures in gear plate portion 418 for additional height positions.

The sectional diagram of FIG. 38 illustrates alternate left-side raising and lowering mechanism 406 adjusted to third height setting 470. Third height setting 470 corresponds to third height setting 318 of FIG. 33 suitable for general towing. When a user wishes to place towing trailer 102 in third height setting 470 the user disengages plunger pin 444 and rotates stub axle assembly 404 to enable engagement of plunger pin 444 in locking aperture 498A of gear plate portion 418.

Figure 39:
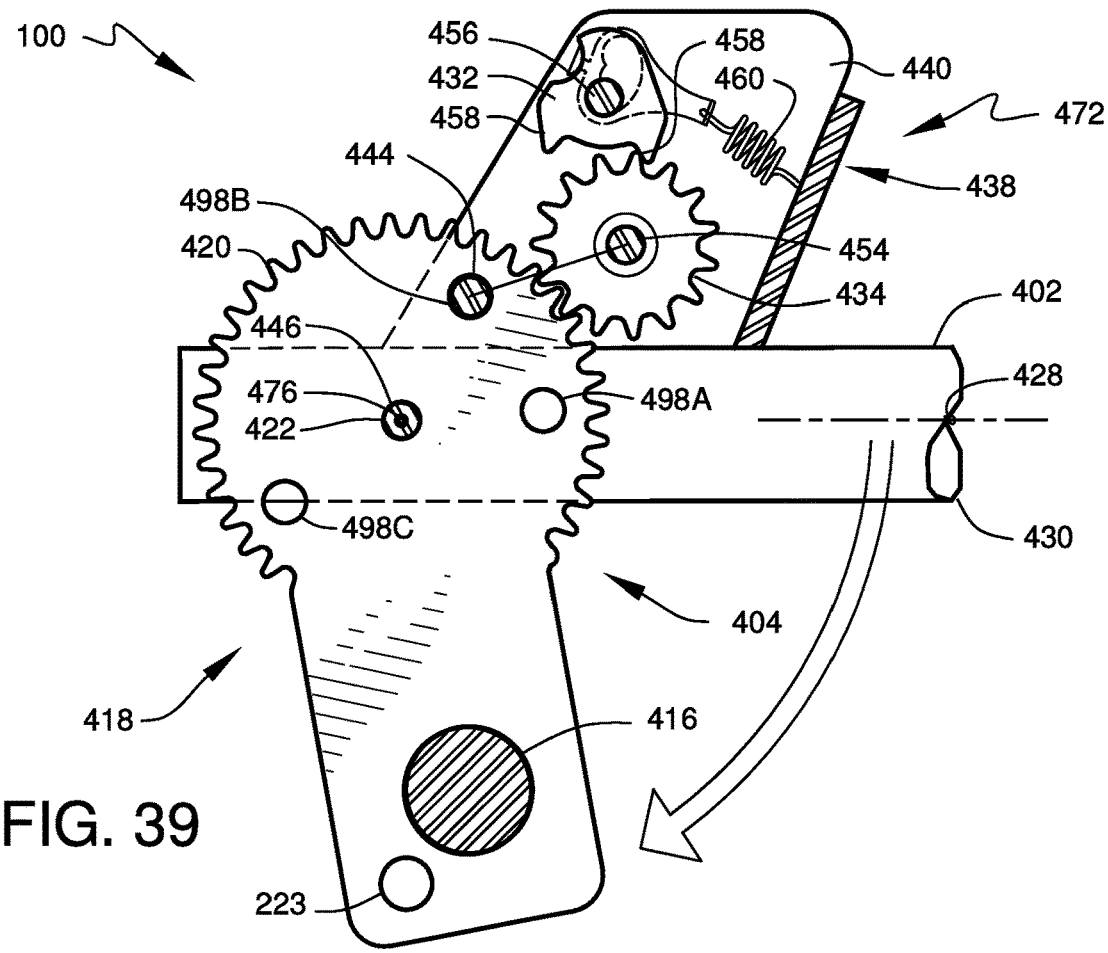
FIG. 39 is a sectional diagram illustrating the alternate left-side wheel assembly of FIG. 34 adjusted to a second of three height settings.

FIG. 39 is a sectional diagram, illustrating alternate left-side raising and lowering mechanism 406 adjusted to second height setting 472. Second height setting 472 corresponds to the raised second height setting 316 of FIG. 31. When a user wishes to place towing trailer 102 in second height setting 472 the user disengages plunger pin 444 and rotates stub axle assembly 404 to enable engagement of plunger pin 444 in locking aperture 498B of gear plate portion 418.

Figure 40:
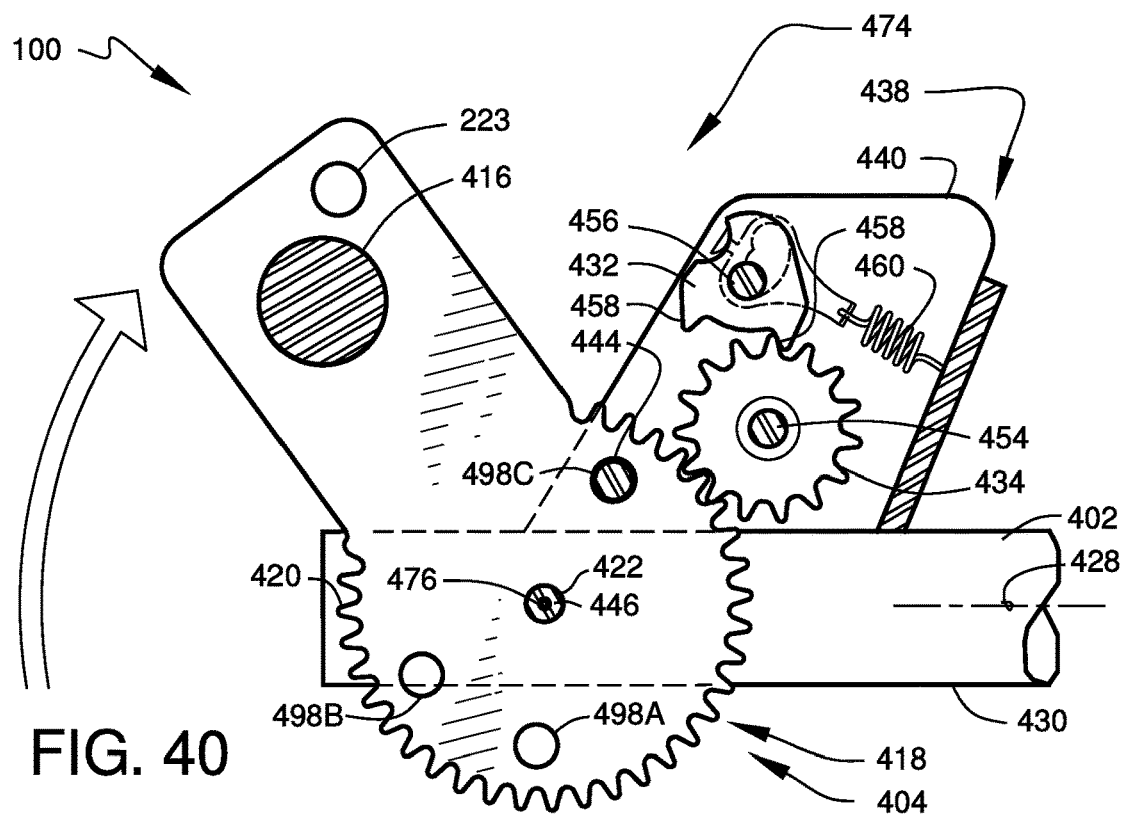
FIG. 40 is a sectional diagram illustrating the alternate left-side wheel assembly of FIG. 34 adjusted to a third of three height settings.

FIG. 40 is a sectional diagram, illustrating alternate left-side raising and lowering mechanism 406 adjusted to first height setting 474. First height setting 474 corresponds to first height setting 312 of FIG. 28 and allows motorcycle 107 to be pushed or ridden onto and off the trailer. When a user wishes to place towing trailer 102 in first height setting 474, the user disengages plunger pin 444 and rotates gear plate portion 418 to enable engagement of plunger pin 444 in aperture 498C. As gear plate portion 418 rotates clockwise, as shown, pawl 432 engages with the pinion gear 434 to allow only counterclockwise motion of pinion gear 434. Thus, ratchet mechanism 408 prevents reverse rotation of the assembly, even when the user releases pressure from lever arm 320 (see FIG. 34) during manual adjustment. As discussed above, switch lever 462 may be switched to allow pinion gear 434 to rotate with a counterclockwise or clockwise motion. For example, when gear plate portion 418 is rotated counterclockwise, pawl 432 is switched so pinion gear 434 only rotates clockwise.

The rotational movement shown in FIGS. 38-40 is clockwise motion of gear plate portion 418 moving left-side raising and lowering mechanism 406 from the general towing height (third height setting 470) through second height setting 472 to first height setting 474 (the lowest height for loading). For the corresponding right-side raising and lowering mechanism, a counterclockwise motion of gear plate portion is used since the corresponding right-side raising and lowering mechanism will be a mirror of the left side.

FIG. 41 through FIG. 43 illustrate structures and features of alternate trailer head assembly 500. Because alternate trailer head assembly 500 shares many of the same component arrangements as those in trailer head assembly 112 (see, e.g., FIG. 4), the following discussion will focus on the differences between the two. FIG. 41 is a side view illustrating alternate trailer head assembly 500 disassembled from the towing frame. FIG. 42 is a bottom perspective view showing a draw-bar receiver 502 of alternate trailer head assembly 500. FIG. 43 is a sectional view through the section 43-43 of FIG. 42.

As shown in FIG. 41 through FIG. 43, alternate trailer head assembly 500 comprises a rigid tubular frame 148. A rigid plate 144 is mounted to tubular frame 148 and forms a support platform 116 where the front wheel of motorcycle 107 will be placed. Plate 144 may be constructed from steel and may be joined to tubular frame 148 by thermal welding. As in the prior embodiment, alternate trailer head assembly 500 may include a deployable tire stop 124, as shown. Additionally, plate 144 is shown with three v-shaped support legs 469. Support legs 469 may be welded to plate 144. Support legs 469 assist to keep alternate trailer head assembly 500 and to prevent side-to-side tilting of alternate trailer head assembly 500 (and of trailer head assembly 112) when loading and unloading a motorcycle onto support platform 116. Three support legs 469 are shown equally spaced from each other. A centrally situated support leg 469 additionally prevents the weight of the motorcycle (or trike) from bending plate 144.

Draw-bar receiver 502 of alternate trailer head assembly 500 is constructed using three rigid plates 503 connected to the bottom surface of support platform 116 and to transverse member 142, as shown. When assembled, draw-bar receiver 502 forms a hollow receiving socket arranged to receive removable drawbar 504. A stop plate 505 may be provided to limit the depth to which removable drawbar 504 is inserted within the receiver. Rigid plates 503 may have a thickness of one-quarter inch.

Removable drawbar 504 may be retained in draw-bar receiver 502 by a pinned connection. A locking clevis pin 506 may be passed through side-positioned apertures 508 of draw-bar receiver 502 and a corresponding set of apertures 510 formed in drawbar 504, as shown. Drawbar 504 may be formed from three rectangular tube segments, as shown, and may include a hitch member 152 disposed at the end thereof. Removable drawbar 504 may be constructed from steel tubes and may have an outer dimension of about 2 inches by three inches and a wall thickness of about 0.125 inches.

Figure 44:
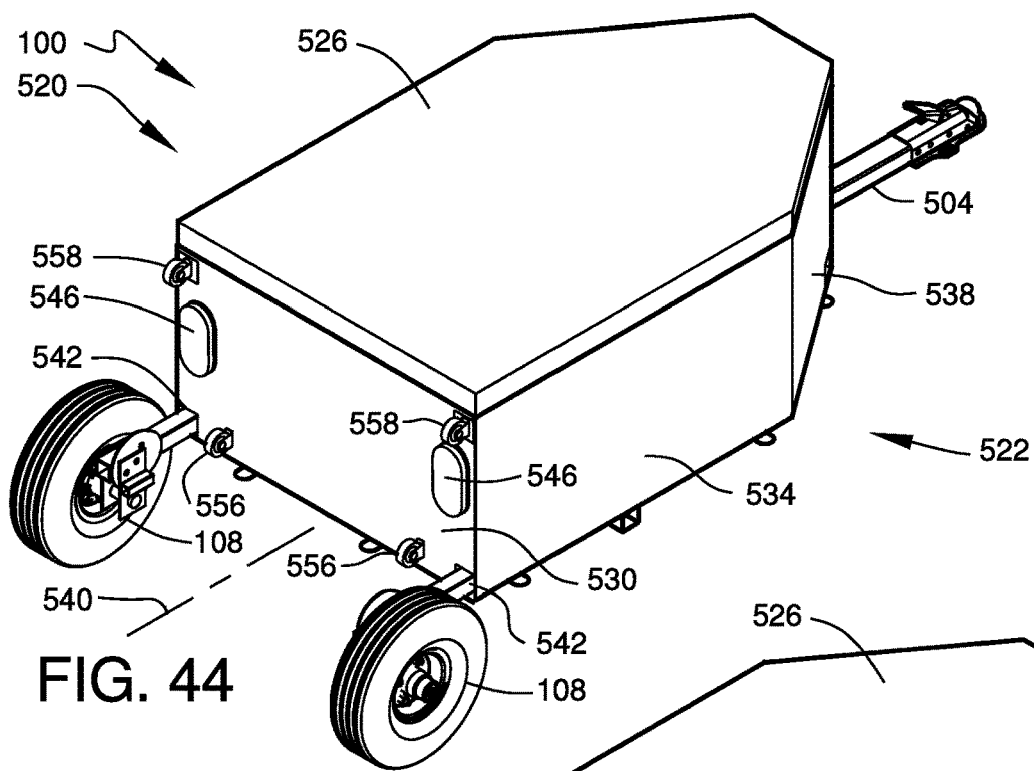
FIG. 44 is a perspective view illustrating a towable cargo box according to an embodiment of the present disclosure.
Figure 45:
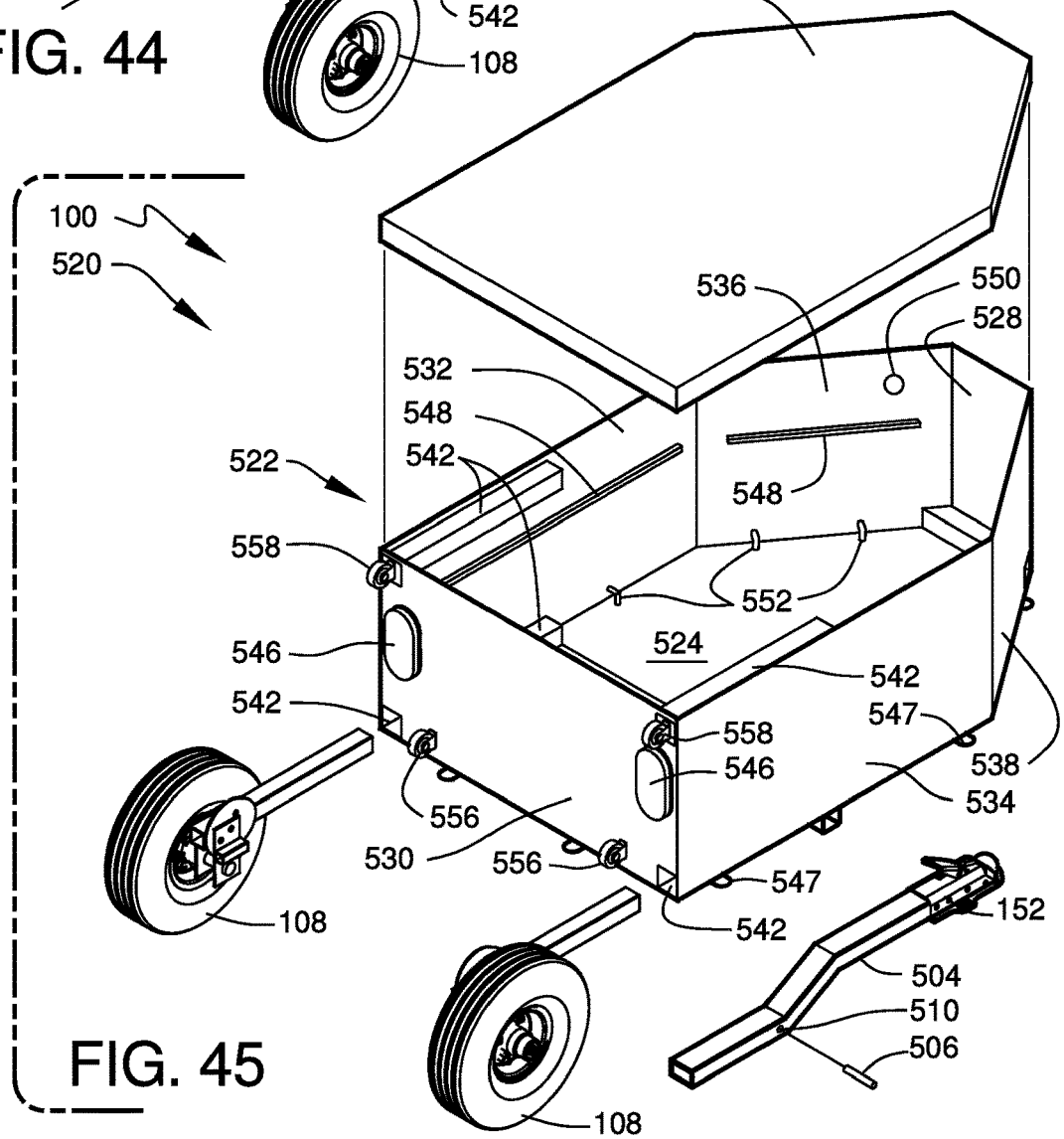
FIG. 45 is an exploded perspective view of the towable cargo box of FIG. 44.

FIG. 44 is a perspective view illustrating a towable cargo box 520. FIG. 45 is an exploded perspective view of towable cargo box 520 of FIG. 44. Cargo box 520 may be configured to operate as a towable cargo trailer or may be configured as a storage container to store, for example, components of a disassembled towing system 100 between use. Cargo box 520 has dimensions such that all of the frame components (i.e., the components shown in FIG. 3 and any alternate components described herein) fit inside cargo box 520 when the frame is disassembled as shown in FIG. 3. According to one embodiment of the present disclosure, cargo box 520 may have a height of 18 inches (distance from floor 524 to the upper part of wall panel 522), a width of 34 inches (distance between first side wall 532 and a second sidewall 534), and a length of 53 inches (distance from rear wall 530 to forward wall 528). Other dimensions may suffice and the dimensions may be adjusted to accommodate the size of the components.

Figure 47:
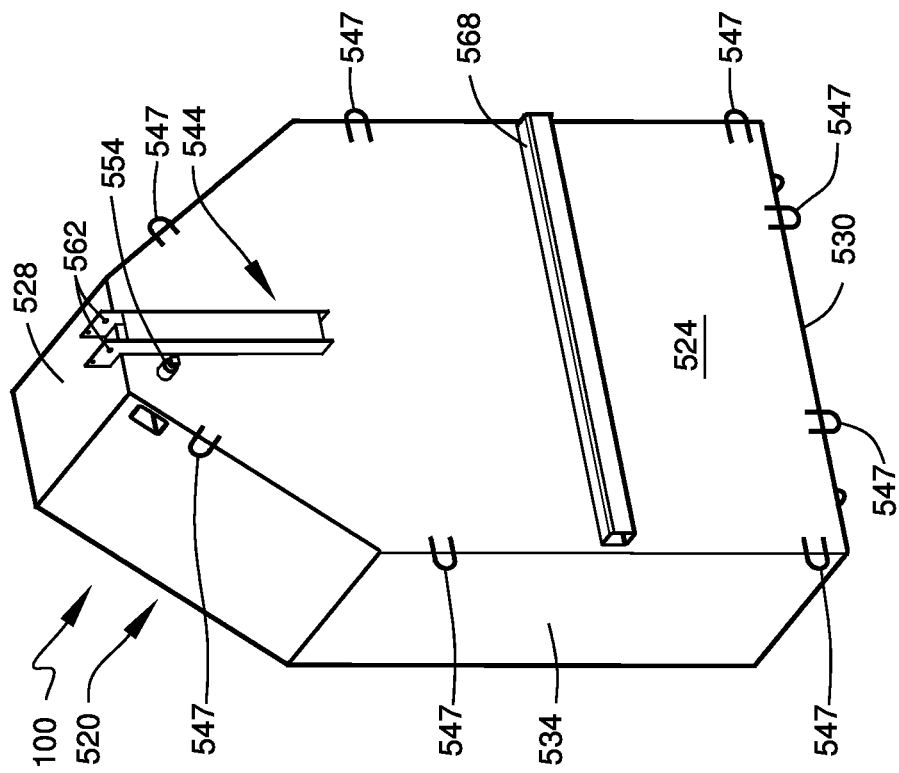
FIG. 47 is a perspective view illustrating the underside of the cargo box of FIG. 44.
Figure 46:
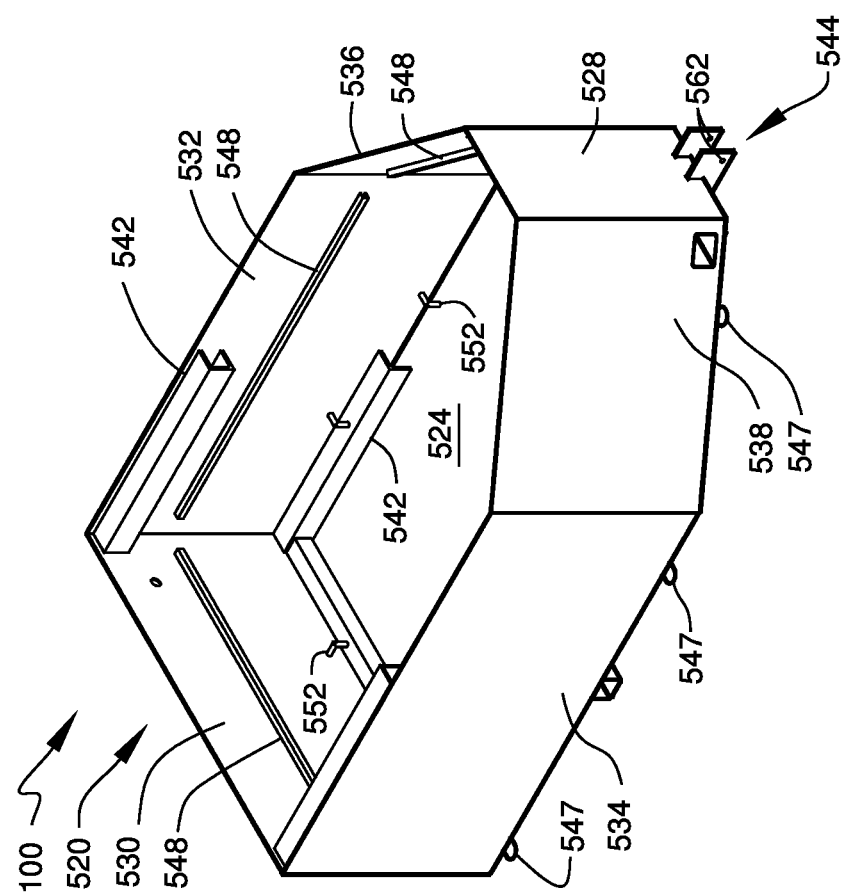
FIG. 46 is an upper perspective view illustrating an interior of the cargo box of FIG. 44.

FIG. 46 is an upper perspective view of cargo box 520 of FIG. 44. FIG. 47 is a perspective view illustrating the underside of the cargo box 520 of FIG. 44. Cargo box 520 includes a plurality of wall panels 522, a floor 524, and a cover 526, as shown. Wall panels 522 may include a forward wall 528, a rear wall 530 oriented substantially parallel to forward wall 528, a first side wall 532, a second sidewall 534 oriented substantially parallel to first side wall 532, a first angled wall 536, and a second angled wall 538 placed in a symmetrically-mirrored relationship with first angled wall, about longitudinal axis 540. Although not shown, those of skill in the art will appreciate that cover 526 may be joined with a wall panel 522 using a hinge or similar connector. Moreover, lid may be secured to one or more wall panels 522 using a latch, hasp, or similar latching device.

Cargo box 520 may comprise a plurality of attachment points 547 to assist in tying down cargo that may be placed on top of cover 526. FIG. 47 shows 8 attachment points 547 spaced about floor 524 of cargo box 520. The interior of cargo box may also contain interior tie downs 552 to tie down items placed in cargo box 520.

Cargo box 520 is configured to receive two wheel assemblies 108 and removable drawbar 504, thus allowing towing cargo box 520 to form a hauling trailer towable by a vehicle. To receive wheel assemblies 108, cargo box 520 is fitted with a set of receiving sockets 542 positioned low within the interior of cargo box 520 and extending outwardly through rear wall 530, as shown. Each receiving socket 542 is configured to receive the coupling bar of a respective wheel assembly 108. The inner dimensions of receiving sockets 542 permit the tubular element forming the coupling bar to be inserted into the rear-facing open end of receiving sockets 542 with a snug, but slidable, fit. Each receiving socket 542 may be fitted with a locking mechanism enabling the above-noted tubular element to be releasably secured together in nested telescoping relation. The locking mechanism may be similar in form and function to locking mechanism 160 described previously (see FIG. 4). A user can slidably adjust the geometric relationship between wheel assembly 108 and towing cargo box 520 by disengaging the locking mechanism to permit sliding of wheel assembly 108 to a new position relative to receiving socket 542 and towing cargo box 520. The user can fix the geometric relationship between the two by re-engaging the locking mechanism.

FIG. 48 is a top view of cargo box 520 of FIG. 44. FIG. 49 is a sectional view through the section 49-49 of FIG. 48. Cargo box 520 may further include draw-bar receiver 544 adapted to receive removable drawbar 504. The construction of draw-bar receiver 544 is similar to draw-bar receiver 502 of FIG. 41, including a set of rigid plates that may be thermally welded together, to the bottom surface of floor 524, and to forward wall 528, as shown. When assembled, draw-bar receiver 544 forms a hollow receiving socket arranged to receive drawbar 504. The removable drawbar 504 may be retained in draw-bar receiver 544 by a pinned connection. In this arrangement a locking clevis pin 506 may be passed through a side-positioned aperture 562 of draw-bar receiver 544 and a corresponding set of apertures 510 formed in drawbar 504, as shown.

Wall panels 522 and floor 524 are preferably constructed from rigid and durable materials. Materials suitable for the construction of wall panels 522 and floor 524 include metals (e.g., aluminum or steel), plastics, and composites thereof. Metal wall panels 522 and floor 524 may be joined by thermal welding or by bolted connections for metals and other polymer-based materials. Alternatively, panels may be integrally joined or joined by quick-release fasteners to allow the box to be quickly assembled and disassembled for storage or shipping.

FIG. 50 is a rear view of cargo box 520 of FIG. 44. Cargo box 520 may further comprise additional accessory components including tail lamps 546, wire chase channels 548 for the routing of electrical wiring, electrical accessory plug 550, interior tie downs 552, and drain plug 554, as shown. Electrical power may be supplied through a wiring harness (not shown) that is electrically coupled to a conventional trailer electrical hookup at the towing vehicle. Floor 524 may also include an arrangement of stiffener tubes 568 to provide additional structural rigidity to the box assembly.

Cargo box 520 may be tipped upright for compact storage in a garage, for example. Both wheel assemblies 108 may be removed to allow cargo box 520 to be tipped upright in an orientation placing rear wall 530 parallel with the supporting surface (i.e., the ground). Casters 556 are provided on rear wall 530 to assist movement of cargo box 520 when placed the upright position.

FIG. 51 is a partial side view illustrating a set of extendable casters 558 deployed when wheel assemblies 108 are retained on cargo box 520 when placed in an upright position. Extendable casters 558 are configured to be adjustably deployed outwardly from the rear wall 530 to a position generally aligned with the outer diameter of the rubber tire 270 of wheel assembly 108. This permits cargo box 520 to sits in a level upright orientation and allows the apparatus to be moved by rolling.

Each extendable caster 558 includes a tube 560 having a caster 556 mounted to one end and an opposing end configured to engage one of two secondary receiving sockets 542, as shown. When the cargo box 520 is tipped upright, the tube/caster mechanism slides outwardly from secondary receiving sockets 542 a distance that is user selectable to match the distance wheel assembly 108 extends from rear panel. In this manner, cargo box 520 is placed in a level upright orientation that allows the apparatus to be moved by rolling. In an example implementation, casters 556 can be rotated 360 degrees (i.e., they have full range of motion).

Each secondary receiving socket 542 may be fitted with a locking mechanism enabling the above-noted tube 560 of extendable caster 558 to be releasably secured together in nested telescoping relation. The locking mechanism may be similar in form and function to locking mechanism 160 previously described in FIG. 2, for example.

Referring again to the perspective view of FIG. 1, in the above-described example implementations of towing system 100, the user may adjust the overall length of towing frame 110 by adjusting those telescoping left-side components 118 and corresponding right-side components 120 that are oriented parallel with longitudinal axis 117. Additionally, the user may adjust the overall width of towing frame 110 by adjusting those telescoping left-side components 118 and corresponding right-side components 120 that are non-parallel with longitudinal axis 117. These adjustment features allow towing trailer 102 to be structurally configured to provide, for example, additional chassis width required when towing more than one motorcycle, a three-wheeled motorcycle (e.g., a trike), or extended chassis length when towing particular motorcycles (e.g., a drag bike, an extended chopper-style custom, etc.) It is again noted that user can perform the above-noted adjustments without the use of tools.

Figure 59:
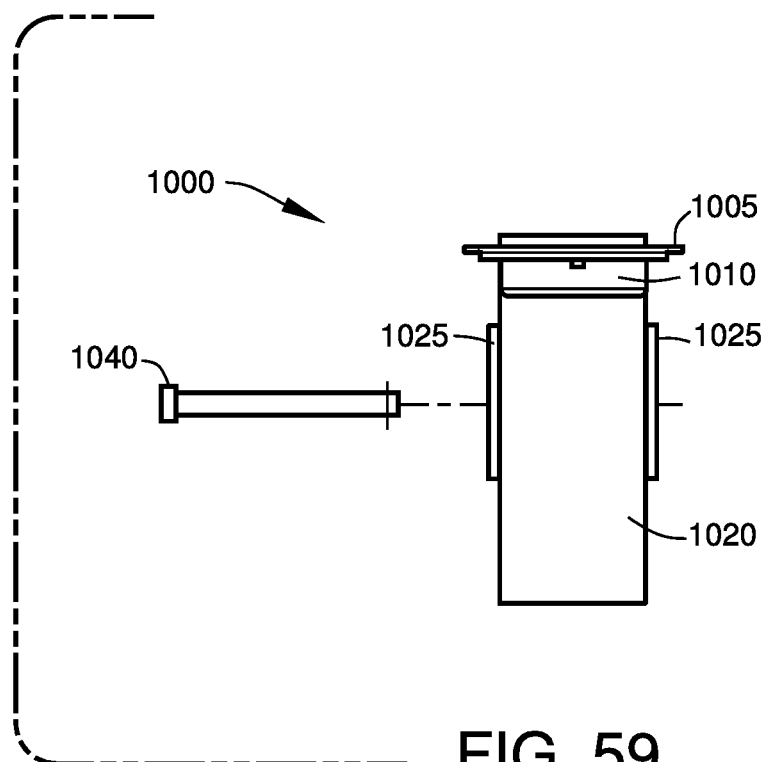
FIG. 59 is a top view of the taillight and turn signal attachment of FIG. 55.
Figure 60:
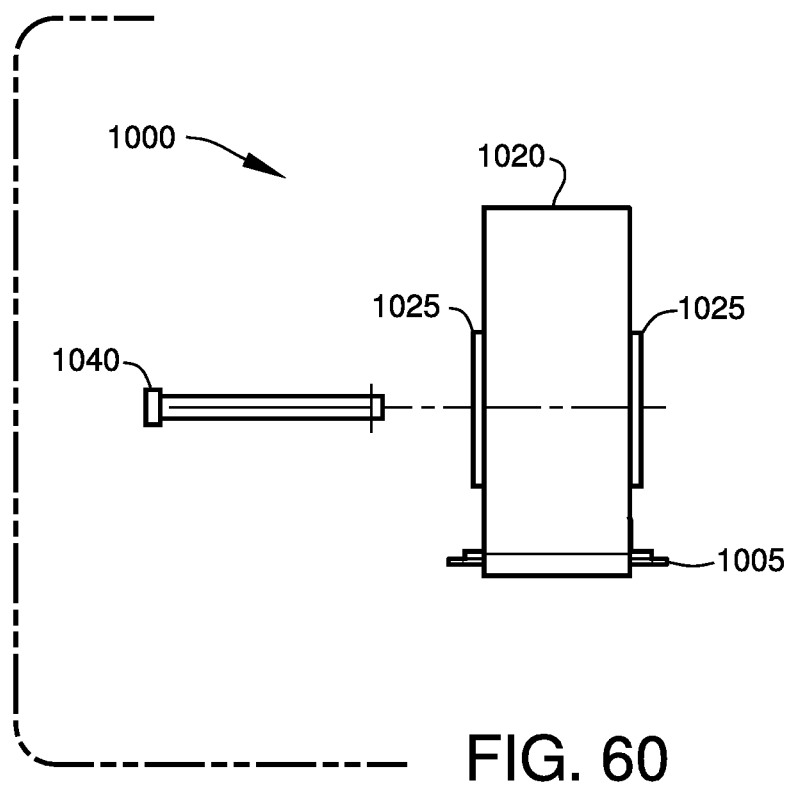
FIG. 60 is a bottom view of the taillight and turn signal attachment of FIG. 55.

FIG. 55 is front perspective view of a taillight and turn signal attachment according to an embodiment of the present disclosure. FIG. 56 is a rear perspective view of the taillight and turn signal attachment of FIG. 55. FIG. 57 is a front view of the taillight and turn signal attachment of FIG. 55. FIG. 58 is a right side view of the taillight and turn signal attachment of FIG. 55 (the left side view is a mirror image). FIG. 59 is a top view of the taillight and turn signal attachment of FIG. 55. FIG. 60 is a bottom view of the taillight and turn signal attachment of FIG. 55. FIGS. 55-60 shows a taillight and turn signal attachment 1000 attachable to towing trailer 102. A pair of such devices are attached to towing trailer when towing (see FIG. 1). Taillight and turn signal attachment 1000 comprises a support plate 1005 holding the taillight and signaling device 1010. Wiring (not shown) for the taillight and signaling device passes through an aperture 1015 on the support plate and is connected to a conventional electrical wiring harness (not shown). An L-shaped bracket 1020 is connected to the support plate 1005. The portion of the L-shaped bracket not directly contacting the support plate is placed onto towing trailer 102 (see. FIG. 1). One suitable position for taillight and turn signal device is on third left-side component 130 (and the corresponding third right side component). A pair of brackets 1025 having aligned apertures 1030 are connected with L-shaped bracket 1020. Third left-side component 130 comprises at least one aperture 1035 as shown in FIG. 52 (aperture 1035 should align with at least one aperture 1035A shown for example in FIG. 34). Taillight and turn signal device is connected to frame by aligning the aforementioned apertures 1035 and 1035A with apertures 1030 on the pair of brackets 1025 and passing a locking pin 1040 through the apertures. A wire 1045 associated with locking pin 1040 may be passed over L-shaped bracket 1020 and secured to the other end of locking pin.

It is understood that towing system 100 may implement additional structures and features relating to the customary operation of towing trailers. For example, the steel structural components forming towing trailer 102 can be protected against corrosion by a suitable paint or coating. In addition, towing trailer 102 may preferably comprise safety features, including, safety reflectors, marker lights, braking systems, etc., as required by the local authorities having jurisdiction over the areas of trailer operation.

Although various embodiments and implementations have been described in the present disclosure, it will be understood that the broadest scope of this disclosure includes modifications such as diverse shapes, sizes, and materials. Such scope is limited only by the below claims as read in connection with the above specification. Further, many other advantages will be apparent to those skilled in the art from the above descriptions and the below claims.

What is claimed is:

1. A towing system comprising:
   a) a frame to support a vehicle;
   b) said frame comprising two wheel assemblies removably connected with said frame;
   c) each wheel assembly configured to raise and lower a portion of said frame connected with said wheel assembly;
   d) each wheel assembly comprising
      i) a frame insertion member insertable into said frame;
      ii) a wheel attachment member;
      iii) a wheel attached to said wheel attachment member;
      iv) a first plate member connected to said wheel attachment member and comprising a mounting aperture;
      v) a lever insertion opening, said lever insertion opening structured and arranged to receive a lever to assist raising or lowering the portion of said frame connected with said wheel assembly;
      vi) a second plate member comprising a gear plate portion and a spindle connecting portion;
      vii) said gear plate portion comprising an outer set of gear teeth, a centrally positioned aperture, and at least two locking apertures spaced about said centrally positioned aperture;
      viii) a spindle connecting said first plate member with said spindle connecting portion of said second plate member, said spindle positioning said first plate member and said second plate member so that said mounting aperture of said first plate member and said centrally positioned aperture of said gear plate portion of said second plate member are aligned;

ix) said frame insertion member connected to said first plate member and said gear plate portion of said second plate member by a transverse pivot shaft, and rotation about said transverse pivot shaft raises and lowers the portion of the frame connected with said wheel assembly;

x) a locking device that engages one of said two locking apertures spaced about said centrally positioned aperture and locks rotation about said transverse pivot shaft; and e) said frame may be raised and lowered between two selectable heights, one of said two selectable heights achieved when rotation about said transverse pivot shaft positions said spindle above said frame insertion member and corresponding to a height permitting pushing or riding the vehicle onto said frame and another of said two selectable heights achieved when rotation about said transverse pivot shaft positions said spindle below said frame insertion member and corresponding to a height for towing the supported vehicle.

2. A towing system comprising:

a) a frame to support a vehicle;

b) said frame comprising two wheel assemblies removably connected with said frame;

c) each wheel assembly configured to raise and lower a portion of said frame connected with said wheel assembly;

d) each wheel assembly comprising i) a frame insertion member insertable into said frame;

ii) a wheel attachment member;

iii) a wheel attached to said wheel attachment member;

iv) a first plate member connected to said wheel attachment member and comprising a mounting aperture;

v) a lever insertion opening, said lever insertion opening structured and arranged to receive a lever to assist raising or lowering the portion of said frame connected with said wheel assembly;

vi) a second plate member comprising a mounting aperture;

vii) a disc connected to said frame insertion member, said disc comprising at least four apertures comprising a centrally positioned aperture and at least three locking apertures spaced about said centrally positioned aperture;

viii) a spindle connecting said first plate member with said second plate member, said spindle positioning said first plate member and said second plate member aligning said mounting aperture of said first plate member and said mounting aperture of said second plate member;

ix) said frame insertion member connected to said first plate member, said disc, and said second plate member by a pivot shaft passing through said mounting aperture of said first plate member, said centrally positioned aperture of said disc, and said mounting aperture of said second plate member, and rotation about said pivot shaft raises and lowers the portion of the frame connected with said wheel assembly;

x) a releasable locking device that engages one of said three locking apertures spaced about said centrally positioned aperture and locks rotation about said transverse pivot shaft; and e) said frame may be raised and lowered between two selectable heights, one of said two selectable heights corresponding to a height permitting pushing or riding the vehicle onto said frame and another of said two selectable heights corresponding to a height for towing the supported vehicle.

\* \* \* \* \*